(12) United States Patent
Yamamoto et al.

(10) Patent No.: US 10,900,885 B2
(45) Date of Patent: Jan. 26, 2021

(54) FLOW CYTOMETRY USING HYDRODYNAMICALLY PLANAR FLOW

(71) Applicants: CAPTL LLC, West Lafayette, IN (US); Hamamatsu Photonics K.K., Hamamatsu (JP)

(72) Inventors: Masanobu Yamamoto, West Lafayette, IN (US); J. Paul Robinson, West Lafayette, IN (US); Yuji Masuda, Hamamatsu (JP); Tsukasa Kayou, Hamamatsu (JP)

(73) Assignee: CAPTL LLC, West Lafayette, IN (US)

( * ) Notice: Subject to any disclaimer, the term of this patent is extended or adjusted under 35 U.S.C. 154(b) by 0 days.

(21) Appl. No.: 15/537,744

(22) PCT Filed: Dec. 19, 2015

(86) PCT No.: PCT/US2015/066947
§ 371 (c)(1),
(2) Date: Jun. 19, 2017

(87) PCT Pub. No.: WO2016/100954
PCT Pub. Date: Jun. 23, 2016

(65) Prior Publication Data
US 2018/0038783 A1    Feb. 8, 2018

Related U.S. Application Data

(63) Continuation-in-part of application No. PCT/US2014/071391, filed on Dec. 19, 2014.
(Continued)

(51) Int. Cl.
*G01N 15/14* (2006.01)
*B01L 3/00* (2006.01)

(52) U.S. Cl.
CPC .... *G01N 15/1404* (2013.01); *B01L 3/502761* (2013.01); *B01L 3/502776* (2013.01);
(Continued)

(58) Field of Classification Search
CPC ..... G01N 2015/1413; G01N 2015/144; G01N 15/1404; G01N 15/1434; G01N 15/1459;
(Continued)

(56) References Cited

U.S. PATENT DOCUMENTS 3,918,812 A    11/1975 Holm
4,573,796 A    3/1986 Martin et al.
(Continued)

FOREIGN PATENT DOCUMENTS

EP    0950890 A2    10/1999
JP    H05346390    12/1993
(Continued)

OTHER PUBLICATIONS

Sundararajan, et al., "Three-Dimensional Hydrodynamic Focusing in Polydimethylsiloxane (PDMS) Microchannels", Journal of Microelectromechanical Systems, vol. 13, No. 4, Aug. 1, 2004, IEEE, pp. 559-567.
(Continued)

*Primary Examiner* — Isiaka O Akanbi
(74) *Attorney, Agent, or Firm* — Piroozi-IP, LLC

(57) ABSTRACT

According to various aspects, a flow system for transporting microparticulate samples in a hydrodynamically planar flow in a selected flow direction includes a flow chamber extending in the flow direction, having first and second apertures on opposed surfaces of the flow chamber. A sheath-fluid channel has first and second branches to carry the sheath fluid into the flow chamber through the first aperture and having orientations separated by less than about 15° at the first aperture; and third and fourth branches to carry the
(Continued)

sheath fluid through the second aperture and having orientations separated by less than about 15° at the second aperture. In some examples, guide channels extend from the apertures substantially perpendicular to the flow chamber at the apertures, and sheath-fluid channel supply sheath fluid to the guide channels. Flow systems can be used in image flow cytometers for observing microparticulate samples, e.g., using scanning irradiation.

20 Claims, 27 Drawing Sheets

Related U.S. Application Data

(60) Provisional application No. 62/094,322, filed on Dec. 19, 2014.

(52) U.S. Cl.
CPC ....... *G01N 15/147* (2013.01); *G01N 15/1434* (2013.01); *G01N 15/1459* (2013.01); *G01N 15/1484* (2013.01); *B01L 2300/0654* (2013.01); *B01L 2300/0816* (2013.01); *B01L 2300/0867* (2013.01); *B01L 2300/0874* (2013.01); *B01L 2300/0877* (2013.01); *B01L 2300/0887* (2013.01); *B01L 2400/0487* (2013.01); *G01N 2015/144* (2013.01); *G01N 2015/1409* (2013.01); *G01N 2015/1413* (2013.01)

(58) Field of Classification Search
CPC ......... B01L 3/502761; B01L 3/502776; B01L 2300/0654; B01L 2300/0816; B01L 2300/0867; B01L 2300/0874; B01L 2300/0877; B01L 2300/0887
USPC .................................. 356/436–435, 337–338
See application file for complete search history.

(56) References Cited

U.S. PATENT DOCUMENTS

| | | | |
|---|---|---|---|
| 4,920,275 A | 4/1990 | Itoh | |
| 4,999,513 A | 3/1991 | Ito et al. | |
| 5,017,497 A | 5/1991 | Gerard de Grooth et al. | |
| 5,294,806 A | 3/1994 | Batchelder et al. | |
| 5,644,388 A | 7/1997 | Maekawa et al. | |
| 5,793,485 A | 8/1998 | Gourley | |
| 5,824,269 A | 10/1998 | Kosaka et al. | |
| 6,159,739 A | 12/2000 | Weigl et al. | |
| 6,249,341 B1 | 6/2001 | Basiji et al. | |
| 6,608,680 B2 | 8/2003 | Basiji et al. | |
| 6,642,018 B1 | 11/2003 | Koller et al. | |
| 6,763,149 B2 | 7/2004 | Riley et al. | |
| 6,856,390 B2 | 2/2005 | Nordman et al. | |
| 7,016,022 B2 | 3/2006 | Fritz et al. | |
| 7,113,266 B1 | 9/2006 | Wells | |
| 7,190,832 B2 | 3/2007 | Frost et al. | |
| 7,315,357 B2 | 1/2008 | Ortyn et al. | |
| 7,522,758 B2 | 4/2009 | Ortyn et al. | |
| 7,634,125 B2 | 12/2009 | Ortyn et al. | |
| 7,634,126 B2 | 12/2009 | Ortyn et al. | |
| 7,800,742 B2 | 9/2010 | Fukuda et al. | |
| 7,800,754 B2 | 9/2010 | Kenyon | |
| 7,804,594 B2 | 9/2010 | Vacca et al. | |
| 7,925,069 B2 | 4/2011 | Ortyn et al. | |
| 8,004,661 B2* | 8/2011 | Luscher ............. G01N 15/1404 356/72 |
| 8,131,053 B2 | 3/2012 | Ortyn et al. | |
| 8,159,670 B2 | 4/2012 | Vacca et al. | |
| 8,400,632 B2 | 3/2013 | Vacca et al. | |
| 8,406,498 B2 | 3/2013 | Ortyn et al. | |
| 8,548,219 B2 | 10/2013 | Ortyn et al. | |
| 8,563,325 B1* | 10/2013 | Bartsch ............. B01L 3/502776 422/502 |
| 8,660,332 B2 | 2/2014 | Ortyn et al. | |
| 2002/0030811 A1 | 3/2002 | Schindler | |
| 2002/0113204 A1 | 8/2002 | Wang et al. | |
| 2002/0123033 A1 | 9/2002 | Eyal et al. | |
| 2003/0007894 A1 | 1/2003 | Wang et al. | |
| 2004/0067167 A1 | 4/2004 | Zhang et al. | |
| 2004/0266022 A1 | 12/2004 | Sundararajan et al. | |
| 2005/0046848 A1 | 3/2005 | Cromwell et al. | |
| 2005/0057749 A1 | 3/2005 | Dietz et al. | |
| 2005/0068536 A1 | 3/2005 | Schwabe | |
| 2005/0122522 A1 | 6/2005 | Padmanabhan et al. | |
| 2006/0023207 A1* | 2/2006 | Cox .................. G01N 15/1404 356/246 |
| 2007/0109530 A1 | 5/2007 | Ueno et al. | |
| 2007/0171778 A1 | 7/2007 | Saito et al. | |
| 2009/0066936 A1* | 3/2009 | Huang ................ B01F 13/0062 356/73 |
| 2009/0122311 A1 | 5/2009 | Kanda | |
| 2009/0201504 A1 | 8/2009 | Ho et al. | |
| 2009/0298703 A1 | 12/2009 | Gough et al. | |
| 2010/0021039 A1 | 1/2010 | Ortyn et al. | |
| 2010/0120077 A1 | 5/2010 | Daridon | |
| 2010/0172020 A1 | 7/2010 | Price et al. | |
| 2010/0231913 A1 | 9/2010 | Tsukii et al. | |
| 2010/0238442 A1 | 9/2010 | Heng et al. | |
| 2011/0066382 A1 | 3/2011 | Adams | |
| 2011/0069310 A1 | 3/2011 | Muraki et al. | |
| 2011/0085221 A1 | 4/2011 | Ortyn et al. | |
| 2011/0134426 A1* | 6/2011 | Kaduchak .......... G01N 15/1404 356/337 |
| 2011/0169837 A1 | 7/2011 | Takata et al. | |
| 2011/0192991 A1 | 8/2011 | Fukumoto et al. | |
| 2011/0216319 A1 | 9/2011 | Schwabe | |
| 2012/0070818 A1 | 3/2012 | Rowlen et al. | |
| 2012/0103112 A1 | 5/2012 | Vrane et al. | |
| 2012/0136584 A1 | 5/2012 | Ban et al. | |
| 2012/0139917 A1 | 6/2012 | Suzuki et al. | |
| 2012/0196314 A1* | 8/2012 | Nawaz .................. B01F 5/0647 435/29 |
| 2012/0220022 A1 | 8/2012 | Ehrlich et al. | |
| 2012/0270306 A1 | 10/2012 | Vacca et al. | |
| 2012/0281216 A1 | 11/2012 | Ilkov | |
| 2012/0287435 A1 | 11/2012 | Adams et al. | |
| 2012/0293797 A1 | 11/2012 | Braeckmans et al. | |
| 2012/0295339 A1 | 11/2012 | Wu et al. | |
| 2013/0050782 A1 | 2/2013 | Heng et al. | |
| 2013/0091937 A1 | 4/2013 | Rich | |
| 2014/0220557 A1* | 8/2014 | Hart .................. G01N 33/4833 435/6.1 |
| 2014/0339446 A1 | 11/2014 | Yamamoto et al. | |
| 2014/0353522 A1 | 12/2014 | Wu et al. | |
| 2015/0114093 A1* | 4/2015 | Appleyard .......... G01N 15/1404 73/61.59 |
| 2015/0346092 A1 | 12/2015 | Lee et al. | |
| 2016/0136643 A1* | 5/2016 | Larson ............... B01L 3/502715 506/2 |
| 2016/0370280 A1 | 12/2016 | Yamamoto et al. | |
| 2019/0049356 A1 | 2/2019 | Yamamoto et al. | |

FOREIGN PATENT DOCUMENTS

| | | |
|---|---|---|
| JP | H05346392 | 12/1993 |
| JP | 2005291831 | 10/2005 |
| JP | 2009063308 | 3/2009 |
| JP | 2013502590 | 1/2013 |
| WO | WO03016875 A2 | 2/2003 |
| WO | WO2007121179 | 10/2007 |
| WO | WO2013054502 | 4/2013 |

OTHER PUBLICATIONS

Doohan, James, "Blood Cells," retrieved on Feb. 12, 2016, at «http://www.biosbcc.net/doohan/sample/htm/Blood%20cells.htm», Biological Sciences BioMed 108 Human Physiology, 2000, 6 pages.

(56) References Cited

OTHER PUBLICATIONS

Eisert, W.G., "High Resolution Optics Combined with High Spatial Reproducibility in Flow", Cytometry, vol. 1, No. 4, 1981, pp. 254-259.

Focusing and Collimating, retrieved on Dec. 4, 2015, at «http://www.newport.com/Focusing-and-Collimating/141191/1033/content.aspx», Newport, 3 pages. Nov. 2015.

Goda et al., "Hybrid dispersion laser scanner", in the Journal of Scientific Reports, vol. 2, Jun. 8, 2012, 8 pages.

Japanese Office Action dated Jun. 6, 2017 for Japanese Patent Application No. 2016-514059, a counterpart foreign application of U.S. Pat. No. 9,372,143.

Kim, et al., "An efficient 3-dimensional hydrodynamic focusing microfluidic device by means of locally increased aspect ratio", Microelectronic Engineering, vol. 86, No. 4-6, Apr. 1, 2009, Elsevier Publishers, pp. 1343-1346.

Koller et al., "High-Throughput Laser Mediated In Situ Cell Purification With High Purity and Yield", Cytometry Part A, No. 61, 2004, pp. 153-161.

Kumbhakar et al., "Single-Molecule Detection in Exploring Nanoenvironments: An Overview", Abstract of, in the Journal of Photochemistry and Photobiology C: Photochemistry Reviews, vol. 5, Iss. 2, Oct. 15, 2004, pp. 113-137, available at «http://www.sciencedirect.com/science/article/pii/S1389556704000206», 3 pages.

Mahon, et al., "Blood Cell Identification," retrieved on Dec. 4, 2015, at «http://www.depts.ttu.edu/liru_afs/staff/dailey/jwdblood_htm», 1 page. Jul. 2015.

Mullaney et al., "Cell Sizing: A Light Scattering Photometer for Rapid Volume Determination," in the Review of Scientific Instruments, vol. 40, No. 8, 1969, 5 pages.

Office action for U.S. Appl. No. 13/894,521, dated Sep. 17, 2015, Yamamoto et al., "Scanning Image Flow Cytometer", 12 pages.

PCT Search Report and Written Opinion dated Apr. 13, 2016 for PCT application No. PCT/US2015/066947, 12 pages.

PCT Serach Report dated Sep. 26, 2014 for Application No. PCT/US2014/037995, 3 pages.

PCT Search Report and Written Opinion dated Sep. 14, 2015 for PCT Application No. PCT/US14/71391, 15 pages.

PCT Written Opinion and International Search Report dated Sep. 26, 2014 for Application No. PCT/US2014/037995, 11 pages.

Simonnet, et al., "Two-dimensional hydrodynamic focusing in a simple microfluidic device", Applied Physics Letters, American Institute of Physics, US, vol. 87, No. 11, Sep. 8, 2005, pp. 114104-1 to 114104-3.

Spectra-Physics: SP-120 Manual, retrieved on Dec. 4, 2015, at «https://web.archive.org/web/20041227095059/http://lasers.757.org/manuals/Spectra_Physics_120-256/p44.JPG», 12 pages. Dec. 2004.

Vacca et al., "Laser Rastering Flow Cytometry: Fast Cell Counting and Identification", in the Proceedings of SPIE BiOS: Biomedical Optics, International Society for Optics and Photonics, 2009, 11 pages.

Van Dilla, et al., "Cell Microfluorometry: A Method for Rapid Fluorescense Measurement," Science, vol. 163, No. 3872, Mar. 14, 1969, pp. 1213-1214.

Zeiss, Carl, "LSM 710—The Power of Sensitivity—A New Dimension in Confocal Laser Scanning Microscopy," 0775 Jena, Germany, BioSciences, microscopy@zeiss.com(www.zeiss.com/microscopy), 32 pages. May 2009.

Zhuang, et al., "Detection of unlabeled particles in the low micrometer size range using light scattering and hydrodynamic 3D focusing in a microfluidic system", Electrophoresis, vol. 33, No. 12, Jul. 28, 2012, pp. 1715-1722.

Office action for U.S. Appl. No. 15/187,346, dated Oct. 20, 2017, Yamamoto, "Time-Sequential Cytometry", 8 pages.

\* cited by examiner

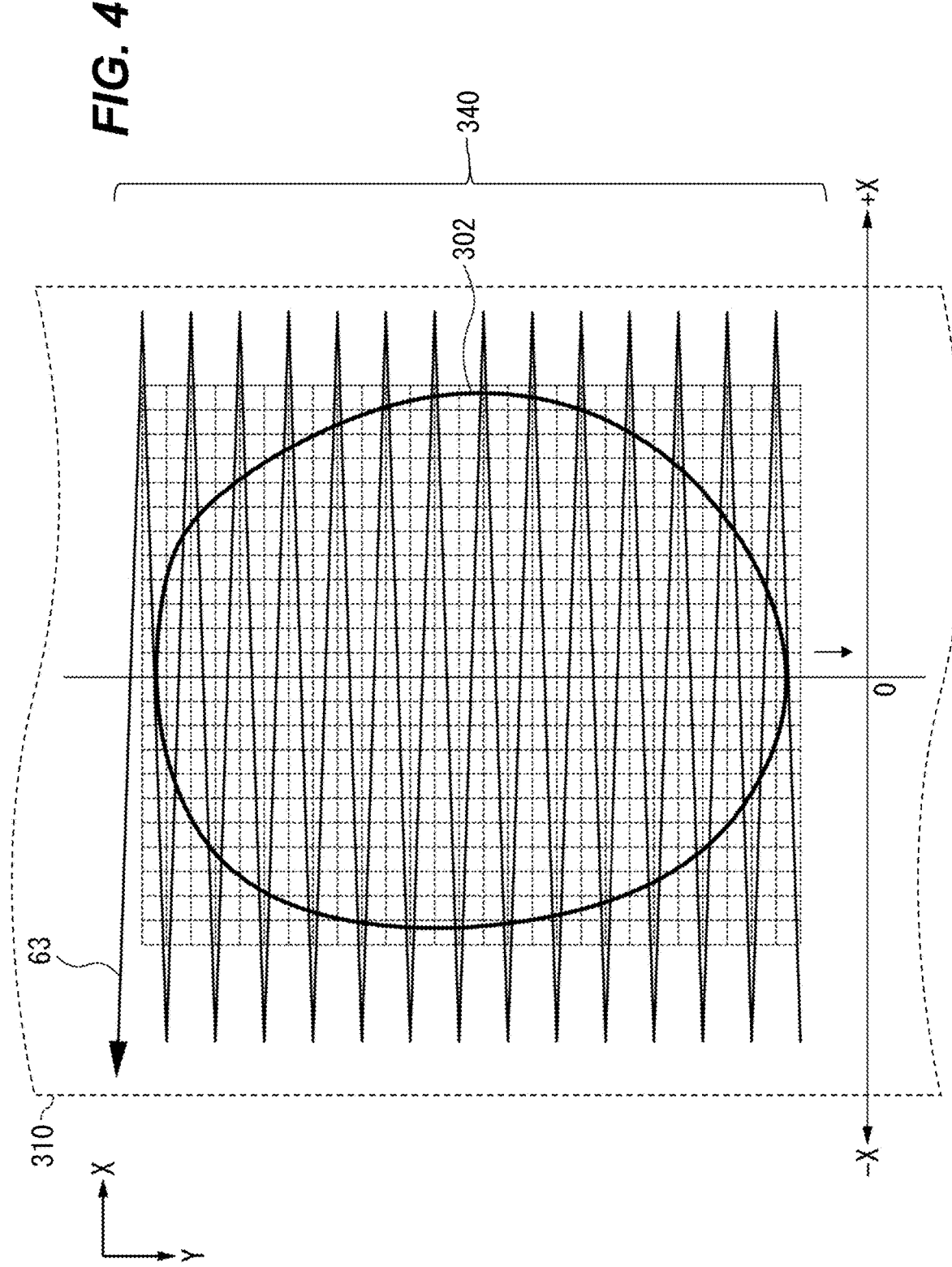

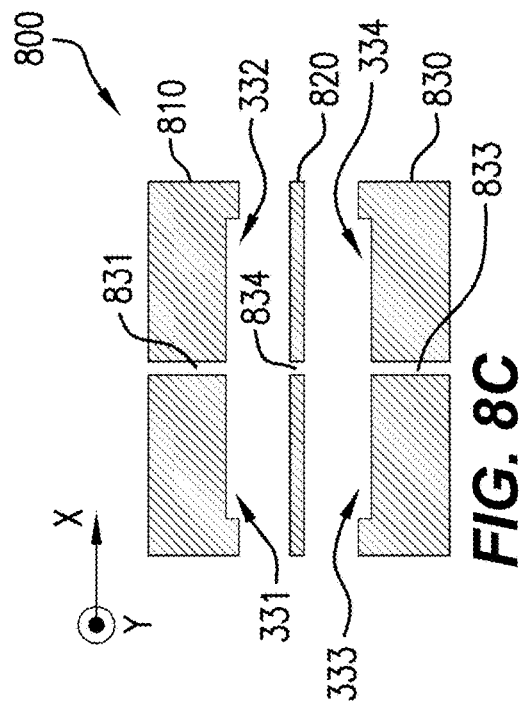
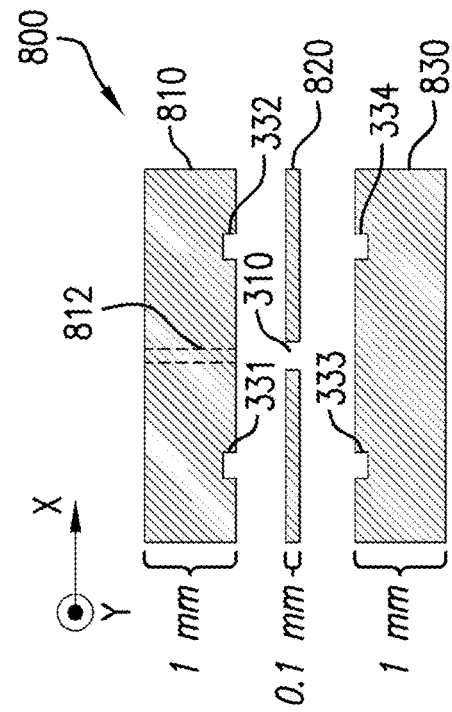
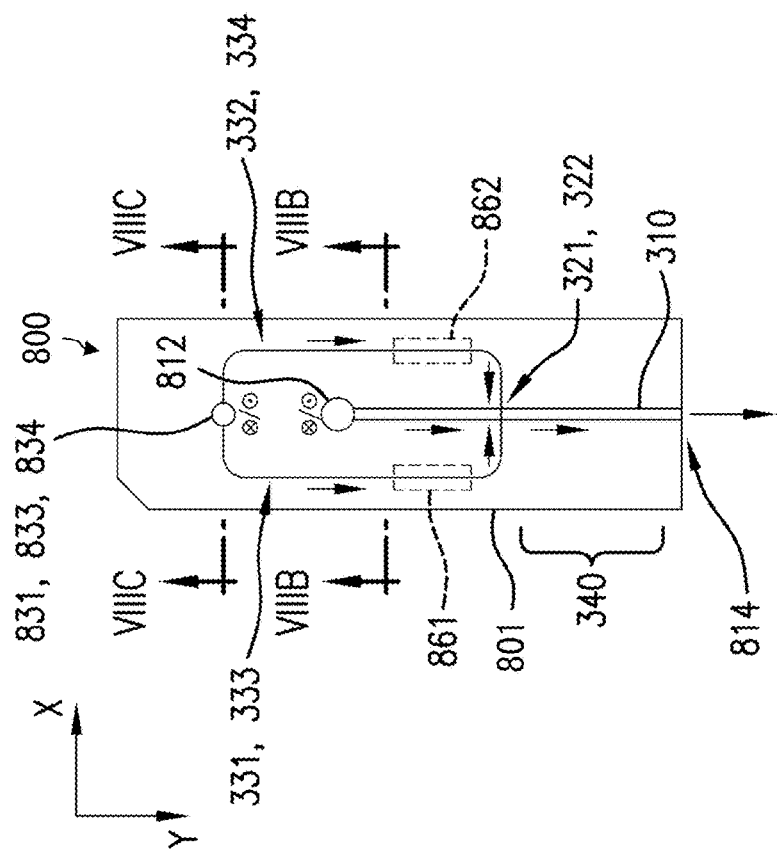
FIG. 8A
FIG. 8B
FIG. 8C

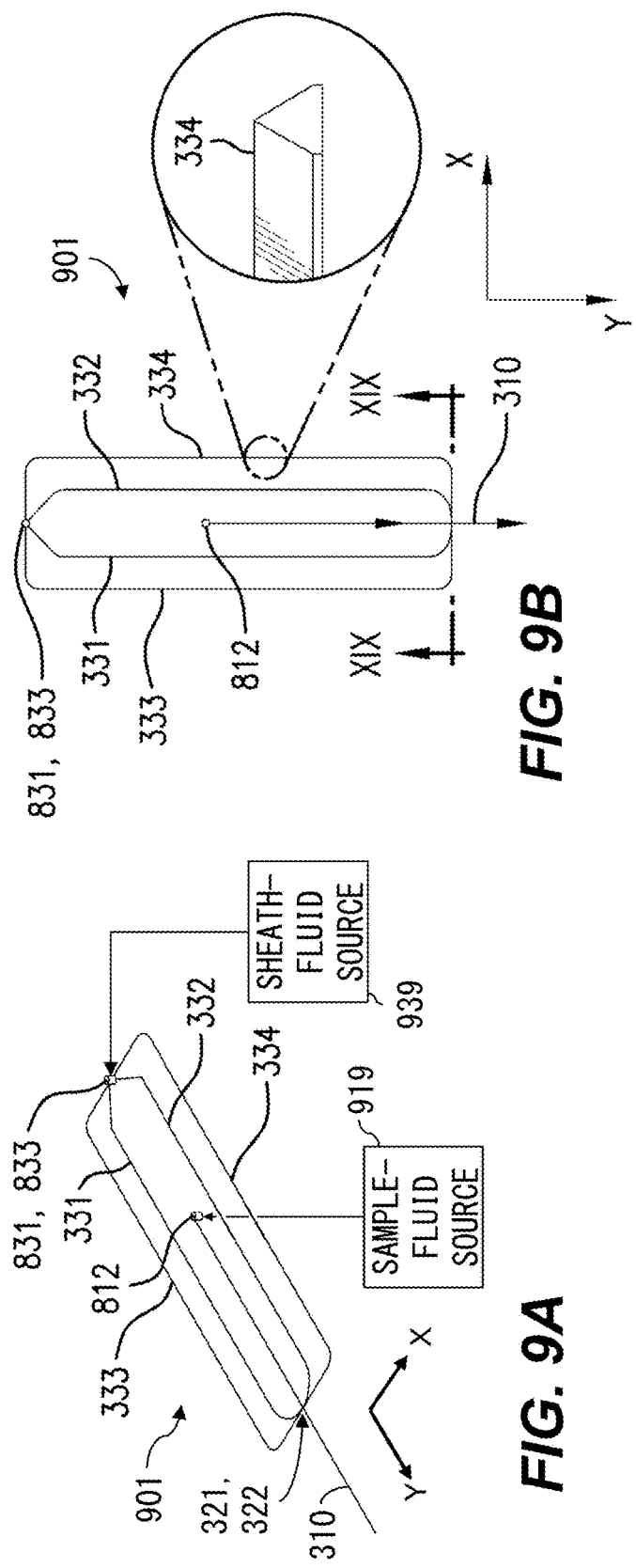
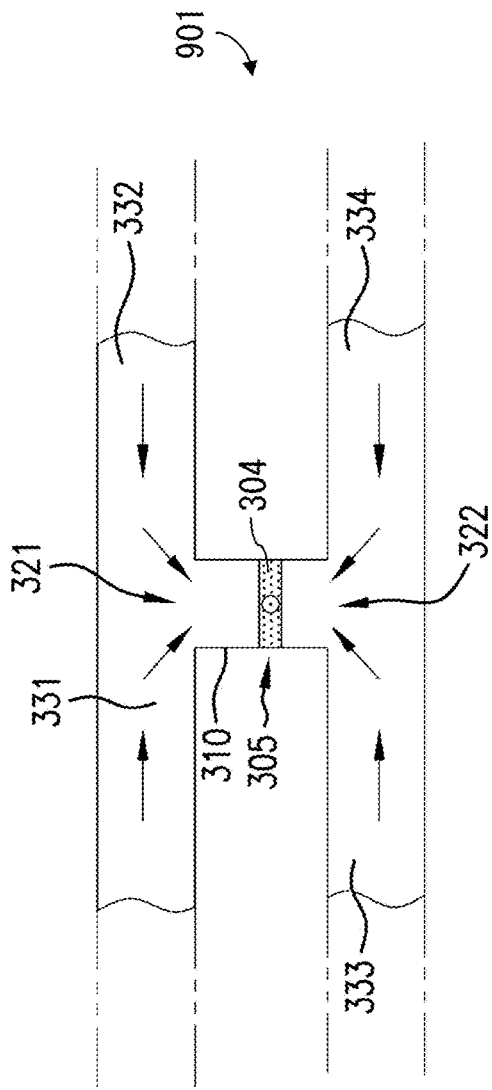
FIG. 9A
FIG. 9B
FIG. 9C

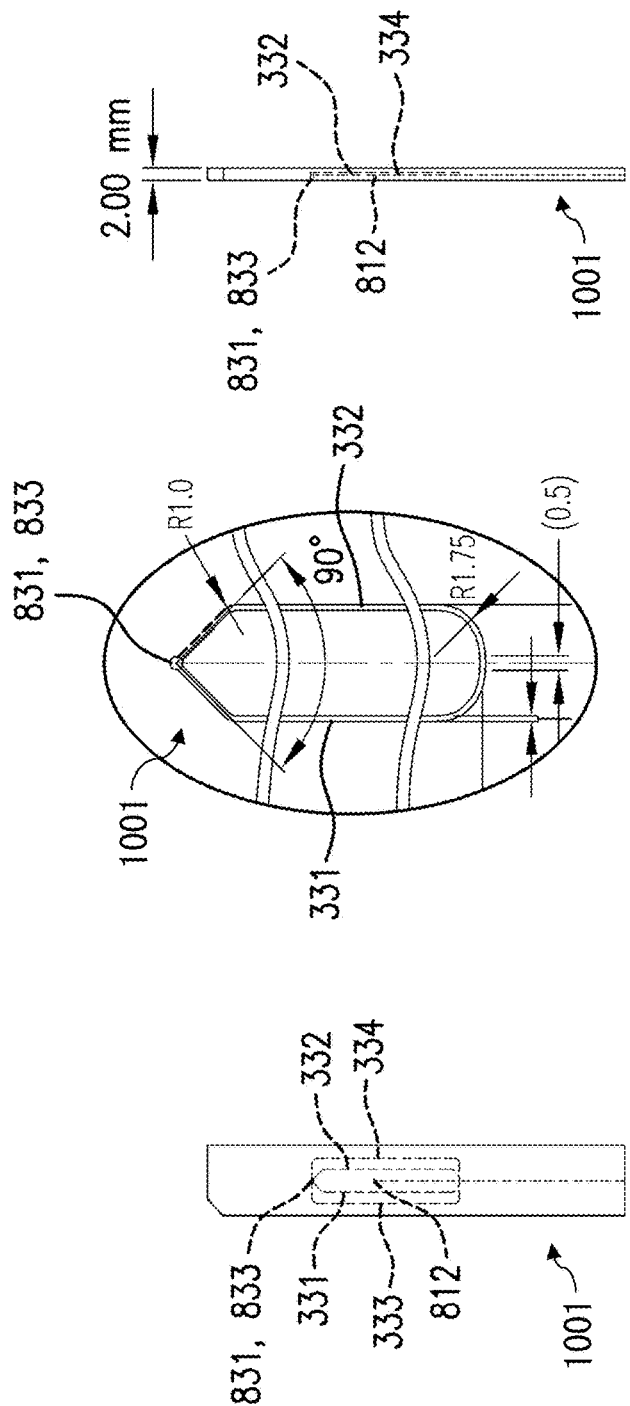
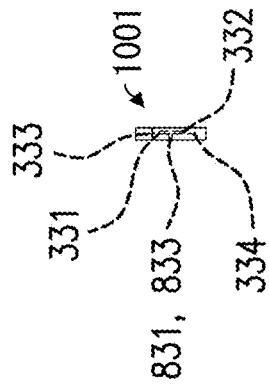
FIG. 10C
FIG. 10D
FIG. 10B
FIG. 10A

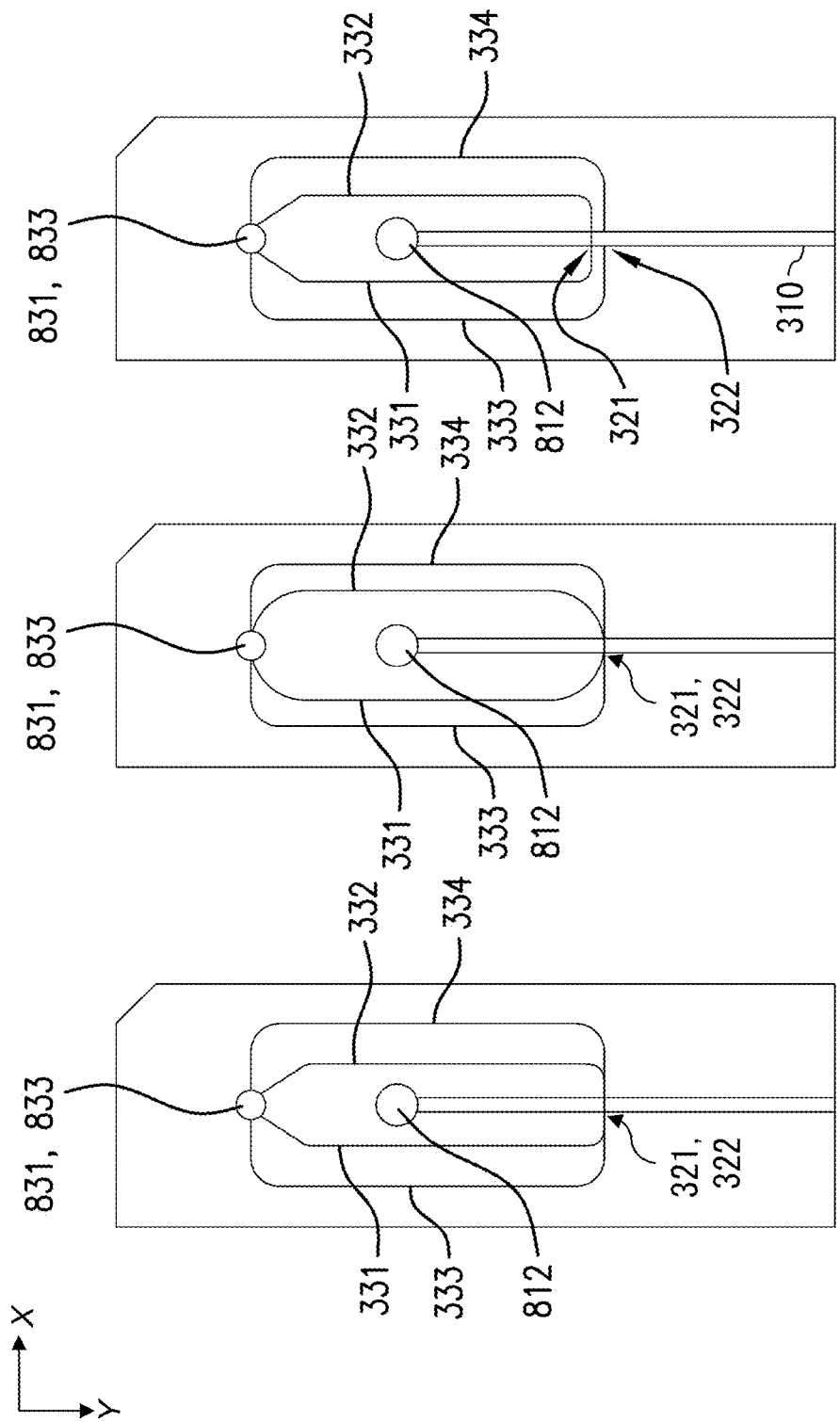

+100μm

+50μm

+/−0mm

−50μm

−100μm

−5.0mm

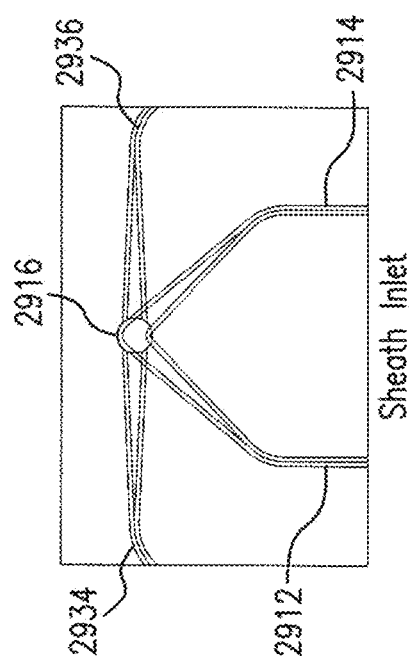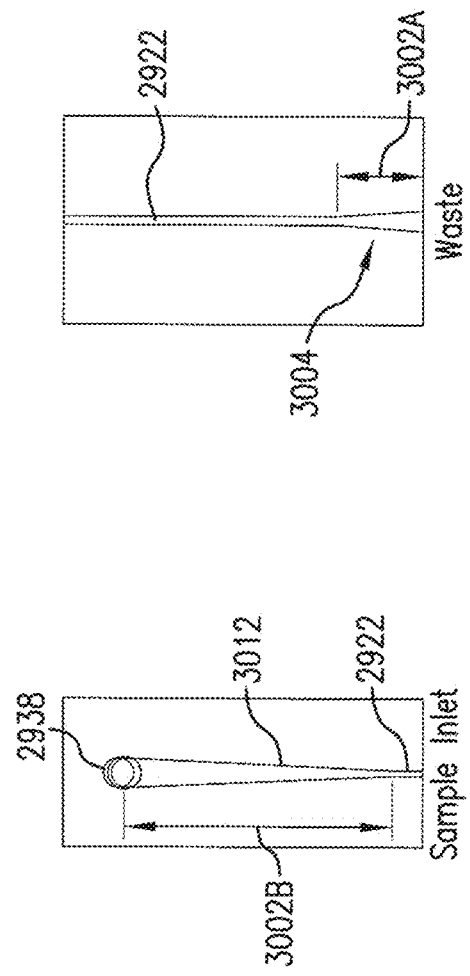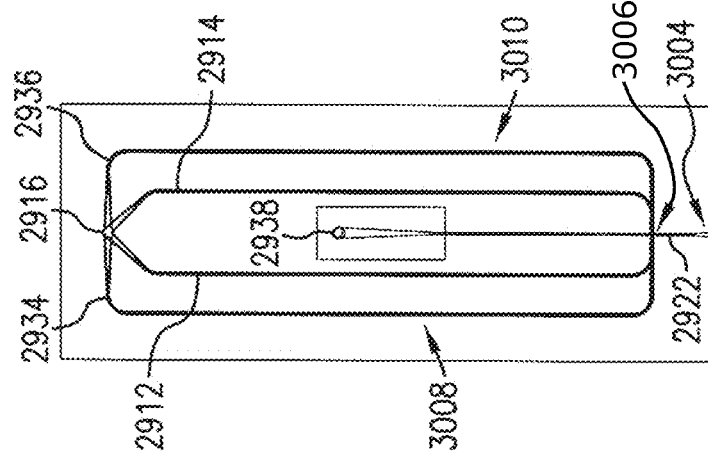

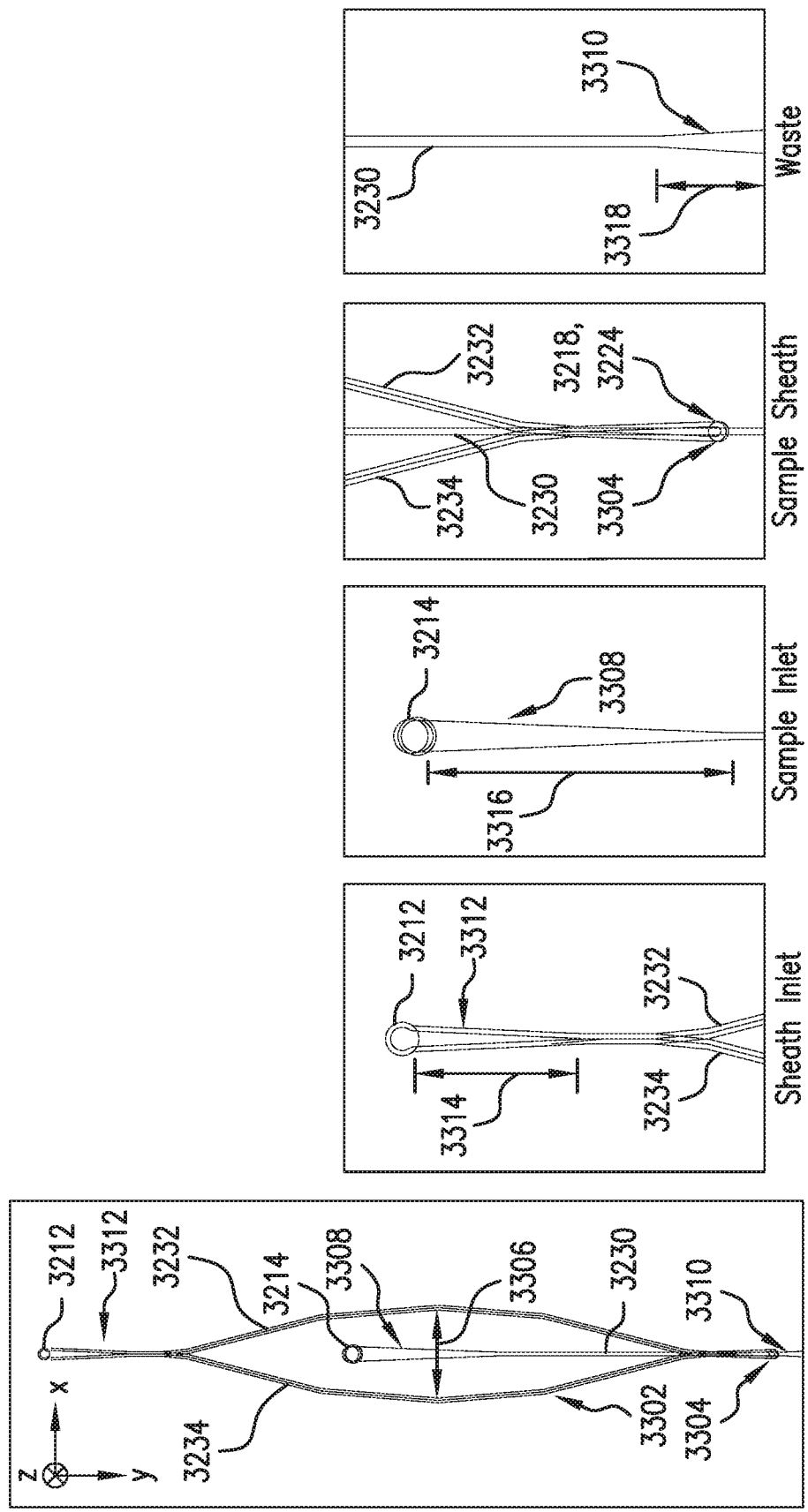

FLOW CYTOMETRY USING HYDRODYNAMICALLY PLANAR FLOW

CROSS-REFERENCE TO RELATED APPLICATIONS

This application is a national-stage application under 35 USC 371 of International Application Serial No. PCT/US2015/066947, filed Dec. 19, 2015 and entitled "Flow Cytometry Using Hydrodynamically Planar Flow," which claims priority to, and the benefit of, International Application Serial No. PCT/US2014/071391, filed Dec. 19, 2014 and entitled "Flow Cytometry Using Hydrodynamically Planar Flow," and U.S. Provisional Application Ser. No. 62/094,322, filed Dec. 19, 2014 and entitled "Flow Cytometry Using Hydrodynamically Planar Flow," the entirety of each of which is incorporated herein by reference.

TECHNICAL FIELD

The present application relates to flow cytometry, and particularly to control of fluid flows in image flow cytometers.

BACKGROUND

In the fields related to life sciences such as genetics, immunology, molecular biology, and environmental science, flow cytometry is widely used to analyze microparticulate samples such as living cells, yeast, and bacteria. Particles or cells from 500 nm up to 50 micron can generally be measured in flow cytometry. In general, in the case of analyzing a cell or the like with a flow cytometer, a label made of a fluorescent substance is attached to the surface of a cell to be analyzed. Next, a liquid such as water or saline is used to move the labeled cell through a flow channel of a flow chamber, which is an area in which the labeled cell is to be analyzed, and laser light having a relatively high output is radiated towards a predetermined position to irradiate the cell. Then, forward-scattered light and side-scattered light, which are generated due to the size and structure of each cell, and fluorescence, which is generated by excitation due to the light irradiation, are observed. In the case of observing fluorescence from a cell, a configuration for spectral analysis of the fluorescence condensed in a direction other than an irradiation path of excitation light is widely used to avoid adverse effects of transmitted or scattered excitation light. Fluorescent substances to be attached or combined for each type of cells are known. Accordingly, the wavelength and intensity of the fluorescence are observed and the intensity component to be superimposed is compensated to thereby identify the type of each cell flowing through the flow channel.

An example flow cytometry system ("flow cytometer") includes a laser light irradiation optical system, a flow chamber, a detection optical system, and a control unit. The laser light irradiation optical system radiates laser light onto microparticulate samples within the flow chamber. The laser light irradiation optical system includes one or more lasers that output laser light having a wavelength corresponding to a label to be excited, and a condensing optical system that condenses the laser light on the flow chamber. For example, an irradiation spot of laser light in a conventional flow cytometer can have a substantially elliptical shape of 10 μm (minor axis)×70 μm (major axis), or other shapes or sizes. The irradiation spot is, e.g., an area of a microparticulate sample onto which enough laser light falls that characteristics of the microparticulate sample can be determined. Also in the case of using a cuvette as a flow chamber, a flat beam having substantially the same width as that of a stream is used to observe particulate objects, e.g., microparticulate samples. The detection optical system can detect an intensity of light such as transmitted light, scattered light, and fluorescence from the microparticulate samples.

When the flowing microparticulate samples pass through laser irradiation spots, scattered light and fluorescence, which is caused due to excitation of a labeled substance, are generated. The scattered light includes forward-scattered light having a small scattering angle which represents a size of a fine particle, and side-scattered light having a large scattering angle which represents an internal structure of a fine particle. Each of the forward-scattered light, the side-scattered light, and the fluorescence is detected by a photodetector of the detection optical system. The fluorescence has a small intensity and is radiated uniformly over the whole solid angle. For this reason, the fluorescence is condensed by a condenser lens having a large numerical aperture, and is then detected by an ultrasensitive photodetector which is called a photomultiplier tube (PMT). Then, the control unit performs amplification, analog-digital conversion, and operation on the light signal detected by the photodetector.

However, present flow cytometers are limited in throughput by the need to measure one cell at a time. As flow cytometry becomes more widely used in both clinical and research settings, there is increasing demand for faster measurements. Accordingly, there is a continuing need for a higher-throughput flow cytometer.

Reference is made to the following: U.S. Pat. Nos. 5,395,588 A; 5,093,234 A; 5,047,321 A; 4,056,324 A; 4,225,229 A; 4,348,107 A; and 3,380,584, each of which is incorporated herein by reference. Reference is also made to U.S. Pat. Nos. 4,395,676, 4,487,320, 4,498,766, 3,657,537, 8,159,670 US2005046848A1, US2005057749, US20120270306, US2012220022, US20120270306, U.S. Pat. Nos. 6,249,341, 7,634,125, 7,925,069, 8,548,219, 8,660,332, 6,002,788, 7,706,590, and 6,674,058, each of which is incorporated herein by reference.

BRIEF DESCRIPTION OF THE DRAWINGS

The above and other objects, features, and advantages will become more apparent when taken in conjunction with the following description and drawings wherein identical reference numerals have been used, where possible, to designate identical features that are common to the figures.

FIG. 4 is a front view showing scanning of an example microparticulate sample flowing through the flow chamber and the sensing area.

FIG. 8A is a front view of components of a flow system according to various aspects.

FIG. 8B is an exploded plan along the line VIIIB-VIIIB in FIG. 8A.

FIG. 8C is an exploded plan along the line VIIIC-VIIIC in FIG. 8A.

FIG. 9A is a perspective, and FIG. 9B a front view, of components of a flow system according to various aspects.

FIG. 9C is a plan along the line XIX-XIX in FIG. 9B.

FIG. 10A is a front view, FIG. 10B an inset view, FIG. 10C a side view, and FIG. 10D an end view, of components of a flow system according to various aspects.

FIGS. 11-14 are front views of components of flow systems according to various aspects.

FIGS. 30A-30D are plans of portions of the example flow system shown in FIG. 29A.

FIGS. 33A-33E are plans of portions of the example flow system shown in FIG. 32A.

Figure 1:
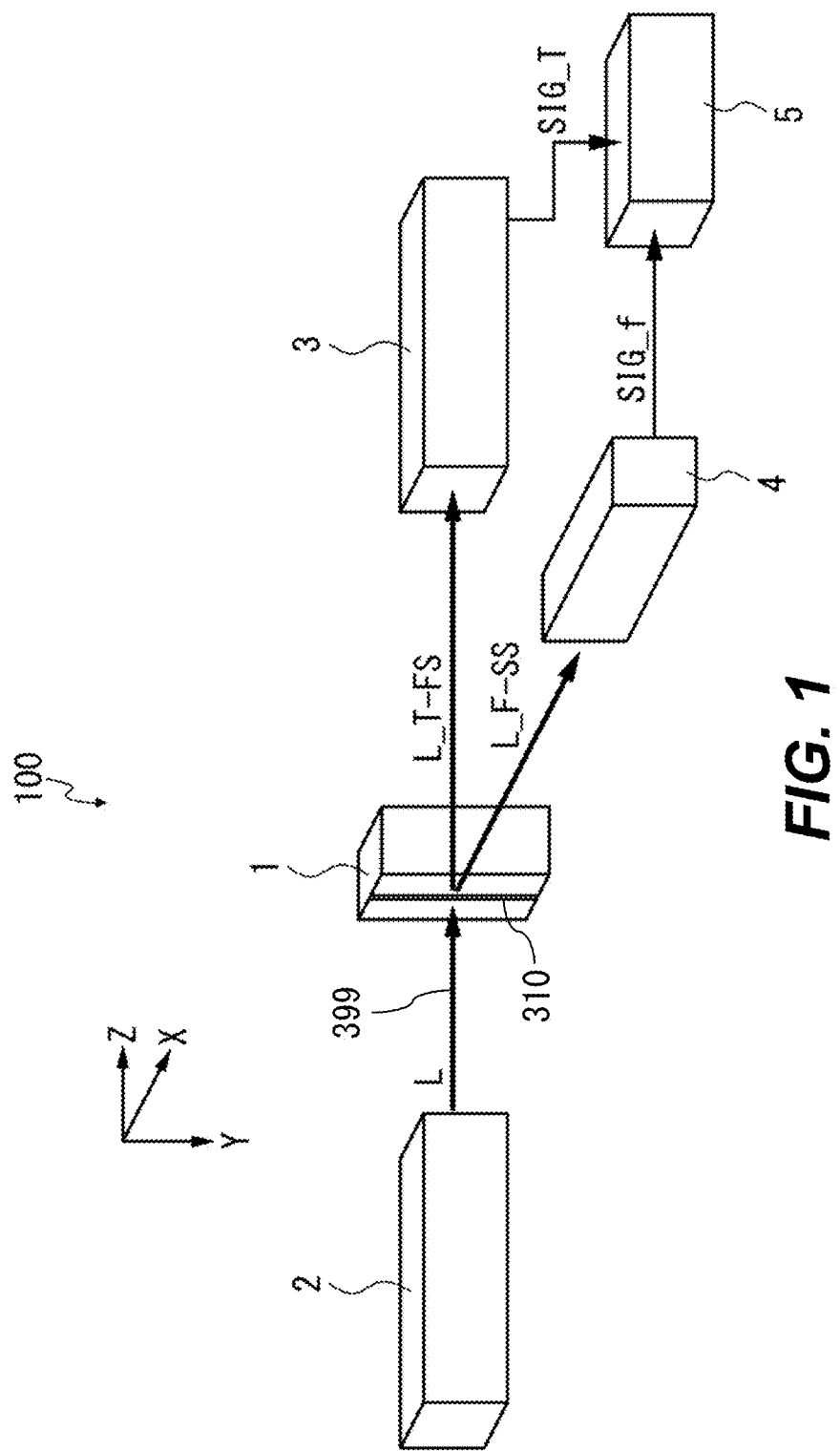
FIG. 1 is a schematic of a configuration of an image flow cytometer according to an example aspect.

The attached drawings are for purposes of illustration and are not necessarily to scale.

DETAILED DESCRIPTION

Reference is made to U.S. application Ser. No. 13/894,521 by Yamamoto et al., filed May 15, 2013 and entitled "Scanning image flow cytometer," the disclosure of which is incorporated herein by reference in its entirety. Throughout this description, the illustrated or described orientations of components are not limiting unless otherwise specified. For example, detectors can be placed at angles other than 0° or 90°.

Throughout this description, some aspects are described in terms that can be implemented as software programs, in hardware, in firmware, in micro-code, or any combination thereof. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Overview

An image flow cytometer for observing microparticulate samples according to a first example aspect includes a flow system configured to direct a carrier fluid including the microparticulate samples through a sensing area in a substantially hydrodynamically planar flow having a selected thickness, a selected flow direction and a selected flow rate, the flow system including: a flow chamber extending in the flow direction, the flow chamber including first and second apertures on opposed surfaces of the flow chamber and a sensing area downstream of the first and second apertures along the flow direction, the flow chamber configured to receive the carrier fluid upstream of the first and second apertures; and a sheath-fluid channel configured to receive a sheath fluid and including: first and second branches configured to carry the sheath fluid into the flow chamber through the first aperture and oriented in substantially opposite directions at the first aperture; and third and fourth branches configured to carry the sheath fluid into the flow chamber through the second aperture and oriented in substantially opposite directions at the second aperture; an irradiation optical system adapted to scan an irradiation spot smaller than the selected thickness across the sensing area in a scan direction different from the flow direction; a detection optical system that detects a time-varying light intensity of resultant light from the flow chamber; and a processor configured to detect two or more of the microparticulate samples according to the detected time-varying light intensity of the resultant light.

A flow system for transporting microparticulate samples in a substantially hydrodynamically planar flow substantially in a selected flow direction according to a second example aspect includes a flow chamber extending in the flow direction, the flow chamber including first and second apertures on opposed surfaces of the flow chamber, the flow chamber configured to receive a carrier fluid including the microparticulate samples upstream of the first and second apertures; and a sheath-fluid channel configured to receive a sheath fluid and including: first and second branches configured to carry the sheath fluid into the flow chamber through the first aperture and oriented in substantially opposite directions at the first aperture; and third and fourth branches configured to carry the sheath fluid into the flow chamber through the second aperture and oriented in substantially opposite directions at the second aperture.

According to example aspects described herein, an image flow cytometer using hydrodynamically planar flow advantageously provides higher throughput. Various aspects measure multiple microparticulate samples per scan of the irradiation spot, with reduced probability of coincidences or other abort conditions. Moreover, various aspects are advantageously capable of observing internal structures of each microparticulate sample. For example, using a spot size of incident light smaller than the microparticulate sample advantageously permits measuring features, e.g., within a cell.

This Overview is intended only to provide a brief overview of subject matter disclosed herein according to one or more illustrative embodiments, and does not serve as a guide to interpreting the claims or to define or limit scope, which is defined only by the appended claims. This brief description is provided to introduce an illustrative selection of concepts in a simplified form that are further described below in the Detailed Description. This brief description is not intended to identify key features or essential features of the claimed subject matter, nor is it intended to be used as an aid in determining the scope of the claimed subject matter. The claimed subject matter is not limited to implementations that solve any or all disadvantages noted in the Background.

Illustrative Aspects

First, an image flow cytometer 100 according to an example aspect will be described. The image flow cytometer 100 can be a scanning-type image flow cytometer. Prior flow cytometers can identify particles or cells based on measurement of detected signals. However, correlating those signals to spatial locations on the particles or cells is generally not possible in prior schemes. An "image cytometer" (e.g., an "image flow cytometer") is a cytometer that can provide data relating to a spatial relationship between detected signals and cellular or particle locations. Some prior image cytometers use an imaging camera to create the spatial data. These systems can be limited in sensitivity or resolution by the characteristics of such cameras. Various example image cytometers herein do not require the use of imaging cameras and can provide improved performance compared to prior schemes.

Various example flow-cytometric systems are configured to individually perform measurement of cells or the like with laser light. A large number of microparticulate samples are supplied to a flow chamber through a tube from a container such as a vial containing the samples. The flow chamber is generally configured to permit microparticulate samples to be aligned and flow by a method called hydrodynamic focusing.

When using hydrodynamic focusing, a sample flow including microparticulate samples is discharged from an elongated nozzle. The discharged sample flow is surrounded by a sheath flow of, e.g., water or saline, which is an isosmotic fluid, and flows through the flow channel of the flow chamber. The discharge pressure of the sample flow is set to be higher than that of the sheath flow, thereby permitting the microparticulate samples, which are randomly distributed, to be aligned and flow in the sample flow. This phenomenon is called a three-dimensional (3-D) laminar flow in terms of fluid dynamics. This makes it possible to radiate laser light independently towards each microparticulate sample, such as a cell, and to detect and analyze the scattered light and excited fluorescence.

FIG. 1 is a configuration diagram showing a schematic configuration of the image flow cytometer 100 according to the first example aspect. The image flow cytometer 100 includes a flow cell 1, an irradiation optical system 2, a detection optical system 3, a detection optical system 4, and a control unit 5. The term "optical" does not limit any aspect to the human-visible wavelength range ("visible light," roughly 400-700 nm). Instead, as noted below, any wavelength of electromagnetic radiation 399 can be used with suitable components for flow cell 1, irradiation optical system 2, detection optical system 3, and detection optical system 4. For example, infrared or ultraviolet light can be used instead of or in addition to visible light.

The irradiation optical system 2 radiates laser light L or other electromagnetic radiation 399 into the flow cell 1, e.g., to irradiate a microparticulate sample 302 (FIG. 3) in flow chamber 310 in flow cell 1. As described in detail later, the irradiation optical system 2 can radiate the laser light L into the flow cell 1 by causing the laser light L to converge to a diffraction limit. The irradiation optical system 2 can scan the flow cell 1 with the laser light L. When microparticulate samples 302 flowing through the flow cell 1 are irradiated with the laser light L, transmitted light/forward-scattered light L_T-FS and fluorescence/side-scattered light L_F-SS can be output from the flow cell 1. Note that the fluorescence and scattered light can be output in all directions from the flow cell 1. However, to simplify the explanation in this example aspect, the fluorescence and side-scattered light which are output in a direction substantially perpendicular to the optical axis of the laser light L are described herein.

Light is detected and processed by detection optical system 3 and detection optical system 4, each of which is configured to detect a time-varying light intensity of respective resultant light from the flow cell 1, and specifically from flow chamber 310 therein. The detection optical systems 3, 4 produce signals SIG_T, SIG_f, respectively, which are provided to a control unit 5. SIG_T or SIG_f can include data for one or more wavelength(s) or component(s) of the light incident on the photodetector 34. The detection optical system 3 is referred to herein, without limitation on angle of placement or orientation, as a parallel detection optical system.

The laser light L, or other electromagnetic radiation 399 radiated into the flow cell 1, is referred to herein as "incident light." Light or other electromagnetic radiation transmitted through the flow cell 1, or light emitted from microparticulate samples, dyes, or other substances within the flow cell 1, is referred to herein as "resultant light." Resultant light can include electromagnetic radiation provided by, e.g., scattering, refraction, absorption, or rotation of the plane of polarization of the incident light, or any combination thereof. Throughout this disclosure, the terms "scatter," "scattering," and the like include refraction, absorption, and polarization rotation, as appropriate, unless otherwise explicitly noted. Resultant light can include forward-scattered (FS) light and side-scattered (SS) light. FS and SS have substantially the same wavelength as the light source in irradiation optical system 2. Resultant light can also include fluorescent light, since such light can be emitted by substances within the flow cell 1. Resultant light can be substantially directional (e.g., transmitted light of the laser light L) or substantially omnidirectional (e.g., fluorescence), or can have a selected or characteristic radiation pattern (e.g., a cardioidal variation of intensity as a function of angle from the direction of the incident light). It is not required that all of the laser light L be incident on the microparticulate sample 302 (FIG. 3) at any given time. For example, useful information can be gathered while scanning the irradiation spot over the membrane of a cell, even if some of the irradiation spot is not striking the cell.

In various aspects, light L is provided by a source other than a laser. The light source can be any source that can be focused to produce an irradiation spot smaller than the microparticulate sample 302 to be irradiated, e.g., a lamp illuminating a parabolic reflector focused on the flow cell 1, a laser (e.g., from a diode laser such as a VCSEL), or a light-emitting diode (LED) focused through a lens. In an example, the microparticulate sample has a diameter of 10-20 μm, and the irradiation spot has a full-width at half-maximum (FWHM) diameter of 0.25 μm.

In an example, the transmitted light/forward-scattered light L_T-FS is coherent light that is affected by scattering, refraction, absorption, rotation of the plane of polarization, or the like of light due to the irradiation of the laser light L onto the microparticulate samples 302. The fluorescence/side-scattered light L_F-SS is incoherent light. The transmitted light, fluorescence, forward-scattered light, and side-scattered light will be described in detail later. Coherent side-scatter and back-scatter light can also be detected.

In an example aspect, the flow cell 1 is configured as a flat plate type flow cell having a flow chamber 310, e.g., a micro flow channel, through which microparticulate samples 302 (FIG. 3) to be analyzed flow. The flow cell 1 is configured such that the microparticulate samples 302 are aligned and permitted to flow through the flow chamber 310 by hydrodynamic focusing. In other words, in the flow cell 1, a sample flow SM is sandwiched by a sheath flow SH (FIGS. 2, 3) including saline, water, or other isotonic liquid(s), and flows through the flow chamber 310. In this case, the discharge pressure of the sample flow SM is set to be higher than that of the sheath flow. This permits the microparticulate samples 302 randomly distributed to be aligned and flow in the sample flow SM.

Still referring to FIG. 1, the configuration of the image flow cytometer 100 will be further described. The detection optical system 3 is disposed at a position opposed to the irradiation optical system 2 through the flow cell 1. The detection optical system 3 does not have to be exactly on the optical axis of the incident light L, but can be, e.g., within ±1°, ±5°, ±10°, or ±15° of the optical axis. The detection optical system 3 detects the transmitted light of the laser light irradiated onto the flow chamber 310, and also detects the forward-scattered light generated by the irradiation of the microparticulate samples 302 by the laser light. The term "forward-scattered light" refers to light that is scattered at a small angle, e.g., ±10°, with respect to the traveling direction of the optical axis of the laser light L. This forward-scattered light can include scattered light generated when the laser light is scattered on the surface of each microparticulate sample, or diffracted light or refracted light that are generated when the laser light is radiated onto each microparticulate sample 302. In an example, when the microparticulate samples 302 to be irradiated with the laser light are cells, the forward-scattered light varies depending on, e.g., the state of a cell surface, the shape and the presence or absence of a nucleus, the shape of each cell, or a direction in which laser light passes through each cell.

In various aspects, the detection optical system 3 is configured to detect transmitted or forward-scattered light. The detection optical system 3 includes an objective lens, a dichroic mirror, a beamsplitter (e.g., a half-silvered mirror), a confocal aperture, and a first photodetector arranged in that order along a transmitted-light path; and includes a block filter and a second photodetector arranged in that order on a path of light diverted by the beamsplitter. First, resultant light from the flow cell 1 falls on the objective lens. The objective lens causes the incident light to form an image on the receiving surface of the first photodetector. The dichroic mirror reflects light having wavelengths other than the wavelength of the laser light, out of the transmitted light/forward-scattered light. This permits extra components such as the fluorescence to be partly or wholly removed from the transmitted light/forward-scattered light L_T-FS, and permits light ("L1") having substantially the same wavelength as that of the laser light to be output from the dichroic mirror. Light L1 is split into light L11 and light L12 by the beamsplitter. A metal half-silvered mirror can be used; such beamsplitters have a wide spectrum but large absorption. A multi-layer dielectric beam splitter can also be used. Such dielectric beamsplitters can have lower absorption than metal half-silvered mirrors.

The confocal aperture is a pin-hole, for example, and removes the forward-scattered light having at least a selected angle with respect to the optical axis of the laser light L from the light L11. The size of the pinhole can be selected, e.g., to provide a diffraction-limited spot at a selected wavelength, or with optics of a selected numerical aperture. This can be done as is known in the art of confocal microscopy. This permits the transmitted light included in the light L11 to be incident on the first photodetector. In an example, only the transmitted light in L11 is incident on first photodetector. The first photodetector detects the light intensity of the transmitted light, and outputs the detection result as a detection signal SIG_T.

Light L12 is a portion of light L1. The block filter removes, from the light L12, the transmitted light that propagates along the optical axis of the light L12. The block filter can include, e.g., a slit structure. The block filter can collect a limited-scatter-angle component, e.g., in the 1-10° range. This permits the forward-scattered light to be incident on the second photodetector, but not the transmitted light (any extra components were already removed by the dichroic mirror). The second photodetector detects the light intensity of the forward-scattered light included in the light L12, and outputs the detection result as a detection signal SIG_FS (not shown), which can be provided to control unit 5.

An example first photodetector includes a polarizing beam splitter, an s-polarized light detector, and a p-polarized light detector. The light L11 passing through the confocal aperture is incident on the polarizing beam splitter. An s-polarized light ("L_s") included in the light L11 is reflected by the polarizing beam splitter, and a p-polarized light ("L_p") included in the light L11 is transmitted through the polarizing beam splitter. The s-polarized light detector detects the intensity of the s-polarized light L_s and outputs a detection signal SIG_Ts as a detection result. The p-polarized light detector detects the intensity of the p-polarized light L_p and outputs a detection signal SIG_Tp as a detection result. The detection signals SIG_Ts and SIG_Tp can be provided to the control unit 5, e.g., as components of signal SIG_T. Other example photodetectors or light detectors include charge-coupled device (CCD) optical sensors, complementary metal-oxide-semiconductor (CMOS) optical sensors, photodiodes such as PIN or avalanche photodiodes, and photomultiplier tubes (PMTs).

The detection optical system 4 is disposed at a position deviating from the optical axis of the laser light L. For example, the detection optical system 4 can be disposed in a direction substantially perpendicular to the optical axis of the laser light L, or at least 45° away from the optical axis of laser light L. Accordingly, the fluorescence that propagates in the direction perpendicular to the optical axis of the laser light L is incident on the detection optical system 4. The term "side-scattered light" refers to light that is scattered in a direction substantially perpendicular (about 90°) to the optical axis of the laser light. In general, the side-scattered light has a light intensity smaller than that of the forward-scattered light. In an example, the microparticulate samples 302 to be irradiated with the laser light are cells, and the side-scattered light is produced due to an internal structure of each cell such as intracellular granules or a nucleus. In various configurations, the detection optical system 4 includes components described above with reference to detection optical system 3. In other configurations, the detection optical system 4 also or alternatively includes one or more dichroic mirror(s) for directing light of selected wavelength(s) to respective PMT(s) or other light detector(s). This permits measuring fluorescent resultant light at one or more known wavelength(s). SIG_f can include or accompany respective signal(s) for the PMT(s).

Figure 6:
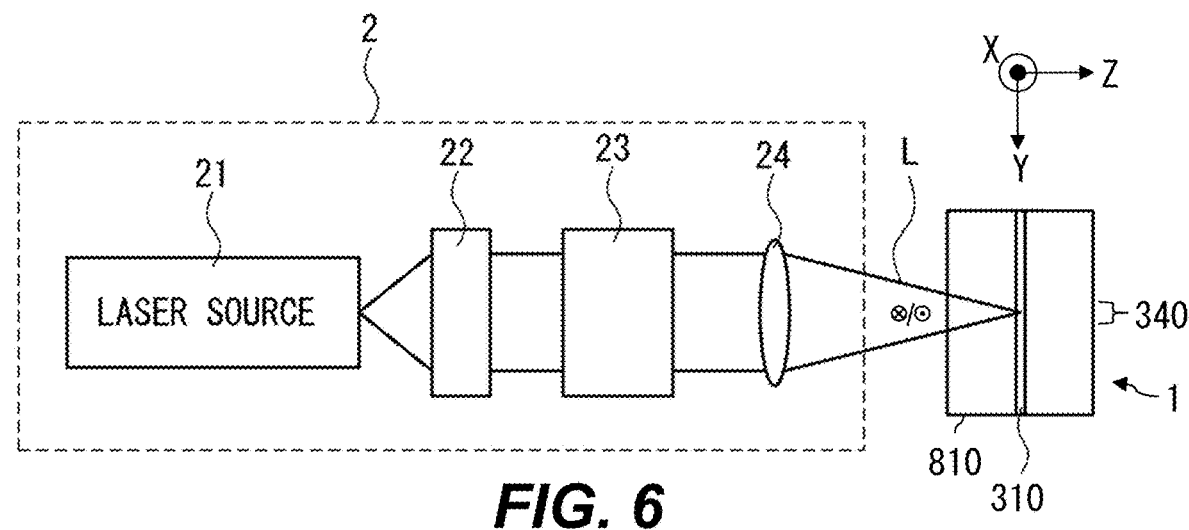
FIG. 6 is a block diagram schematically showing an example configuration of an irradiation optical system.

Control unit 5 is configured as a hardware resource, such as a computer, which is capable of executing information processing, for example. The control unit 5 performs arithmetic processing based on the detection signals SIG_T and SIG_FS (not shown) from the detection optical system 3 and the detection signals SIG_f1 to SIG_f3 (PMT outputs; not shown) from the detection optical system 4. The control unit 5 can detect a variation of the light intensity of the transmitted light by the detection signal SIG_T, and can observe a variation of the light intensity of the fluorescence by the detection signal SIG_f or other detection signals discussed herein. The control unit 5 can also control the rate and cycle of the deflection operation for the laser light L in the deflector 23 (FIG. 6). Other examples of hardware and software that can be included in the control unit 5 are discussed below with reference to FIG. 24.

In various aspects, control unit 5 processes signals from the detection optical systems 2 and 3 to determine properties of features within a microparticulate sample 302 or other object. For example, individual mitochondria within a cell can be located using fluorescent tagging of mitochondria, e.g., with LIFE TECHNOLOGIES MITOSOX red mitochondrial superoxide indicator. As the irradiation spot is scanned over a cell that has been dyed with MITOSOX, red fluorescence will be detected when the irradiation spot is over a functioning mitochondrion. In this way, positions, counts, and distributions of mitochondria in a cell can be determined. In another example, dyes such as DHR 123, JC-1, or JC-11 can be used similarly for detecting mitochondria.

Internal structures of other objects can also be determined. For example, any internal structure such as a labeled or non-labeled nucleus can be identified and distinguished from surrounding organelles. Non-labeled nuclei and other internal structures can be detected by their increased optical absorbance compared to surrounding areas of the cell or other object. Other organelles can also be identified using similar techniques. In another example, mRNA or other nucleotide sequences can be detected, e.g., using in-situ hybridization techniques. Nucleotide sequences can be identified by detecting fluorescent probes or labels on DNA or RNA strands complementary to the base sequences of interest. RNA transcripts can be identified by fluorescent probes selected to bind to the RNA transcripts of interest.

Figure 2:
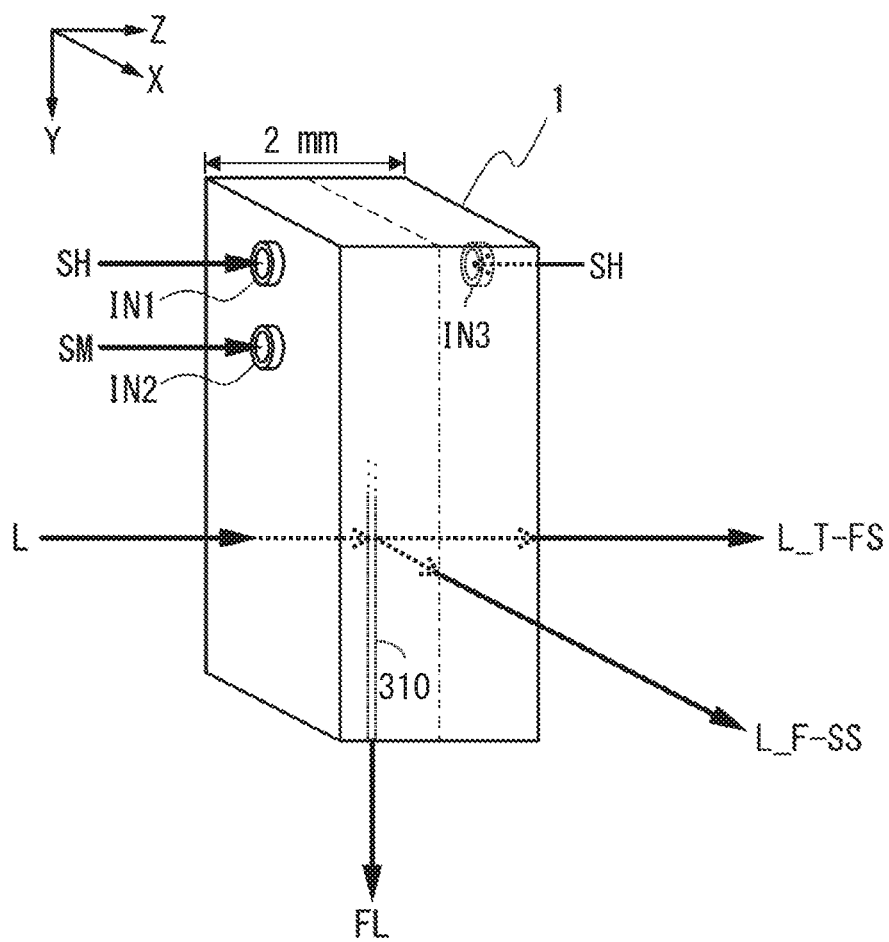
FIG. 2 is a perspective view schematically showing an example configuration of a flow cell.

FIG. 2 is a perspective view schematically showing the configuration of an example flow cell 1. The flow cell 1 includes a flow chamber 310, and is transparent or substantially transparent to irradiation such as light L and resultant light such as light L_T-FS and L_T-SS. For clarity, only part of flow chamber 310 is shown. Further details of various configurations of flow chamber 310 and other parts of a flow system 300 (FIG. 3) are discussed below with reference to FIGS. 3, 8A-14. As shown, the flow cell 1 can be 2 mm thick along the direction of propagation of light L.

A sheath flow SH flows into the flow cell 1 from an inlet port IN1. For example, saline, which is an isotonic liquid, or water, can be used as the sheath flow SH. However, the sheath flow SH is not limited to saline, but various types of liquid such as water, other aqueous solutions (whether isotonic or not), and organic solvents can be used. In various examples discussed below with reference to FIG. 9A, the sheath flow SH also flows into the flow cell 1 from an additional inlet port IN3.

Further, a sample flow SM including the microparticulate samples 302 flows into the flow cell 1 from an inlet port IN2. For example, saline, which is an isotonic liquid, can be used as the sample flow SM. However, the sample flow SM is not limited to saline, but various types of liquid such as water, other aqueous solutions (whether isotonic or not), and organic solvents can be used. The inflow pressure of the sample flow SM can be higher than or lower than the inflow pressure of the sheath flow SH.

In an example, a simulation was performed using SOLIDWORKS FLOW SIMULATION. The simulated velocity distribution in the flow chamber 310 is parabolic: the center of the sample flow is fastest and the flow velocity is zero at the walls of the flow chamber 310. The simulated sheath-to-sample flow ratio for a 10 µm sample flow height is 10:1. The sheath channel shape is triangular in cross-section (as provided by a microblasting process; see, e.g., FIG. 9B). The sheath volumetric flow rate is $7.5 \times 10^{-3}$ mL/s, the sample volumetric flow rate is $7.5 \times 10^{-4}$ mL/s, the sheath pressure is 134,424 Pa, and the sample pressure is 130,348 Pa. The sample linear flow rate in this example is 1 m/s in the center of the channel. The total volumetric flow rate is $8.0 \times 10^{-9}$ m$^3$/s. Values within, e.g., 10% of those ranges can also be used. In the simulation, the outlet (arrow marked "FL") is assumed to be open to atmospheric pressure (101,325 Pa). In an example, 8 nL/s corresponds to 0.48 µL/min in a 120 µm×80 µm channel. Linear velocity ranges 0.1 m/s to 1.0 m/s can be used. Sample- and sheath-flow pressures can be, e.g., ≤0.13 MPa.

The inlet ports IN1, IN2, IN3 can be bored, molded, or otherwise formed in the flow cell 1. In an example, the flow cell 1 includes glass or quartz. In one example that was constructed, flow channels (e.g., flow chamber 310) were formed by micro-blasting of quartz sheets. Ports IN1, IN2, IN3 were then drilled out of the quartz sheets. Further details of the construction of example flow cells 1 are discussed below with reference to FIGS. 8A-8C. Other etching and boring techniques can be used to form flow channels, inlets, and other features. For example, sample channels, including flow chamber 310, can be etched, and sheath channels can be micro-blasted using a mask to define the desired pattern.

In other examples, channels and other cavities described herein can be injection molded, molded using other techniques, bored, or etched.

The sheath flow SH and the sample flow SM merge in the flow chamber 310, so that a flow FL is provided in which the sample flow SM is substantially hydrodynamically planar with the sheath flow SH above and below the sample flow SM. The flow FL can be discharged to the outside of the flow cell 1, for example. The flow FL is discussed below with reference to FIG. 3.

Example configurations of the flow cell 1 are discussed below with reference to FIGS. 3, 8A-8C, 9A-9C, 10A-10C, and 11-14. Simulations of various example configurations are discussed below with reference to FIGS. 15-21.

Figure 3:
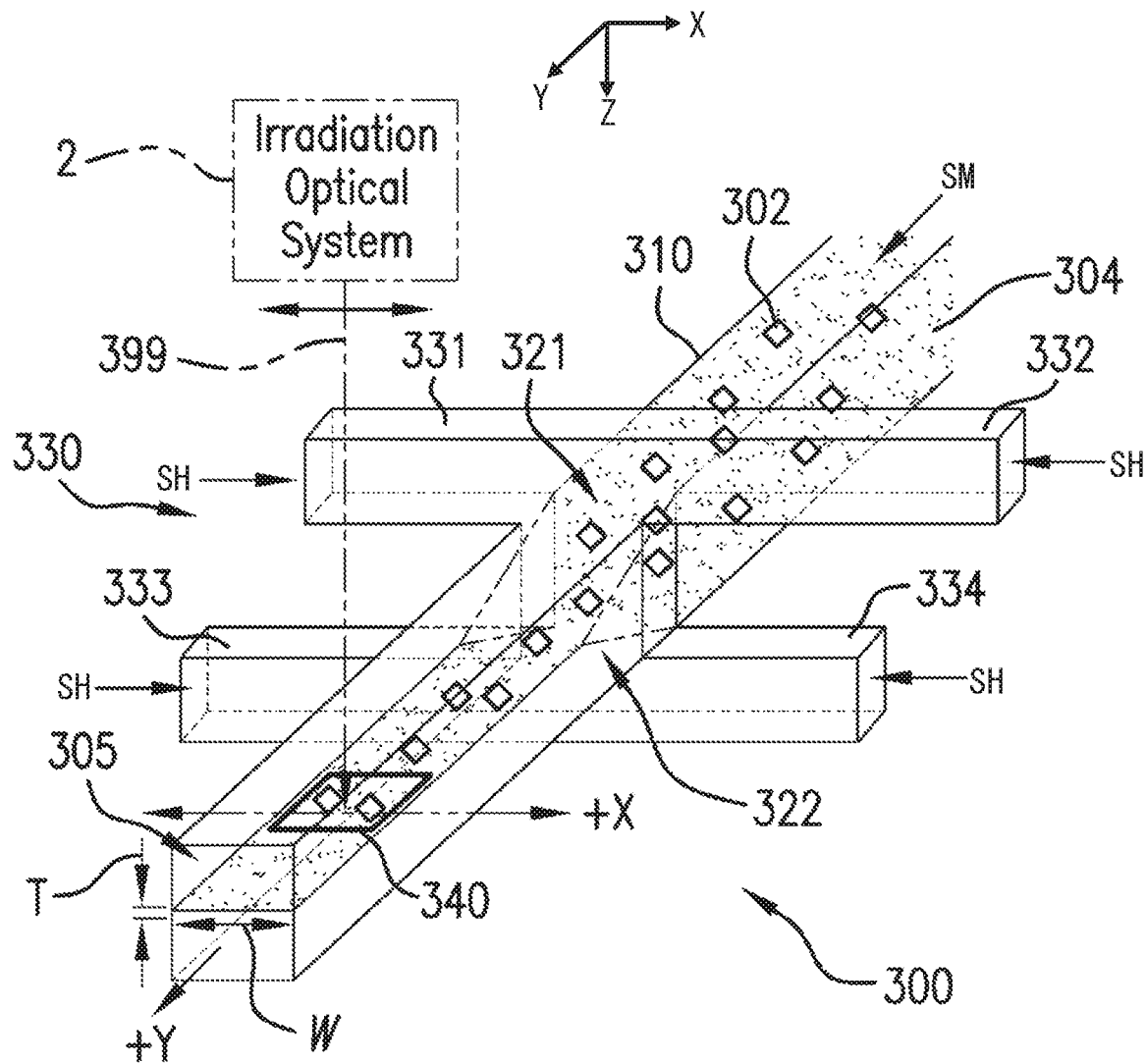
FIG. 3 is a perspective of portions of a flow system for transporting microparticulate samples in a substantially hydrodynamically planar flow, and related components, according to various aspects.

FIG. 3 is a perspective of portions of a flow system 300 for transporting microparticulate samples 302 in a substantially hydrodynamically planar flow 305 substantially in a selected flow direction +Y, according to various aspects. The illustrated portions can be located in flow cell 1 (FIG. 2). For clarity, the front of the flow system 300 is shown facing up in this figure.

Flow system 300 includes flow chamber 310 extending in the flow direction Y. Flow chamber 310 includes first and second apertures 321, 322 on opposed surfaces of the flow chamber 310, in this view on the top and bottom of the flow chamber 310. However, various aspects are not limited to the top and bottom. Flow chamber 310 is configured to receive a sample flow SM including the microparticulate samples 302, e.g., a carrier fluid 304, upstream (in the −Y direction) of the first and second apertures 321, 322. Flow chamber 310 is also configured to receive a sheath flow SH, e.g., a sheath fluid 2104 (FIG. 21), through the apertures 321, 322. The carrier fluid 304 is an example of the sample flow SM discussed above with reference to FIG. 2. At and downstream of the apertures 321, 322, the sheath flow SH merges with the sample flow SM so that the carrier fluid 304 is pressed above and below by the sheath flow SH. In an example, the inflow pressure of the sample flow SM is higher than the inflow pressure of the sheath flow SH (carrier fluid 304). This pressure differential, together with the geometry of flow chamber 310, causes microparticulate samples 302, which are randomly distributed in carrier flow 304 upon entry to flow chamber 310, to be aligned and flow in the hydrodynamically planar flow 305 within the flow chamber 310.

In hydrodynamically planar flow 305, referred to herein as a "hydrodynamically planar flow" or "substantially hydrodynamically planar flow," the carrier fluid 304 and the microparticulate samples 302 therein are substantially confined within a flow that is substantially thinner in the Z direction (thickness T) than in either the X direction (width W) or the Y direction (length). For example, the substantially hydrodynamically planar flow 305 or the sensing area 340 can have respective widths W at least five times the selected thickness T. In various aspects, while carrier fluid 304 is flowing, the thickness, direction, and flow rate can vary due to turbulence, variations in the distribution of microparticulate samples 302 in carrier fluid 304, or chaotic effects. An example hydrodynamically planar flow 305 was simulated and has a thickness of 0.01 mm±5 µm and a center flow velocity of 1.5 m/s±0.1-1.0 m/s. The simulated flow has a velocity close to the sidewalls of about 0.1 m/s. The velocity profile in the channel can be e.g., a parabolic velocity profile. This is consistent with the no-slip boundary condition of fluid mechanics, in which the fluid velocity at the walls is zero, e.g., due to friction and surface interactions. "Planar" refers to the relatively small extent in the Z direction of the flow 305 (or, e.g., flow 2804, FIG. 28) compared to the extent of the flow 305 in the X or Y directions, and does not require any particular thickness.

In the flow cytometry, microparticulate samples 302 to be analyzed are often cells of a living organism. Taking human blood as an example, examples of objects to be observed in the blood include erythrocytes (diameter of 7 to 8 thickness of about 2 µm), leucocytes (neutrophils: diameter of 12 to 15 eosinophils: diameter of 10 to 15 basophils: diameter of 10 to 15 lymphocytes: diameter of 6 to 15 monocytes: diameter of 12 to 18 µm), and blood platelets (diameter of 1 to 4 µm). The flow chamber 310 can be formed with dimensions that permit the microparticulate samples 302 to be directed in the Y-direction into hydrodynamically planar flow 305 and move without overlapping each other within the flow chamber 310. The flow chamber 310 can have a section size (transverse to the flow) of, e.g., 100 µm×100 µm, or 80 µm×120 µm, or on the order of 10 µm on a side. In another example, the thickness T can be at most the average diameter of one cell or other microparticulate sample 302. As discussed below, providing an illumination spot smaller than T permits measuring one microparticulate sample 302 at a time.

Sheath-fluid channel 330 is configured to receive a sheath fluid SH. Sheath-fluid channel 330 includes first and second branches 331, 332 configured to carry the sheath fluid SH into the flow chamber 310 through the first aperture 321 and oriented in substantially opposite directions at the first aperture 321. In an example, first and second branches 331, 332 have axes, e.g., centerlines, substantially parallel and within ±100 µm of each other at the first aperture 321, and likewise second and third branches 333, 334 at second aperture 322 (discussed below). In the example shown, branches 331, 332 join at the upper, first aperture 321 in the flow chamber 310. As indicated, sheath fluid SH is flowing left-to-right in branch 331 and right-to-left in branch 332. As a result, sheath fluid SH from both branches 331, 332 flows through aperture 321 into flow chamber 310. As used herein, the term "substantially opposite directions" refers to directions of flow branches or other flow passages such that a hypothetical flow would turn through less than about 15° (or less than 15°) upon passage from one branch or flow passage to a substantially opposite branch or flow passage. In an example, flow from, e.g., first branch 331 into second branch 332 would turn through less than about 15° (or less than 15°) while passing from first branch 331, so first branch 331 and second branch 332 are substantially opposite. Specifically, in some examples, sheath-fluid channel 330 can include first and second branches 331, 332, each of the first and second branches 331, 332 configured to carry the sheath fluid into the flow chamber 310 through the first aperture 321 and having orientations separated by less than about 15° (or less than 15°) at the first aperture 321. In some examples, first and second branches 331, 332 have respective longitudinal axes, and the respective longitudinal axes have a relative angle between them of less than about 15° (or less than 15°) at the first aperture.

Sheath-fluid channel 330 also includes third and fourth branches 333, 334 configured to carry the sheath fluid SH into the flow chamber 310 through the lower, second aperture 322 and oriented in substantially opposite directions at the second aperture 322. Similarly to branches 331, 332, sheath fluid SH is flowing left-to-right in branch 333 and right-to-left in branch 334. Sheath fluid SH thus flows from branches 333, 334 through aperture 322 into flow chamber 310. The sheath-fluid flow SH through apertures 321, 322 provides hydrodynamically planar flow 305, as discussed below, e.g., with reference to FIG. 9C. Accordingly, the illustrated example flow system 300 includes a plurality of layers. The first and second branches 331, 332 are arranged in a first one of the layers, and the third and fourth branches 333, 334 are arranged in a second, different one of the layers. Other configurations including more layers or fewer layers, or no layers (e.g., having plastic tubing in branches 331, 332, 333, 334) can also or alternatively be used. Specifically, in some examples, sheath-fluid channel 330 can include third and fourth branches 333, 334, each of the third and fourth branches 333, 334 configured to carry the sheath fluid into the flow chamber 310 through the second aperture 322 and having orientations separated by less than about 15° (or less than 15°) at the second aperture 322. In some examples, third and fourth branches 333, 334 have respective longitudinal axes, and the respective longitudinal axes have a relative angle between them of less than about 15° (or less than 15°) at the first aperture.

In various aspects such as that shown, the first and second apertures 321, 322 are substantially directly opposed, having centerlines substantially at a same position along the flow direction Y, even if those centerlines are offset in X. In other aspects, the first and second apertures 321, 322, e.g., the centerlines thereof, are offset, e.g., by at most 100 µm from each other, or by at most half of the width of the branches 331, 332, 333, 334, along the flow direction Y. Either aperture 321, 322 can be offset either upstream (−Y) or downstream (+Y) of the other aperture 322, 321. Other aspects with larger offsets are discussed below with reference to FIGS. 13 and 14.

The apertures 321, 322 can pass through respective, opposed walls of the flow chamber 310. In some examples, flow chamber 310 is formed including walls, e.g., the top and bottom walls in FIG. 3, and the apertures 321, 322 are formed in or through the walls. In other examples, such as discussed below with reference to at least, e.g., FIGS. 27, 29B, and 32B, the flow chamber 310 is formed by affixing layers having respective patterns etched or otherwise formed into them. In some examples, apertures 321 or 322 represent locations in which etched-out patterns of a sample-chamber layer and an adjacent layer are adjacent. Such apertures are still considered to be through walls of the flow chamber as noted herein.

Irradiation optical system 2 produces electromagnetic radiation 399, e.g., light L (FIG. 1). The electromagnetic radiation 399, as shown, travels at least partly along the +Z direction. Accordingly, the +Z direction is an irradiation direction, in this example. In some examples, as noted herein, the flow system is configured to at least partly transmit electromagnetic radiation traveling substantially along an irradiation direction. Irradiation optical system 2 scans the produced electromagnetic radiation 399 back and forth, e.g., in the +X and −X directions. This is discussed below with reference to FIGS. 4-7. The electromagnetic radiation 399 is scanned back and forth in X while the microparticulate samples 302 move in the +Y direction. This permits raster-scanning one or more microparticulate sample(s) 302.

Still referring to FIG. 3, in various aspects, the flow chamber 310 is substantially transparent to a selected wavelength of the electromagnetic radiation 399 in a sensing area 340 downstream of the first and second apertures 321, 322 along the flow direction Y. In this way, electromagnetic radiation 399 (e.g., light L, FIG. 1) (e.g., traveling in or near the +Z direction) can pass through the hydrodynamically planar flow 305 (e.g., extending in the X-Y plane) so that L_T-FS and L_T-SS (both FIG. 2) can be detected outside flow cell 1 (FIG. 2). In some examples, with respect to an irradiation direction of +Z, the X-Y plane defines lateral dimensions. References herein to "lateral" can refer to ±X or ±Y unless otherwise specified. References herein to "longitudinal" can refer to ±Y direction unless otherwise specified. In some examples, lateral or longitudinal offsets can be in a plane substantially normal to the irradiation direction (i.e., to which the irradiation direction is substantially normal).

In various aspects, the flow rate of the liquid within the flow chamber 310 shows a change that the sample flow SM (carrier fluid 304) positioned at the center of the flow chamber 310 is fastest and the sample flow SM becomes slower toward the wall surface of the flow chamber 310. Moreover, the sheath flow SH is faster near the sample flow SM and slower toward the walls of flow chamber 310 on which are located apertures 321, 322. As a result, the microparticulate samples 302 which move within the flow chamber 310 move in the vicinity of the center of the section of the flow chamber 310 in the Z direction so that the respective center-of-gravity positions (in X, Y, Z) of microparticulate samples 302 are positioned substantially within the sample flow SM. Accordingly, even when the section size of the flow chamber 310 is larger than that of each microparticulate sample 302, the plurality of microparticulate samples 302 can be aligned and move in a flow direction (Y-direction in FIGS. 2C and 2D) without overlapping with each other in the section of the flow chamber 310. Moreover, when the thickness T of the hydrodynamically planar flow 305 is comparable to the size of the microparticulate samples, friction within the carrier fluid 304 and the sheath flow SH tends to space the microparticulate samples 302 apart transverse to the direction of transport (e.g., along the X axis). This advantageously provides measurement of the microparticulate sample 302 with reduced probability of "coincidences," events in which two microparticulate samples 302 are erroneously detected as one microparticulate sample 302. An example flow velocity pattern is discussed below with reference to FIG. 21.

In some examples, providing sheath fluid via branches 331, 332, 333, and 334 can provide a smooth, symmetric hydrodynamically planar flow, or a uniform pressure flow. In some examples, flow chamber 310 is about 80 µm wide.

FIG. 4 is a front view showing scanning of an example microparticulate sample 302 flowing through the flow chamber 310 and the sensing area 340. For clarity, only a portion of the flow chamber 310 is shown. In this example aspect, the microparticulate samples 302 flow at a certain rate within the flow chamber 310. In this example aspect, the flow rate of the microparticulate samples 302 is 1 m/s. The flow rate of 1 m/s is substantially equal to a typical flow rate of blood in blood vessels (excluding peripheral capillaries) of a human body. Accordingly, when human blood cells are used as the microparticulate samples, the cells can be observed in the same state as in blood vessels.

In an example, the irradiation optical system 2 (FIG. 3) irradiates the microparticulate sample 302 (or other object) in the flow chamber 310 with incident light L in an irradiation spot, e.g., smaller than the microparticulate sample 302, or smaller than the thickness T (FIG. 3). The irradiation optical system 2 scans an irradiation position of the irradiation spot substantially in a direction X perpendicular to the direction Y of flow of fluid SM, SH in the flow chamber 310. In doing so, the irradiation optical system 2 scans the irradiation position through an irradiation volume, e.g., a volume the size of the irradiation spot swept along a scanning path 63. Scanning path 63 is shown with reference to microparticulate sample 302. While the irradiation spot is following scanning path 63, microparticulate sample 302 is moving in the Y direction. The extent of scanning path 63 along the Y axis results from this flow. In various aspects, the irradiation optical system 2 substantially does not scan the irradiation position in the Y direction.

In various aspects, the flow chamber 310 is shaped so that only one of the microparticulate samples 302 can be irradiated at one time. This advantageously provides measurement of the microparticulate sample 302 without concern for "coincidences," events in which two microparticulate samples 302 are erroneously detected as one microparticulate sample 302. Using a hydrodynamically planar flow 305 can advantageously permit measuring multiple microparticulate samples 302 on each scan of the irradiation spot without concern for coincidences. For example, the flow chamber can be shaped so that the hydrodynamically planar flow is not substantially thicker than the cells or other objects being measured. In this way, the hydrodynamically planar flow distributes the objects so that no two overlap in the direction of travel of the electromagnetic radiation from irradiation optical system 2, e.g., as shown in FIG. 3.

In an example, the frequency for laser scanning is 1 MHz. The flow rate of the microparticulate samples 302 is 1 m/s. Therefore, the laser light completes one cycle in the X-direction (across the microparticulate sample 302 and back) while the microparticulate samples 302 move by 1 μm in the Y-direction. In FIG. 4, scanning path 63 shows the effect of scanning the irradiation spot in the X-direction while moving the microparticulate sample 302 in the Y-direction. The irradiation spot passes (e.g., is rasterized) over the microparticulate sample 302 to successively and individually irradiate many points (illustrated grid cells) or structures within the microparticulate sample 302. Data can be collected when the irradiation spot is moving in one direction (e.g., +X or −X) or when the irradiation spot is moving in both directions. The irradiation spot can move continuously (e.g., as does a laser scanned by a galvanometer scanner), in a step-and-repeat matter, or in any combination of those movement modes; the term "moving" applies to any of these unless otherwise indicated. Various grid types can be used for the two-dimensional data, e.g., rectangular, triangular, or hexagonal grids. In general, resultant-light data can be arranged in a two-dimensional image according to any tiling of the plane.

Various aspects advantageously provide particle flows with constant velocity on the Y-axis. Therefore, with only X-axis scanning, a two-dimensional image can be produced. This is unlike laser scanning confocal microscopes (e.g., the ZEISS LSM 710), in which a stationary sample is rasterized with a two-axis scanning device such as an X-Y galvanomirror. Two-axis scanners require significantly more moving parts and are more mechanically complex than one-axis scanners. Using a one-axis scanner advantageously provides simpler, more reliable construction.

Additionally, using hydrodynamically planar flow 305 permits measuring large numbers of microparticulate samples 302 in quick succession or simultaneously. Laser-scanning confocal microscopes require samples to be prepared, e.g., on slides, and the focal point of the microscope to be moved to focus on the samples. Various aspects described herein do not require these steps, and produce two-dimensional data without them. In various aspects, the scanning frequency in the X-direction can be set to be equal to or higher than 1 MHz, which alleviates prior limitations on the movement rate of the microparticulate samples 302 and permits increasing the flow rate of the sample flow SM to correspond to or exceed the blood flow rate of a human (or animal) body. This advantageously permits increasing throughput or measuring microparticulate samples 302 in similar fluidic conditions to those such microparticulate samples 302 might encounter in the bloodstream.

For example, when the microparticulate samples 302 are neutrophils (diameter of 12 to 15 μm), which are one kind of leucocytes, the neutrophils can be scanned at about 12 to 15 X-direction cycles per microparticulate sample 302 (e.g., scanning path 63). In this case, in the about 12 to 15 cycles during which the neutrophils are scanned, the light intensities of the transmitted light and of the forward-scattered light detected by the detection optical system 3 (FIG. 1) vary. For example, when the irradiation spot of the laser light is located on or within a neutrophil, the intensity of the laser light decreases and the intensity of the forward-scattered light increases due to reflection, scattering, absorption, or the like by the neutrophil. On the other hand, when the irradiation spot of the laser light deviates from (does not irradiate) any neutrophil, the laser light is not reflected, scattered, and absorbed by a neutrophil, so that the intensity of the transmitted light increases and the intensity of the forward-scattered light decreases compared to when the irradiation spot is located on or within a neutrophil. If data are collected only while scanning in one direction, 12 to 15 X-cycles correspond to about 12 to 15 rows of data. If data are collected while scanning in both +X and −X directions, 12 to 15 X-cycles correspond to about 24 to 30 rows of data. Neutrophils can be scanned at about 10 to 15 X-direction cycles per microparticulate sample 302, or about 20 to 30 rows of data in bidirectional-scanning configurations.

Figure 5A:
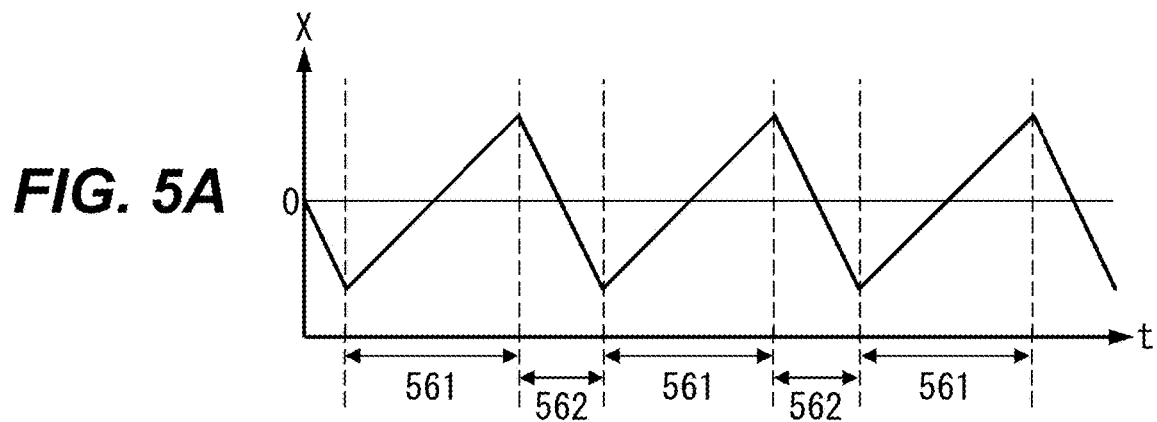
FIG. 5A is a graph showing an example scanning position of an irradiation spot over time.
Figure 5B:
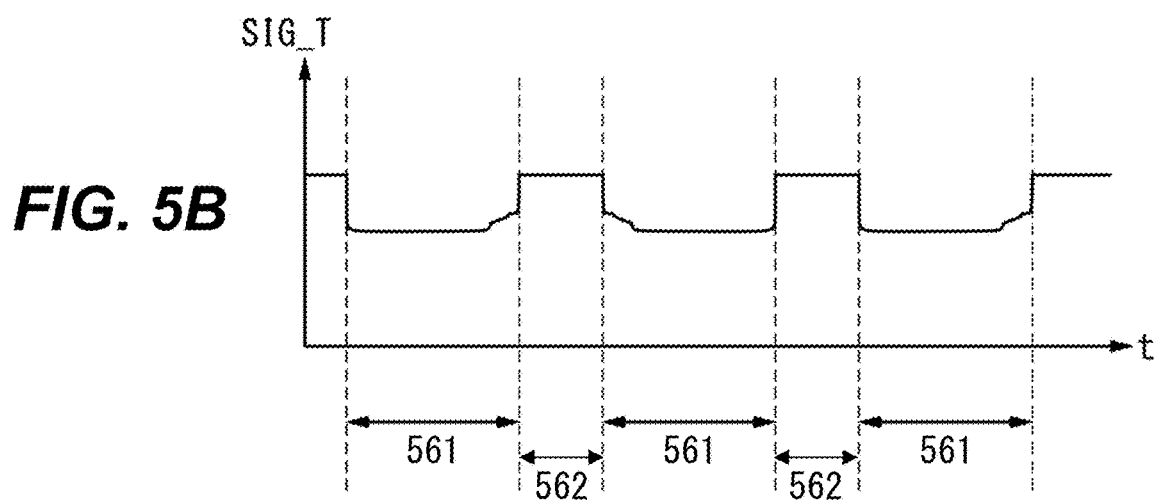
FIG. 5B is a graph showing an intensity of a detection signal that is detected by a control unit 5 in the example of FIG. 5A.

FIG. 5A is a graph showing an example scanning position X of an irradiation spot over time, first increasing, then decreasing as the irradiation spot sweeps back and forth. FIG. 5B is a graph on the same time scale showing an intensity of a detection signal SIG_T that is detected by a control unit 5 in the example shown in FIG. 5A. FIGS. 5A and 5B show simulated results, and the horizontal axis represents time (t). Ranges 561 represent the time the irradiation spot is in or on microparticulate sample 302. As shown in FIG. 5B, when the spot of the laser light is scanned in the X-axis direction and the spot of the laser light is located on each microparticulate sample 302 (in ranges 561), the level of the detection signal SIG_T decreases compared to its level when outside microparticulate sample 302 (outside ranges 561). The level of SIG_T can alternatively increase when the spot is located on the microparticulate sample 302 compared to its level when outside microparticulate sample 302 (outside ranges 561). Ranges 562 show times when, e.g., the spot is located outside the microparticulate sample 302, or when the spot is disabled.

The example scanning position shown in FIG. 5A illustrates a sawtooth control profile, in which the laser beam deflection returns quickly to a low value of X between passes across the cell. In sawtooth examples, ranges 562 represent times when, e.g., a laser providing the spot is deactivated, or measured data are ignored (gated out). Triangular control profiles that have substantially equal speed in both directions (increasing X and decreasing X) can also or alternatively be used, as can other control profiles (e.g., sinusoidal, trapezoidal). In some triangular-profile examples, ranges 562 represent times when the spot is outside microparticulate sample 302. Some aspects using sawtooth scanning can advantageously provide reduced hysteresis compared to some aspects using triangle scanning, since measurements are only taken in one direction of laser movement with sawtooth scanning. Example scanning control profiles useful with various aspects are cathode-ray tube (CRT) horizontal-scan profiles, e.g., for television, and electron microscope lateral scan profiles.

The ramp-up to ramp-down ratio (ratio of the width of ranges 561 to the width between ranges 561) can be, e.g., 100:0, 99:1, or other ratios down to 90:10 in various aspects. As such, the region widths shown here are exaggerated for clarity and are not limiting. Moreover, the illustrated direction of scan is not limiting. The scan can exhibit increasing X or decreasing X in ranges 561.

In various aspects, the flow rate of the microparticulate samples 302 within the flow chamber 310 is set by the control unit 5, e.g., by providing a control signal to a flow-inducing device such as a pump. In other aspects, the control unit 5 receives an indication of the flow rate from an external flow controller (not shown). Similarly, the control unit 5 can operate the irradiation optical system 2 to control the intensity of the incident light, or can receive information on the intensity of the light from an external light controller (not shown). In any of these aspects, the control unit 5 can obtain a two-dimensional distribution of the light intensity of each neutrophil from the information on the light intensity and the flow rate.

In various aspects, the flow velocity, spot size, and X-axis deflection frequency parameters are set to (1) provide an excitation intensity level of a fluorescent dye marker in a desired area of the microparticulate sample 302 above a threshold; and (2) provide a desired resolution, bit depth, and precision of the scan image. In various aspects, the spot size is selected, then flow velocity and scan frequency are controlled. An example is a spot with a full-width at half-maximum (FWHM) diameter of 2 μm, a deflection frequency of 1 MHz, and a flow rate of 1 m/s. This example provides 1 μm scan vertical resolution with >½ intensity of a Gaussian spot profile. A 2 μm FWHM advantageously permits measuring data from 10 μm particles such as blood cells with effective focal depth. In another example, the spot size is 0.5 μm, which provides higher resolution. The flow speed can be ¼ m/s, or the scan frequency can be 4 MHz, or a combination. Generally, flow speed can be reduced or scan frequency can be increased by the same ratio as the spot size is decreased, or vice versa (increase spot size and increase flow speed or decrease scan frequency). Flow speed can be selected to balance desired resolution and throughput. Faster flow speed provides higher throughput and lower vertical resolution. Slower flow speed improves vertical image resolution with lower throughput. The horizontal resolution is determined by the scanning frequency and sampling frequency (e.g., number of data samples per scan). These parameters can be selected to advantageously permit measuring absolute particle size and shape. Prior flow cytometers do not provide the ability to make such measurements.

FIG. 6 is a block diagram schematically showing an example configuration of an irradiation optical system 2. The irradiation optical system 2 includes a laser source 21, a collimator 22, a deflector 23, and an objective lens 24. The laser source 21 can produce laser light having wavelengths of 405 nm, 488 nm, and 650 nm, for example. However, the light wavelengths are not limited to these examples. The laser light output from the laser source 21 is converted into substantially parallel light beams by the collimator 22. Note that the flow chamber 310 is shown on the plane of FIG. 6 for convenience of explanation, and laser light L is shown as scanning in and out of the plane of the figure. However, this is not limiting and other relative orientations of the irradiation optical system 2 and the flow cell 1 can be used. In an example, astigmatic focusing is used to focus the laser light L on the flow chamber 310.

The deflector 23 is or includes a light deflector that deflects the direction of the optical axis of the laser light L passing through the collimator 22. In this example aspect, the deflector 23 is configured to scan the laser light L in a direction substantially parallel to the section of the flow chamber 310 of the flow cell 1 (that is, in the X-direction orthogonal to the flow direction Y of the flow chamber 310). In this case, the deflector 23 scans the flow chamber 310 in the X-direction (e.g., along scanning path 63, FIG. 4) with a scanning frequency of 1 MHz or higher. To achieve such high-speed scanning, a high-frequency deflection device such as an acoustic optical deflector (AOD), an electro-optic deflector (EOD), or acoustic optic modulator (AOM) can be used as or in the deflector 23. AODs, EODs, and AOMs make use of the interaction of light with materials whose interaction with electromagnetic radiation 399 can be modified by applied force (AODs or AOMs) or electric field (EODs). The incident light can also be scanned using a rotating polygon such as those used in laser electrophotographic printers. The incident light can also be scanned using a microelectromechanical system (MEMS) micro-mirror with an electronically-controllable angle.

As shown in FIG. 6, the laser light L passing through the deflector 23 is caused to converge, e.g., at the diffraction limit, on the flow chamber 310 of the flow cell 1 by the objective lens 24. In an example, the laser light is caused to converge to a laser spot with a half-value breadth (FWHM) of about 2.0 Hereinafter, the size of the laser irradiation spot is defined as an area from the center of the spot to the position where the light intensity is a half of that at the center of the spot. The microparticulate samples 302 are aligned in the flow chamber 310 due to the properties of the flow chamber 310 described above, and specifically hydrodynamically planar flow 305 (FIG. 3). Therefore, the focal point of the laser light is configured such that the path to be scanned by the irradiation spot passes through the center of the micro flow channel, which facilitates irradiation of the laser light that is caused to converge, e.g., at the diffraction limit, on the microparticulate samples 302 (FIG. 3) flowing through the flow chamber 310. Note that in this example, the deflection angle of the laser light L by the deflector 23 is small. Accordingly, even when the laser light L is incident through a sheet 810 (e.g., a transparent sheet; discussed below with reference to FIGS. 8A-8C) of the flow cell 1, effects such as a displacement of the focal point position due to refraction can be negligibly small.

In various aspects, irradiation optical system 2 is adapted to scan an irradiation spot, i.e., move the irradiation location, across the sensing area 340 in a scan direction (e.g., X) different from a direction of the transport (e.g., Y) of the microparticulate samples 302. The irradiation spot can be, e.g., smaller than the selected thickness T (FIG. 3) or smaller than half the selected thickness T. The scan direction and the transport direction can be substantially perpendicular, or can be set at an angle not an integer multiple of 90°.

Another example configuration of irradiation optical system 2 includes a quarter-wave ("λ/4") plate (not shown). λ, is the wavelength of the light L from the laser source 21. The λ/4 plate is placed in the light path of the laser light L. For example, the λ/4 plate can be interposed between the deflector 23 and the objective lens 24. The λ/4 plate converts linearly polarized light into circularly polarized light. Other optical structures for providing circularly-polarized light can also or alternatively be used. Certain components within live cells generally show polarization characteristics, as do some protein formations. For example, some objects vary in optical response as a function of polarization angle of linearly-polarized light incident on those objects. The range of that variation can increase as the strength of dipole moments in the objects increases. In an example, migrating cells have distinct characteristics at their leading and trailing edges, e.g., a higher activity of actin polymerization at the leading edge than at the trailing edge. As a result, the optical response of a cell can be different at the leading edge than at the trailing edge. Therefore, polarization microscopes can be useful for biological observation. In order to detect polarization characteristics of a material in a microparticulate sample, the incident light beam is preferably symmetric for all directions. Circularly-polarized beams advantageously exhibit this property. However, many deflectors 23, such as many AODs and EODs, operate with linear polarization of the incident beam, typically perpendicular polarization. Inserting a λ/4 plate to convert from linear to circular polarization permits using an AOD or EOD and preserving the advantageous biological properties of circularly-polarized light. As discussed above with reference to FIG. 1, detecting p and s polarization components permits determining polarization characteristics of microparticulate samples 302.

Various aspects use irradiation spots smaller than a cell, or much smaller than a cell. This advantageously permits determining the internal structure of a cell, e.g., as discussed below with reference to FIG. 7. Various aspects measure microparticulate samples 302 at a high resolution, e.g., more than five points across a microparticulate sample, or more than ten points, or more than 100 points. This permits producing "image maps" of the microparticulate samples 302. These image maps include resultant-light data at various points throughout the microparticulate sample, e.g., as discussed below with reference to FIG. 23. The image map can include details of the organelle-related fluorescence or the locations of selected components of an object. A human-visible image can be determined, e.g., by processor 2486 (FIG. 24) as a representation of all or part of the image map. A 2-D image map advantageously provides much more detail than a conventional flow cytometer. Various aspects are useful for hematological applications such as counting and discriminating blood cells of various types. Compared to conventional COULTER COUNTERS, various aspects of image flow cytometers herein can determine many more details about each cell measured.

Figure 7:
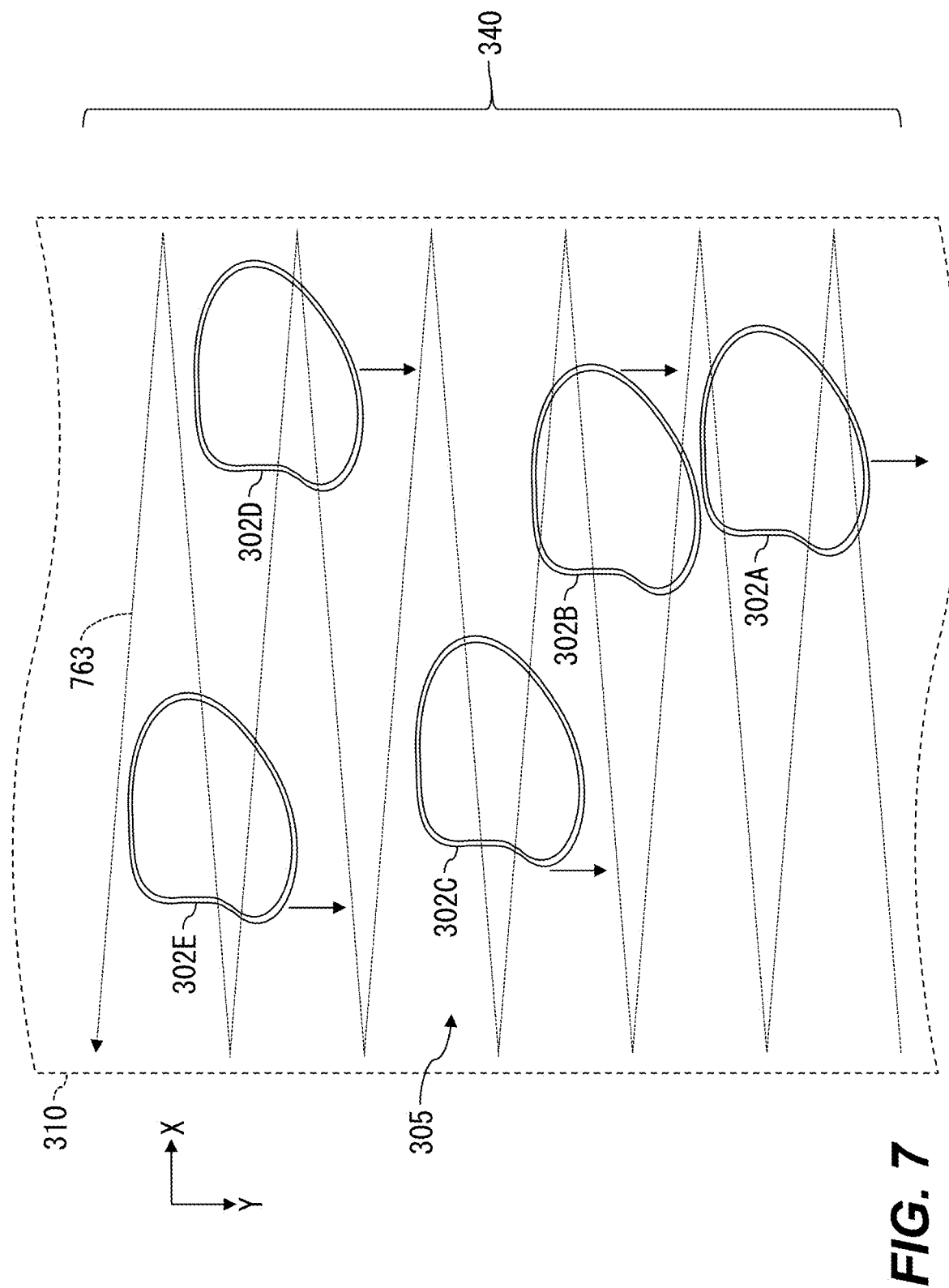
FIG. 7 is a front view showing scanning of several example microparticulate samples flowing through the flow chamber and the sensing area.

FIG. 7 is a front view showing scanning of several example microparticulate samples 302A, 302B, 302C, 302D, 302E (e.g., biological cells) flowing through the flow chamber 310 and the sensing area 340. As shown, the microparticulate samples 302A, 302B, 302C, 302D, 302E can be displaced laterally from each other along the X or Y axes in the hydrodynamically planar flow 305.

As shown, scanning path 763 passes over or through microparticulate samples 302A, 302B, 302C, 302D, 302E. On a single traverse of the irradiation spot across the range of spot travel on the X axis, the irradiation spot can encounter no microparticulate samples, one microparticulate sample (e.g., 302C), or more than one microparticulate sample (e.g., 302B, 302C). The scanning path 763 shown is example and is not limiting. For example, the pitch of scanning path 763 in the Y direction can be tighter or looser than shown.

FIG. 8A is a front view of components of a flow system 300 (FIG. 3) according to various aspects. FIG. 8B is an exploded plan along the line VIIIB-VIIIB in FIG. 8A and FIG. 8C is an exploded plan along the line VIIIC-VIIIC in FIG. 8A.

Flow system 800 includes flow cell 801. Flow cell 801 includes first substantially planar sheet 810, second substantially planar sheet 820, and third substantially planar sheet 830 affixed together in that order (e.g., sheet 810 to sheet 820, and sheet 820 to sheet 830, in a stack). The individual sheets 810, 820, 830 are shown in FIGS. 8B, 8C. In various aspects, sheets 810, 820, 830 are made from resin, glass, quartz, or another material through which the laser light L (FIG. 1) or other electromagnetic radiation 399 (FIG. 3) can be transmitted. Each of the first and third sheets 810, 830 can be, e.g., approximately 1 mm thick. Second sheet 820 can be, e.g., approximately 50 μm thick or approximately 100 μm (0.1 mm) thick. The sheets 810, 820, 830 can be affixed together by, e.g., thermal bonding.

Referring to FIG. 8B, the first sheet 810 includes one or more cavities (graphically represented as rectangular recesses) defining the first and second branches 331, 332. Second sheet 820 includes one or more cavities defining the flow chamber 310. Third sheet 830 includes one or more cavities defining the third and fourth branches 333, 334. In the example shown, these cavities are recesses, grooves, or voids in sheets 810, 820, 830. Each of the sheets 810, 820, 830 can be formed of a material substantially impermeable to both the carrier fluid 304 and the sheath fluid SH. Alternatively, each of the sheets 810, 820, 830 can include, around the respective one or more cavities, a material substantially impermeable to both the carrier fluid 304 and the sheath fluid SH.

First sheet 810 also includes a first cavity 831 (FIG. 8C) fluidically connected to the first and second branches 331, 332 to receive the sheath fluid (sheath flow SH, FIG. 2). Third sheet 830 includes a third cavity 833 (FIG. 8C) fluidically connected to the third and fourth branches 333, 334 to receive the sheath fluid (sheath flow SH, FIG. 2).

In various aspects, cavities 831, 833 are fluidically disconnected, and each is supplied with sheath fluid SH individually. In these examples, e.g., separate inlets IN1 and IN3 (both FIG. 2) are both used. In other aspects, second sheet 820 includes a fourth cavity 834 at least partially overlaying, and fluidically connected to, each of the first cavity 831 and the third cavity 833. This permits adding sheath fluid SH to either cavity 831 or cavity 833 and filling all four branches 331, 332, 333, 334. In various of these aspects, a first one of the cavities 831, 833 reaches the surface of the corresponding sheet 810, 830, and the other of the cavities 831, 833 does not reaches the surface of the corresponding sheet 810, 830. In this way, sheath fluid SH added to the first one of the cavities 831, 833 does not flow out the other of the cavities 831, 833. In these examples, e.g., only one of the inlets IN1, IN3 (FIG. 2) is used. For example, inlet IN1 can be used when sheath fluid SH is provided to cavity 831, and inlet IN3 can be used when sheath fluid SH is provided to cavity 833. This configuration is similar to the configuration using cavity 812 discussed below. FIG. 8C shows an alternative embodiment in which cavities 831, 833 both reach the surface of their respective sheets 810, 830. In this configuration, sheath fluid SH can be supplied directly to each cavity 831, 833. This can permit the use of a higher flow rate of sheath fluid SH.

Second sheet 820 and at least one of the first and third sheets 810, 830 include respective second cavities 812 fluidically connected to the flow chamber 310 to receive the carrier fluid 304 (sample flow SM). In the example shown in FIG. 8B, sheet 810 has a cavity 812 and sheet 830 does not have a corresponding cavity. Carrier fluid 304 is supplied through cavity 812, e.g., via inlet IN2 (FIG. 2). Cavity 812 in sheet 810 is fluidically connected to the flow chamber 310, e.g., directly or via a second cavity (not shown) in sheet 820. In various aspects, the second cavity in second sheet 820 is part of flow chamber 310 or is an inline extension of flow chamber 310.

Referring back to FIG. 8A, branches 331, 332, 333, 334 meet flow chamber 310 at apertures 321, 322, e.g., as discussed herein with reference to FIGS. 3, 9C. The carrier fluid 304 flows in the resulting hydrodynamically planar flow 305 along the flow chamber 310 through the sensing area 340 to outlet 814. At outlet 814, the fluid (e.g., flows SM, SH) in flow chamber 310 can be collected or processed, e.g., as in conventional flow cytometers.

In the example shown, branches 331, 332, 333, 334 begin at cavities 831, 833, 834, and branches 331, 333 diverge from branches 332, 334. Branches 331, 333 extend along flow cell 801 on one side of flow chamber 310, and branches 332, 334 extend along flow cell 801 on the other side of flow chamber 310. Branches 331 and 332 bend towards each other to meet at aperture 321, and likewise branches 333 and 334 at aperture 322. Branches 331, 332 thus enclose a space in sheet 810, and branches 333, 334 enclose a space in sheet 830. Cavity 812 is disposed within the intersection of those enclosed spaces, and flow chamber 310 extends out of both enclosed spaces in sheet 820.

The configuration shown here can advantageously provide reduced cost of manufacturing, since the same or symmetrical tooling can be used for sheets 810, 830. In an example, the branches 331, 332, 333, 334 are manufactured using a mask process for accurate, repeatable results. In the example shown, along an irradiation direction of the flow system, e.g., the Z axis, first branch 331 at least partly overlays third branch 333 in a first region 861 spaced apart from the first and second apertures 321, 322. Second branch 332 at least partly overlays fourth branch 334 in a second region 862 spaced apart away from the first and second apertures 321, 322. FIG. 8B shows that branches 331, 333 are arranged directly across sheet 820 from each other, as are branches 332, 334. However, other configurations (e.g., FIGS. 13, 14) can also be used, e.g., for increased mechanical strength.

In an example, the flow chamber 310 is manufactured as follows. Three channeled substrates are prepared and then bonded using an optical adhesive or other optical contact. The sheath flow channel including branches 333, 334 is tooled into sheet 830, the lower plate. The flow chamber 310 and the through-hole, cavity 834, are formed in sheet 820, e.g., by tooling, drilling, etching, or abrasion as noted above. Sheet 820 is then bonded to sheet 830. The flow chamber 310 including the sample channel is expanded to the correct depth by polishing. The upper plate, sheet 810, is tooled, drilled, or otherwise prepared including the sheath channel (branches 331, 332) and the inlet holes (cavities 831, 812). Sheet 810 is then bonded to sheet 820. Thermal bonding can be used. Measurements can be taken after bonding to determine the accuracy with which the channels and other cavities were aligned.

FIG. 9A is a perspective, and FIG. 9B a front view, of components of a flow system according to various aspects, and specifically of a flow cell 901. FIG. 9C is a section along the line XIX-XIX in FIG. 9B. These figures relate to an example flow cell 901 using three sheets 810, 820, 830. For clarity, the boundaries of flow cell 901 are not explicitly shown in these figures. Cavities 812, 831, 833 are as discussed above with reference to FIGS. 8A-8C.

In various aspects, sample-fluid source 919 is fluidically connected to at least one of the respective second cavities 812 in flow cell 901, e.g., via inlet IN2 (FIG. 2). In this way, sample-fluid source 919 can provide carrier fluid 304 including microparticulate samples 302 (both FIG. 3) to flow chamber 310. In various aspects, sheath-fluid source 939 is fluidically connected to one or both of the first cavity 831 and the third cavity 833, e.g., via inlets IN1, IN3 (both FIG. 2). In this way, sheath-fluid source 939 can provide the sheath flow SH cooperating with the sample flow SM to provide hydrodynamically planar flow 305 (FIG. 3). In various of these aspects, sample-fluid source 919 and sheath-fluid source 939 can include pumps, tubing, or other components used in conventional flow cytometers or fluid-handling systems. In various aspects, the volumetric flow is determined by cross-sectional area of the flow chamber 310 and other cavities, and flow velocity is controlled by fluid pressure. In a simulated example, the sheath flow is 7.5× $10^{-9}$ m$^3$/s and the sample flow is 7.5×$10^{-10}$ m$^3$/s. The simulated center velocity is 1 m/s.

FIGS. 9A and 9B show that branches 331, 332, 333, 334 flow from cavities 831, 833. However, branch 331 does not overlay branch 333, and branch 332 does not overlay branch 334, except in the immediate vicinity of cavities 831, 833 and in the immediate vicinity of apertures 321, 322. This can advantageously provide additional mechanical strength, e.g., additional rigidity, to the flow cell 901.

As shown in the inset of FIG. 9B, one or more of, or each of, the first, second, third, and fourth branches 331, 332, 333, 334 can have a substantially triangular cross-section, e.g., a triangular or truncated triangular cross-section. The flow chamber 310 can have a substantially rectangular (or square) cross-section in the sensing area 340.

FIG. 9C shows a sectional view with arrows indicating the flow of fluid. Sheath fluid flows in branches 331, 332, 333, 334. At apertures 321, 322, the sheath fluid SH passes into flow chamber 310. As a result, hydrodynamically planar flow 305 of carrier fluid 304 is formed (flowing out of the plane of the figure towards the viewer in this section).

FIG. 10A is a front view, FIG. 10B a detail of the front view, FIG. 10C a side view, and FIG. 10D an end view, of components of a flow system according to various aspects, and specifically of a flow cell 1001. This is a configuration similar to that of FIGS. 9A-9C. Cavities 831 or 833 receive sheath fluid SH and supply branches 331, 332, 333, 334. Cavity 812 receives carrier fluid 304 (FIG. 3) and supplies flow chamber 310. As shown in FIG. 10B, branches 331, 332 can meet at a 90° angle at cavities 831, 833, and can follow an arcuate (e.g., circular) path with a radius of 1.75 mm at apertures 321, 322. Arcuate paths described herein can include arcs of circles or ellipses. As shown in FIG. 10C, flow cell 1001 can be 2 mm thick.

FIGS. 11-14 are front views of components of flow systems according to various aspects, and specifically of various configurations of flow cells.

FIG. 11 shows a configuration in which branch 331 overlays branch 332, and branch 333 overlays branch 334, more than in FIG. 10 but less than in FIG. 8A. As shown, the branches 331, 332, 333, 334 follow straight paths at apertures 321, 322. Also as shown, branches 331, 332 (and likewise branches 333, 334) can include angular corners or radiused bends at direction changes.

FIG. 12 shows a configuration with limited branch overlays, similar to FIG. 10, but with branches 331, 332 arranged along arcuate paths at cavities 831, 833 rather than along straight segments as in FIG. 10B. Branches 331, 332 are also arrange along arcuate paths at apertures 321, 322, similar to FIG. 10B. Branches 333, 334 follow straight paths both at cavities 831, 833 and at apertures 321, 322.

FIG. 13 shows a configuration in which none of branches 331, 332, 333, 334 overlays any other of branches 331, 332, 333, 334 except in the immediate vicinity of cavities 831, 833. Aperture 321 is offset from aperture 322 along flow chamber 310, as discussed above with reference to FIG. 3. In this example, aperture 321 is closer to cavity 812 than is aperture 322. However, aperture 322 can alternatively be the aperture closest to cavity 812. Also, in the configuration of FIG. 13, branches 331, 332 extend parallel to branches 333, 334, respectively, in proximity to apertures 331, 332.

Figure 14:
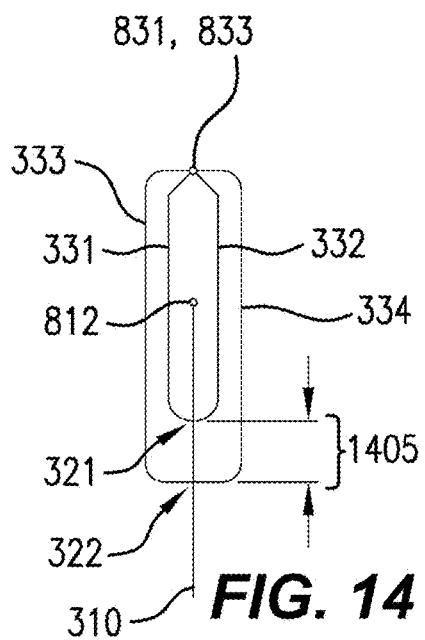

FIG. 14 shows a configuration similar to that of FIG. 13. In FIG. 14, apertures 321, 322 are offset from each other by offset 1405, e.g., 5 mm. Unlike FIG. 13, in FIG. 14, branches 331, 332 are arranged along arcuate paths near aperture 321. Branches 333, 334 are arranged along straight paths near aperture 322.

FIGS. 15, 16, 17, 18, 19, and 20 are elevational sections showing graphical representations of simulated hydrodynamically planar flows 305 in flow chambers 310 according to respective example aspects. The figures relate to various offsets 1405 between first aperture 321 and second aperture 322 (all FIG. 14). The offsets are as given in Table 1, below. In Table 1, positive offsets signify that aperture 322 is between cavity 812 and aperture 321 along flow chamber 310. Negative offsets signify that aperture 321 is between cavity 812 and aperture 322 along flow chamber 310. In these terms, FIG. 14 shows an offset 1405 of −5 mm (negative 5 mm).

TABLE 1

| FIG. | Offset 1405 |
|---|---|
| 15 | +100 μm |
| 16 | +50 μm |
| 17 | ~0 μm |
| 18 | −50 μm |
| 19 | −100 μm |
| 20 | −5 mm |

In FIGS. 15-20, flow velocity of the hydrodynamic planar flow 305 is represented by shading, with faster flows being shown in darker shades. As shown, no offset (FIG. 17) and −50 μm offset (FIG. 18) have the most planar flow. However, other offsets, e.g., −100 μm in FIG. 19, can also provide a reasonably planar flow. The offset 1405 can be selected to balance increased mechanical strength from higher offsets 1405 with improved performance from lower offsets. Different offsets 1405 can be used for different viscosities of sheath fluid SH or carrier fluid 304 (FIG. 3). For laminar flow between 0.1 m/s and 1 m/s, viscosity can be a significant factor providing the planar flow.

Various experiments were conducted using a flow cell similar to that shown in FIGS. 9A-9C having a flow channel 310 (FIG. 9A) with dimensions of 120 μm×80 μm. Hydrodynamically planar flow was observed for a sheath-fluid pressure (SHP) of 100 kPa with sample-fluid pressures (SMP) of 100 kPa, 105 kPa, and 110 kPa. For SHP=100 kPa and SMP=110 kPa, the hydrodynamically planar flow was present adjacent to first and second apertures 321, 322 (FIG. 9A), and 10 mm and 20 mm downstream of first and second apertures 321, 322 along flow chamber 310 (FIG. 9A). Hydrodynamically planar flow was also observed for SHP=50 kPa with SMP=50 kPa, 55 kPa, or 60 kPa; for SHP=20 kPa with SMP=24 kPa; and for SHP=12 kPa with SMP=14 kPa. In the tested configurations, the Reynolds number Re of the sample flow was less than 120.0 for various tested pressures below 140 kPa. Re<120.0 indicates laminar flow. Accordingly, in various aspects, SMP is set substantially equal to SHP times 1.1 or times 1.2. In other aspects, SMP is set below SHP or equal to SHP.

Figure 21:
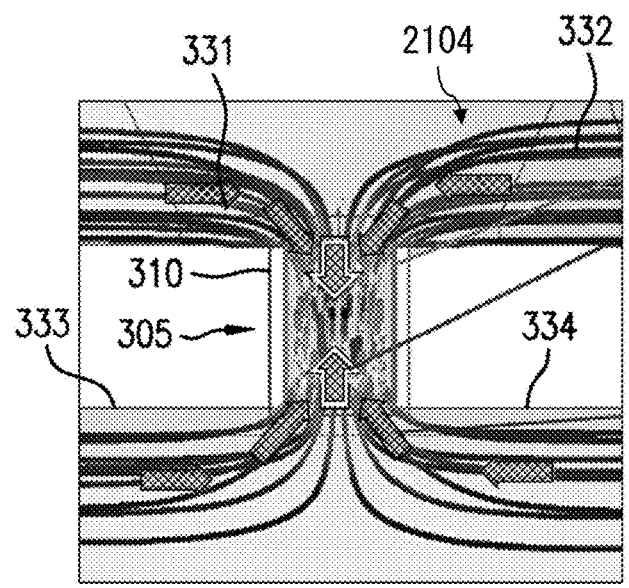
FIG. 21 is a perspective showing a graphical representation of simulated flow in a flow chamber according to an example aspect.
Figure 15:
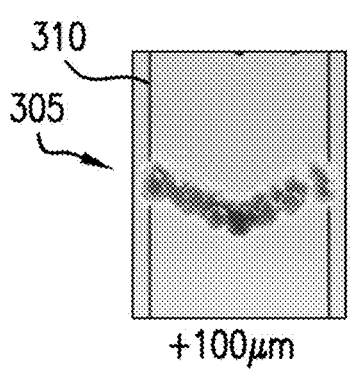
FIGS. 15-20 are cross-sections showing graphical representations of simulated flows in flow chambers according to respective example aspects.
Figure 16:
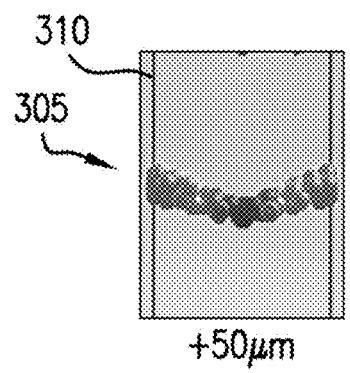
Figure 17:
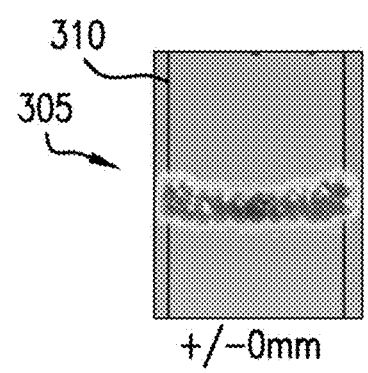
Figure 18:
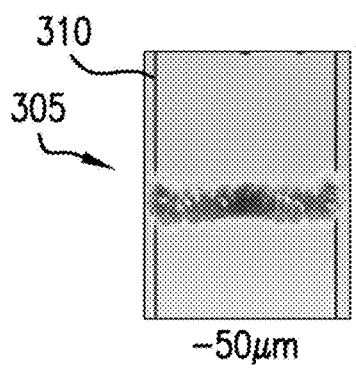
Figure 19:
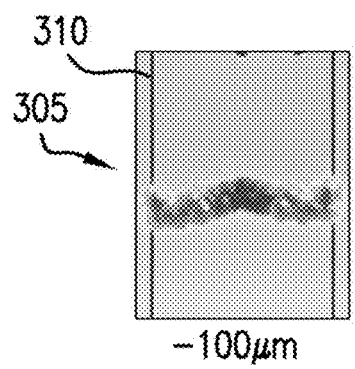
Figure 20:
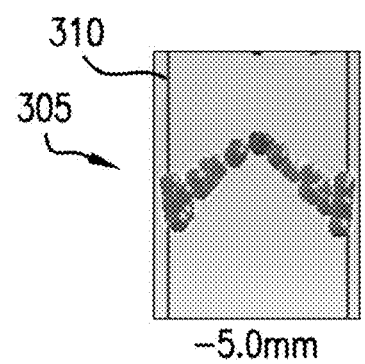

FIG. 21 is a perspective view showing a graphical representation of simulated flow in a flow chamber 310 (FIG. 3) according to an example aspect. Sheath fluid 2104 flows through, and is graphically represented by streamlines shown in, branches 331, 332, 333, and 334. This is discussed above, e.g., with reference to FIG. 9C. When the sheath fluid SH passes through apertures 321, 322 (FIG. 9C), it forms the hydrodynamically planar flow 305 with carrier fluid 304 (FIG. 9C) in flow chamber 310. The resulting flow velocity is represented graphically by the density of hatching, with darker shading representing higher velocity. This can be, e.g., a parabolic velocity profile, with the darkness of shading corresponding to the height of the parabola. Various characteristics of the illustrated simulated flow are discussed above with reference to FIG. 3.

Figure 22:
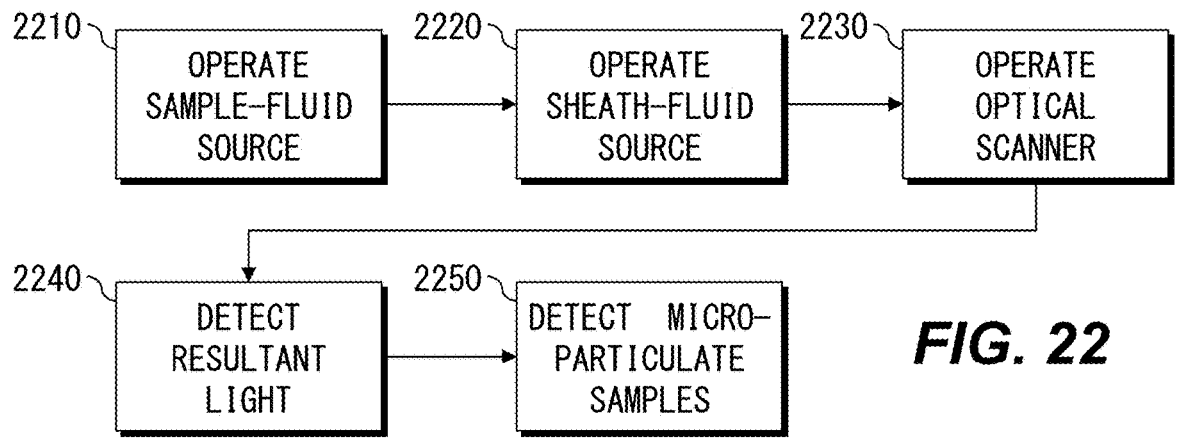
FIG. 22 is a flowchart showing example methods of observing microparticulate samples.

FIG. 22 is a flowchart showing example methods of observing microparticulate samples 302. The steps can be performed in any order except when otherwise specified, or when data from an earlier step is used in a later step. In at least one example, processing begins with step 2210. For clarity of explanation, reference is herein made to various components shown in FIGS. 1-14 that can carry out or participate in the steps of the example method. It should be noted, however, that other components can be used; that is, example method(s) shown in FIG. 22 are not limited to being carried out by the identified components. Various steps herein can be automatically performed using a processor 2486, e.g., in a control unit 5 (FIG. 1).

In step 2210, processor 2486 operates the sample-fluid source 919 (FIG. 9A) to provide carrier fluid 304 including microparticulate samples 302 to flow chamber 310 (all FIG. 3), e.g., via cavity 812 (FIG. 14). Processor 2486 can, e.g., provide a signal on a control line to activate a pump for the carrier fluid 304.

In step 2220, processor 2486 operates the sheath-fluid source 939 (FIG. 9A) to provide sheath fluid SH to branches 331, 332, 333, 334, e.g., via cavities 831, 833 (all FIG. 14). Processor 2486 can, e.g., provide a signal on a control line to activate a pump for the sheath fluid 2104.

In step 2230, processor 2486 operates the optical scanner, e.g., irradiation optical system 2 (FIG. 3) to scan the irradiation spot across the sensing area 340. This irradiates the microparticulate samples 302 with electromagnetic radiation 399 so that resultant light is produced by, in, or from the microparticulate samples 302 or internal structures or components thereof such as organelles or fluorescent dyes.

In step 2240, while scanning, processor 2486 detects a time-varying light intensity of resultant light from microparticulate samples 302 in sensing area 340 (both FIG. 3). Processor 2486 can detect respective time-varying intensities of more than one resultant light, e.g., forward-scattered (L_T-FS, FIG. 1), side-scattered (L_F-SS, FIG. 1), or other fluorescent light.

In step 2250, processor 2486 detects two or more of the microparticulate samples 302 according to the detected time-varying light intensity of the resultant light.

In various configurations described above, the shape of each microparticulate sample 302 can be obtained as a two-dimensional image. Accordingly, specific information such as the size (diameter) and shape (outline) of each microparticulate sample 302 can be obtained from the two-dimensional image. In an example of step 2250, processor 2486 forms the two-dimensional image by arranging a plurality of data values of the detected time-varying resultant-light intensity in a raster grid. Each data value is placed in a grid cell corresponding to the position of the irradiation spot when the data value was measured. Processor 2486 then uses known object-detection algorithms, e.g., thresholding, edge detection (such as Laplace, Sobel, or difference-of-Gaussians), or flood-filling from a seed point, to detect the microparticulate samples 302 in the two-dimensional image.

Further, the classifications of samples to be observed, for example, the type of cells to be used as biological samples, can be discriminated based on size, shape, density, or polarization state of each microparticulate sample, without using a fluorescence spectral analysis. Some prior systems differentiate cell types using, e.g., fluorescent-dyed antibodies. The fluorescent light emitted under laser illumination indicates the type of antibody, and thus the type of cell to which the antibody is bound. However, this requires that a sufficient number of antibodies bind to the cell to produce a detectable amount of fluorescent light. In contrast, in various aspects, cell type can be determined directly. This advantageously reduces the probability of mis-identification of cell type owing to insufficient binding of antibodies. It also permits discriminating between two cell types that have different shapes but that carry the same antigens and thus bind to the same antibodies. Some aspects use fluorescent-dyed antibodies.

Figure 23:
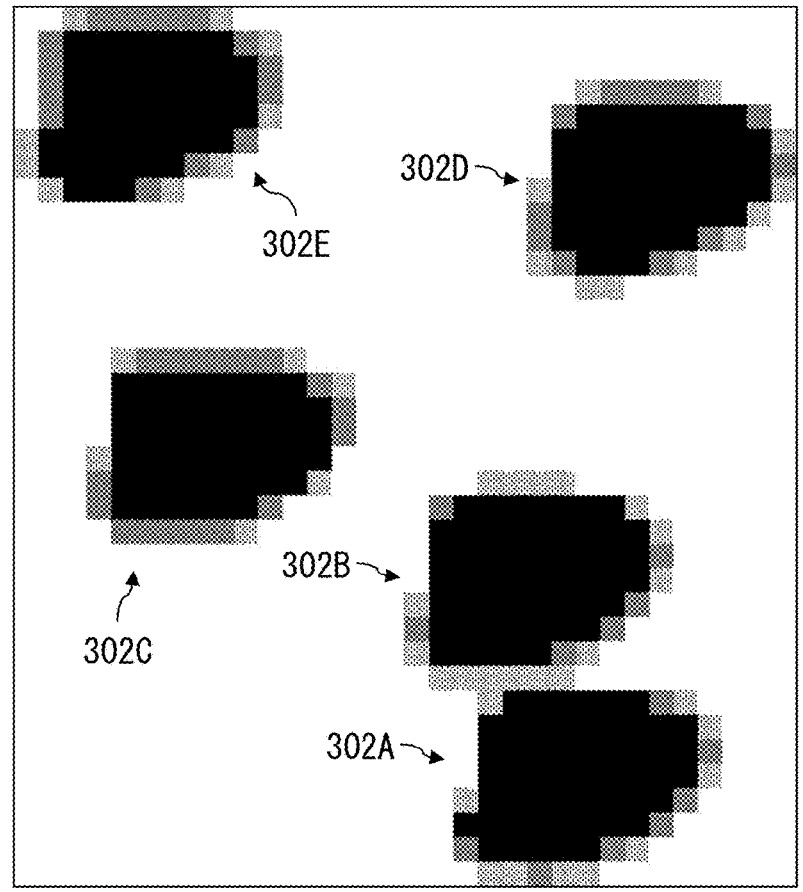
FIG. 23 is an example two-dimensional image corresponding to the example shown in FIG. 7.

FIG. 23 is an example two-dimensional image corresponding to the example shown in FIG. 7. The image is a simulated image with a resolution of 32×36 pixels and a bit depth of 2 bits (i.e., black, white, and two intermediate intensity levels). In this example, darker shading represents intensities corresponding to cells 302A, 302B, 302C, 302D, 302E (FIG. 7).

Figure 24:
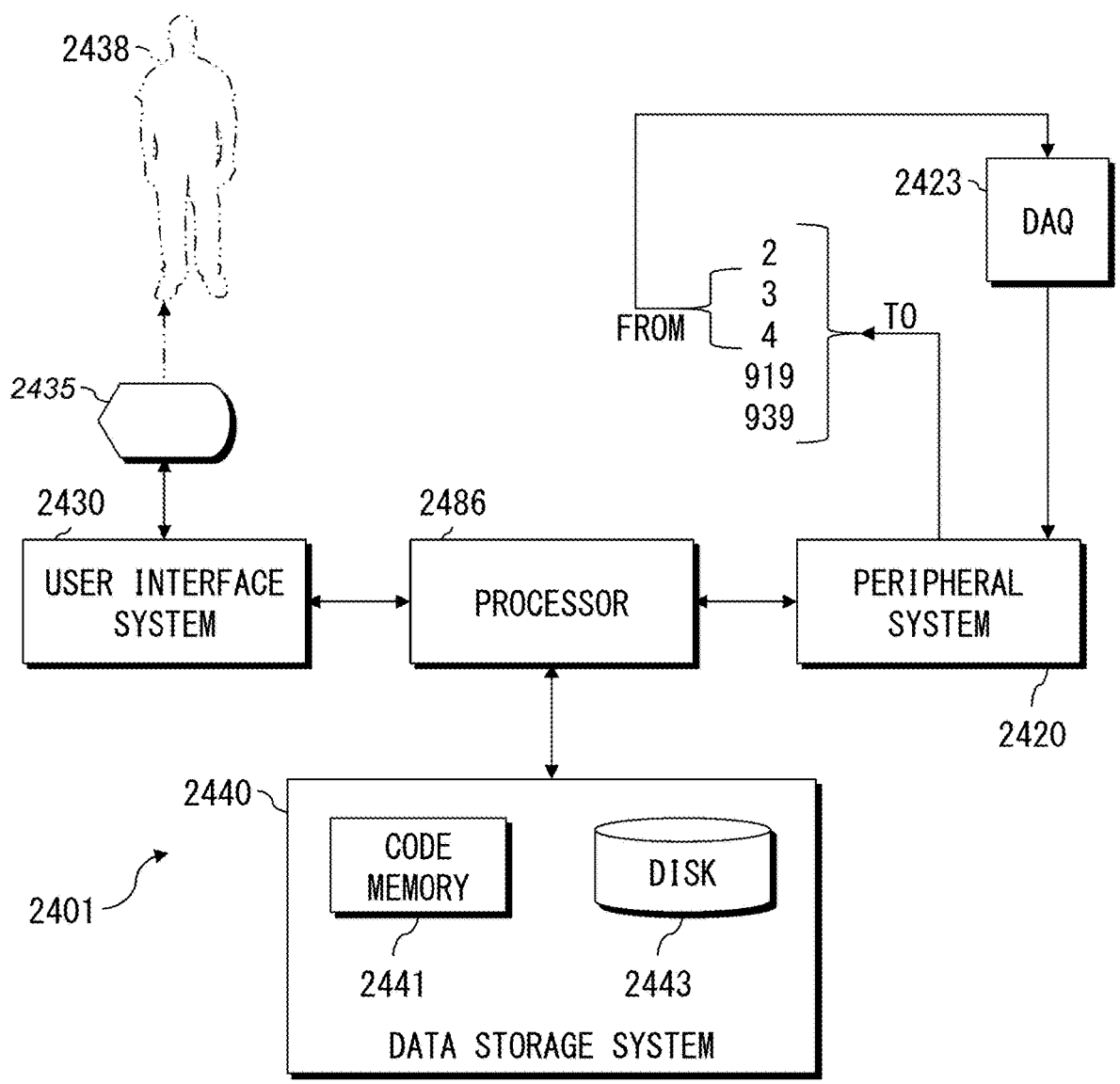
FIG. 24 is a high-level diagram showing components of a data-processing system.

FIG. 24 is a high-level diagram showing the components of an example data-processing system 2401 for analyzing data to detect microparticulate samples 302 and for performing other analyses described herein, and related components. The system 2401 includes a processor 2486, a peripheral system 2420, a user interface system 2430, and a data storage system 2440. The peripheral system 2420, the user interface system 2430 and the data storage system 2440 are communicatively connected to the processor 2486. Processor 2486 can be communicatively connected to a network, e.g., the Internet, to communicate data. The following devices can each include one or more of systems 2486, 2420, 2430, 2440, and can each connect to one or more network(s): devices 2, 3, 4, 5 (FIG. 1) and 21, 23 (FIG. 6). Processor 2486, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Processor 2486 can be embodied in one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

Processor 2486 can implement processes of various aspects described herein. Processor 2486 and related components can, e.g., carry out processes for detecting microparticulate samples 302 or properties thereof, as discussed above with reference to FIG. 22. In an example, the processor 2486 computes a value RD=(SIG_Ts−SIG_Tp)/(SIG_Ts+SIG_Tp), where SIG_Ts and SIG_Tp are transmitted-light measurements for s and p polarizations, respectively, and RD represents an imbalance of polarization of the transmitted light. Moreover, in this example, RA=SIG_Ts+SIG_Tp corresponds to the overall intensity of the transmitted light. Processor 2486 can prepare a two-dimensional image such as that shown in FIG. 23, in which value (dark to light) represents RA and saturation (neutral to colored) or hue (red to violet) represents RD. This permits observing not only the shape of the microparticulate sample 302 but also the inner structure of the microparticulate sample 302 that is a cause of the polarization. Cell polarization images can be used to analyze live cells without requiring fluorescence or fluorescent dyes. Cell division can also be observed by polarization observation. Polarized light can also be used for measuring the lipid structure of membranes (e.g., lipid bilayers). For example, cell rigidity can be measured using two polarized (vertical and horizontal) signals. The rigidity of the cell is correlated with cell age, and can also indicate activation state. Organized structures (e.g., actin or collagen) show highly directional responses when using polarized light. Processor 2486 can also or alternatively use conventional object-segmentation techniques known in the image-processing art to locate microparticulate samples in 2-D images of the measured data, e.g., as discussed above with reference to FIG. 23.

The phrase "communicatively connected" includes any type of connection, wired or wireless, for communicating data between devices or processors. These devices or processors can be located in physical proximity or not. For example, subsystems such as peripheral system 2420, user interface system 2430, and data storage system 2440 are shown separately from the processor 2486 but can be stored completely or partially within the processor 2486.

The peripheral system 2420 can include one or more devices configured to provide digital content records to the processor 2486. The processor 2486, upon receipt of digital content records from a device in the peripheral system 2420, can store such digital content records in the data storage system 2440. In an example, the peripheral system 2420 in control unit 5 (FIG. 1) can include amplifiers, buffers, receivers, transceivers, or other interfaces to receive, amplify, or otherwise preprocess SIG_T or other detection signal(s). The peripheral system 2420 can also include analog-to-digital (A/D) converters to provide processor 2486 with digital samples of the detection signal(s). In the illustrated example, the peripheral system 2420 can include circuitry or communications interfaces to control or otherwise interface with irradiation optical system 2, detection optical systems 3, 4, sample-fluid source 919, sheath-fluid source 939, or other components of a flow cytometer 100.

In an example, peripheral system 2420 includes or communicates between processor 2486 in a system control computer and a processor in a data acquisition system 2423 ("DAQ"). The DAQ 2423 can include a computer having a PCI Express or other bus. One or more FPGA- or ASIC-based (for example) data sampling card(s) can be installed in slot(s) on the bus. The sampling card(s) can include multiple channels of A/D conversion, e.g., at 50Ω or another specified impedance. In various examples, the DAQ 2423 has four channels of 16-bit sampling at 160 MHz, or 8-ch/16-bit/160 MHz, or 16-ch/16-bit/80 MHz. Data can be stored on RAID arrays, solid-state drives, or other storage devices in or communicatively connected with the DAQ 2423. In an example, a RAID array of 256 GB solid-state drives is used. Data analysis can be performed by processor 2486 in the system control computer, by a processor in the DAQ 2423, by a processor in a separate data analysis computer (not shown), e.g., included in or connected to user interface system 2430. In the example shown, peripheral system 2420 sends control signals to elements 2, 3, 4, 919, and 939. DAQ 2423 receives signals from elements 3 and 4 and transmits corresponding digital data via peripheral system 2420 to data storage system 2440 or processor 2486.

In various aspects, processor 2486 in control unit 5 (FIG. 1) generates a two-dimensional image of each microparticulate sample 302 by using a predetermined flow rate. In practice, the flow rate within the flow chamber 310 (FIG. 3) can vary due to, e.g., external factors such as temperature (which can affect fluid viscosity). If the variation in the flow rate increases, and the increased variation is not taken into account, there is a possibility that the two-dimensional image obtained by the operation can be distorted and deviate from the actual shape of each microparticulate sample 302. In other aspects, therefore, peripheral system 2420 includes or receives data from a flow rate measuring device arranged to monitor the flow rate within the flow chamber 310, e.g., in real time. The control unit 5 generates a two-dimensional image of each microparticulate sample 302 while updating the flow rate for use in generating the two-dimensional image with the latest measured flow rate. Accordingly, this and similar aspects permit producing a two-dimensional image with reduced distortion, even when the flow rate varies. This permits obtaining a two-dimensional image of each microparticulate sample 302 with high accuracy.

The user interface system 2430 can convey information in either direction, or in both directions, between a user 2438 and the processor 2486 or other components of system 2401. The user interface system 2430 can include a mouse, a keyboard, another computer (connected, e.g., via a network or a null-modem cable), or any device or combination of devices from which data is input to the processor 2486. The user interface system 2430 also can include a display device such as electronic display 2435 configured for viewing by user 2438, a processor-accessible memory, or any device or combination of devices to which data is output by the processor 2486. The user interface system 2430 and the data storage system 2440 can share a processor-accessible memory.

Data storage system 2440 can include or be communicatively connected with one or more processor-accessible memories configured to store information. The memories can be, e.g., within a chassis or as parts of a distributed system. The phrase "processor-accessible memory" is intended to include any data storage device to or from which processor 2486 can transfer data (using appropriate components of peripheral system 2420), whether volatile or nonvolatile; removable or fixed; electronic, magnetic, optical, chemical, mechanical, or otherwise. Example processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 2440 can be a tangible non-transitory computer-readable storage medium, i.e., a non-transitory device or article of manufacture that participates in storing instructions that can be provided to processor 2486 for execution.

In an example, data storage system 2440 includes code memory 2441, e.g., a RAM, and disk 2443, e.g., a tangible computer-readable rotational storage device such as a hard drive or a tangible computer-readable solid-state storage device such as a Flash drive. Computer program instructions are read into code memory 2441 from disk 2443. Processor 2486 then executes one or more sequences of the computer program instructions loaded into code memory 2441, as a result performing process steps described herein. In this way, processor 2486 carries out a computer implemented process. For example, steps of methods described herein, blocks of the flowchart illustrations (e.g., FIG. 22) or block diagrams herein, and combinations of those, can be implemented by computer program instructions. Code memory 2441 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 2486 (and possibly also other processors), to cause functions, acts, or operational steps of various aspects herein to be performed by the processor 2486 (or other processor). Computer program code for carrying out operations for various aspects described herein may be written in any combination of one or more programming language(s), and can be loaded from disk 2443 into code memory 2441 for execution. The program code may execute, e.g., entirely on processor 2486, partly on processor 2486 and partly on a remote computer connected to a network, or entirely on the remote computer.

In view of the foregoing, various aspects provide flow cytometers and flow chambers for flow cytometers that provide increased throughput by arranging microparticulate samples 302 in a hydrodynamically planar flow 305 (both FIG. 3). A technical effect of various aspects is to operate pumps or other fluid supplies to control the flow of sheath and sample fluid SH, SM to provide the hydrodynamically planar flow 305. A further technical effect of various aspects is to measure the shapes of microparticulate samples 302, such as cells, and to measure data regarding the internal structures of those samples 302. A further technical effect is to present a visual representation of the measured shapes or structures on an electronic display 2435.

As described above, in various aspects, the laser light L is focused or otherwise directed to converge onto an area (the irradiation spot) smaller than each microparticulate sample 302. (Alternatively, a laser with a core size smaller than the microparticulate sample 302 can be used, and the beam directed to scan the microparticulate sample 302.) Accordingly, in this configuration, a profile of local scattered light and the like can be obtained by scanning the microparticulate samples 302. When the scanning rate, the scanning direction, and the flow rate of the microparticulate samples 302 are taken into consideration based on this profile, a two-dimensional image of each microparticulate sample 302 can be obtained. That is, according to this configuration, the form of each microparticulate sample 302 can be directly observed by observing transmitted light, without using the fluorescence. Current cytometers measure averaged size and cell complexity using forward- and side-scattering signals. Even fluorescence does not provide information regarding shape of individual cells. In conventional cytometers, calibration beads of a known size are measured to determine the corresponding scattered-light intensities. Measured intensities from cells are then compared to the intensities from the calibration beads to infer size. This process requires a calibration step and does not provide a high level of accuracy of the results. In contrast, inventive scanning image cytometers described herein can provide 2-D transmission images with polarization (SIG_Tp and SIG_Ts signals) and fluorescence (SIG_f1-SIG_f3 signals) data for each (x, y) location.

Hereinafter, other advantages obtained in various aspects will be described. In various aspects, the laser light radiated onto each microparticulate sample 302 is focused or directed to converge to an irradiation spot having a size set by the diffraction limit of the detection optical systems 3, 4, or of other optics in the flow cytometer 100 (all FIG. 1). Using a diffraction-limited spot increases the light density, and improves the detection sensitivity and spatial resolution of measurements of microparticulate samples 302. In an example, the irradiation spot for a laser with wavelength $\lambda$, has a diameter between $\lambda/1.4$ and $\lambda/2$. As a result, a very small microparticulate sample, e.g., a submicrometer-sized to nanometer (nm)-sized sample, such as a virus, can be detected. Such small microparticulate samples 302 cannot be detected in prior flow cytometers. Furthermore, since the laser light is directed to irradiate a very small area, the total light output of the laser source 21 (FIG. 6) can be reduced as compared with the typical flow cytometer, without reducing the irradiance ($W/m^2$). In various aspects, the irradiation optical system 2 (FIG. 1) is configured to provide an irradiance on the microparticulate sample 302 selected based on the properties of the microparticulate sample, of any fluorescent dyes therein, or of other components or structures to be measured.

In various examples, the incident-light spot diameter d is characterized by the equation $d=k\lambda/NA$, for numerical aperture NA and wavelength $\lambda$. In an example, k=0.82 for a spot diameter measured at $1/e^2$ or 0.48 for a spot diameter measured at FWHM. "$1/e^2$" refers to the perimeter around the spot where the intensity is $1/e^2 \approx 0.135$ of the peak intensity of the spot; "FWHM" refers to that perimeter at 50% of the peak intensity. Therefore, a 0.2 µm spot size can be used. Prior flow cytometers use, e.g., 10 µm×70 µm spots. Various inventive examples herein therefore provide >10,000 times the areal resolution of such comparative schemes. In an example, blood cells can have diameters ~10 µm. For measuring blood cells, a 2 µm spot (smaller than 10 µm/3) can be used. In various aspects, $\lambda$ can be, e.g., less than the thickness T or the diameter of microparticulate samples 302 (both FIG. 3), or less than half of either of those.

In this and other example configurations, a confocal optical system is used in the detection optical system 3 for detecting transmitted light. The confocal optical system also includes the laser source 21 and objective lens 24 (both FIG. 6) that provide localized illumination, and a pinhole that blocks out-of-focus light. This advantageously permits observation with a resolution substantially equivalent to the resolution of an observation of microparticulate samples 302 with a laser confocal microscope. Consequently, image information on the surface and internal structure of each microparticulate sample 302 can be obtained with high accuracy.

In a typical flow cytometer that applies a large irradiation spot to a sample, the light intensity of the irradiation spot has a distribution (for example, a Gaussian distribution). Accordingly, a variation occurs in the detection sensitivity depending on the position of the microparticulate sample 302 within the irradiation spot. For example, if the microparticulate sample 302 is not centered in the irradiation area of a conventional flow cytometer, the signal intensity will be lower than if the microparticulate sample 302 is centered in that irradiation area. On the other hand, in various inventive aspects described herein, including this configuration, the irradiation spot is smaller than the microparticulate sample 302. This significantly reduces, and can almost eliminate, variation of the detection sensitivity due to position variation of the microparticulate sample 302. This can also substantially reduce variation due to the light intensity distribution of the laser irradiation spot within the linear sweep range. A small spot scanned across a microparticulate sample 302 can provide uniform illumination within an area of constant scan velocity.

A conventional flow cytometer requires labeling on microparticulate samples 302 by using a fluorescent substance as a labeled substance (e.g., using antibodies, as discussed above). This causes problems in that it can take a great deal of time to perform preparatory work, and the survival rate and purity of biological samples can be adversely affected during an observation of biological cells, for example. However, the image flow cytometer according to various example aspects enables non-labeling cell measurement, i.e., measurement without labeling with a fluorescent substance. Therefore, the cell measurement can be achieved without the need for preparatory work and without any adverse effect on the survival rate and purity of biological samples.

According to various aspects, an image flow cytometer for observing microparticulate samples includes a flow system directing a carrier fluid including the samples through a sensing area in a hydrodynamically planar flow. The flow system includes an elongated flow chamber having opposed first and second apertures and the sensing area downstream of the apertures, and receiving the carrier fluid upstream of the first and second apertures. A sheath-fluid channel includes two branches configured to carry the sheath fluid from opposite directions into the flow chamber through the first aperture, and likewise third and fourth branches through the second aperture. An irradiation spot smaller than the flow thickness is scanned across the sensing area across the flow direction. A detection optical system detects a time-varying light intensity of resultant light from the flow chamber. A processor detects two or more of the microparticulate samples according to the detected intensity.

FIGS. 25-44 show various example configurations of fluid flow chambers and structures. Some examples provide a hydrodynamically planar flow. Illustrated features include sample inlet shapes, sheath inlet shapes, waste outlet shapes, sample channel shapes (cross-section and plan), and sheath channel shapes (cross-section and plan).

Configurations described in FIGS. 25-44 can be used with flow cells, pumps, cytometers, lasers, and other components described above. For example, flow chambers and fluidic-passage shapes such as those shown in FIGS. 25-44 can be used in place of the configurations shown in FIGS. 1-3, and 8A-14, e.g., as flow chamber 310 in flow cell 1 shown in FIG. 2, and can be used with related components shown in FIGS. 1, 2, 6, and 24, e.g., processor 2486 and peripheral 20 system 2420; irradiation optical system 2, detection optical system 3, detection optical system 4, and control unit 5 shown in FIG. 1; or laser source 21, collimator 22, deflector 23, and objective lens 24 shown in FIG. 6.

Figure 25:
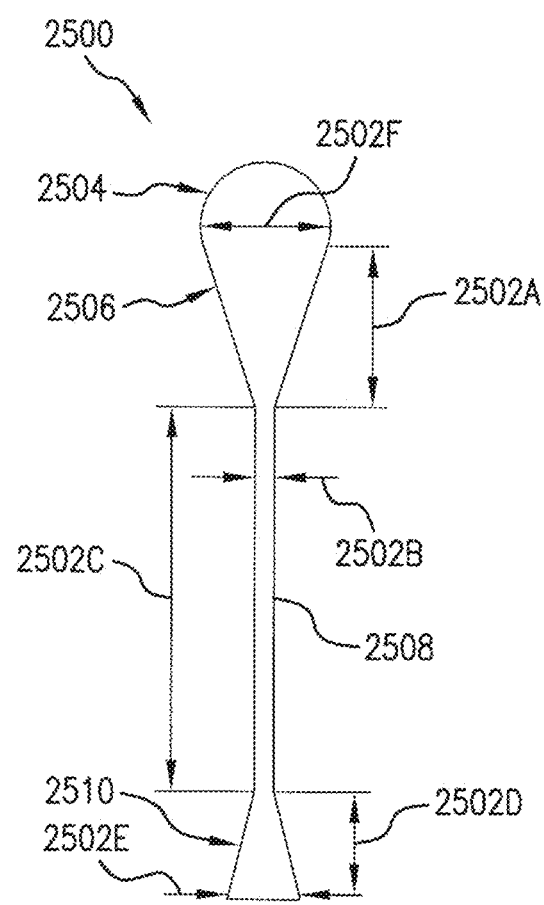
FIG. 25 is a plan view of an example fluid channel.

FIG. 25 is a plan view of a fluid channel 2500 according to various aspects. The fluid channel 2500 can be, e.g., a sample channel or a sheath channel. Dimensions of the fluid channel are indicated by references 2502A-F. In some examples, the fluid channel 2500 can include an inlet 2504 having a diameter 2502F of, e.g., 0.4 mm, 0.5 mm or 1.0 mm. The diameter 2502F of inlet 2504 can be selected to correspond to a through-hole such as a through-hole of sheath inlet 2714, FIG. 27. Inlet 2504 can be connected via a neck 2506 to a body 2508. Neck 2506 can narrow from its width where neck 2506 joins inlet 2504 to the width of body 2508 over longitudinal extent 2502A, e.g., about 5 mm. The sides of neck 2506 can have, e.g., a 10:1 longitudinal:transverse slope along the longitudinal extent (2502A) of neck 2506. Body 2508 can have width 2502B of, e.g., 80 µm wide or 100 µm wide and length 2502C of, e.g., ≥10 mm, ≥20 mm, ≥30 mm, or about 38 mm. Body 2508 can carry fluid from neck 2506 to outlet 2510. Outlet 2510 can have a substantially triangular shape, widening from the width 2502B of body 2508 to width 2502E of, e.g., about 200 µm over length 2502D, e.g., about 2 mm. This can reduce the probability of clogging and facilitate cleaning of fluid channel 2500. Some examples have no corners (or no sharp corners, or no substantially 90° corners) or steps in the fluid flow between the inlet 2504 and the body 2508.

Figure 26:
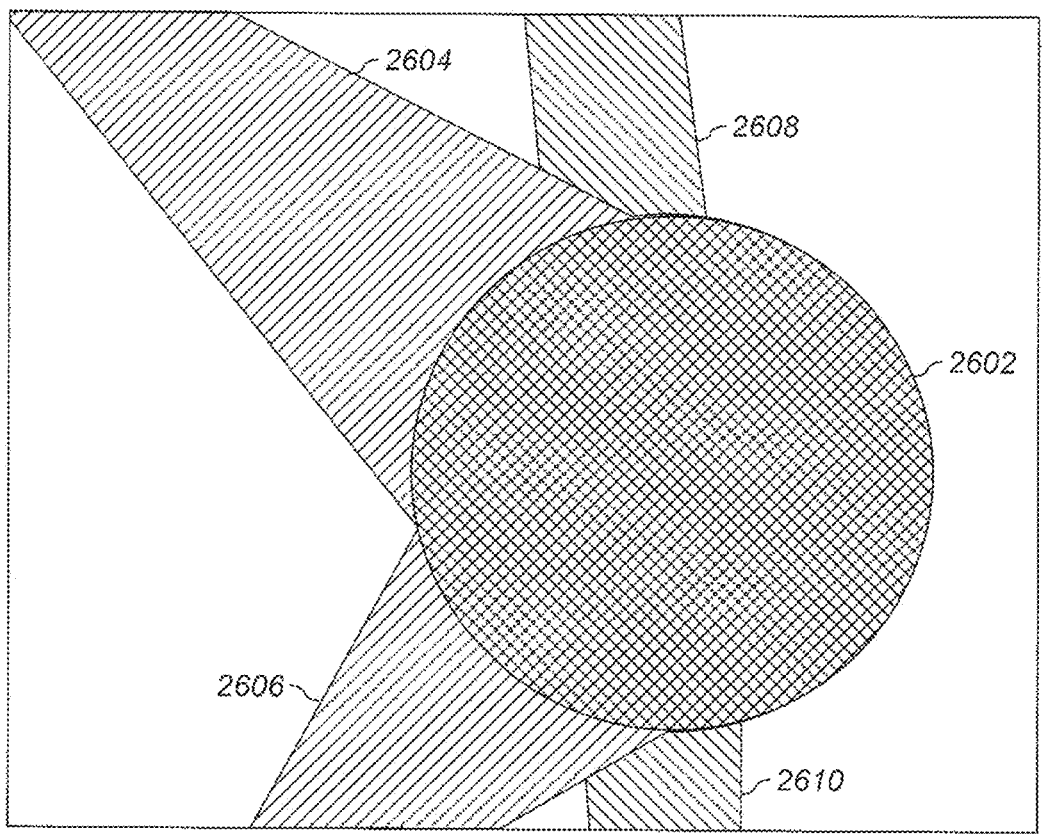
FIG. 26 is a plan view of portions of an example fluid channel.

FIG. 26 is a partial plan view of portions of an example fluid channel 2600, e.g., a sheath channel, according to various aspects. Two stacked layers are illustrated, distinguished by slope of a diagonal hatch pattern. In some examples, inlet 2602 can represent inlet 2504, and can be connected to both layers, as represented by the X-pattern hatching. Each neck 2604 or 2606 in the first layer can represent neck 2506 and can have, e.g., a 10:1 slope or other dimensions of neck 2506. Necks 2608 and 2610 of the second layer can be substantially straight, as shown, or tapered, e.g., as neck 2506. Examples are discussed below with reference to sheath inlet 2916, FIG. 29. Tapering can reduce clogging and facilitate cleaning of the fluid channel 2600. Tapering can also reduce dusting, e.g., when using cleaning liquid.

Figure 27:
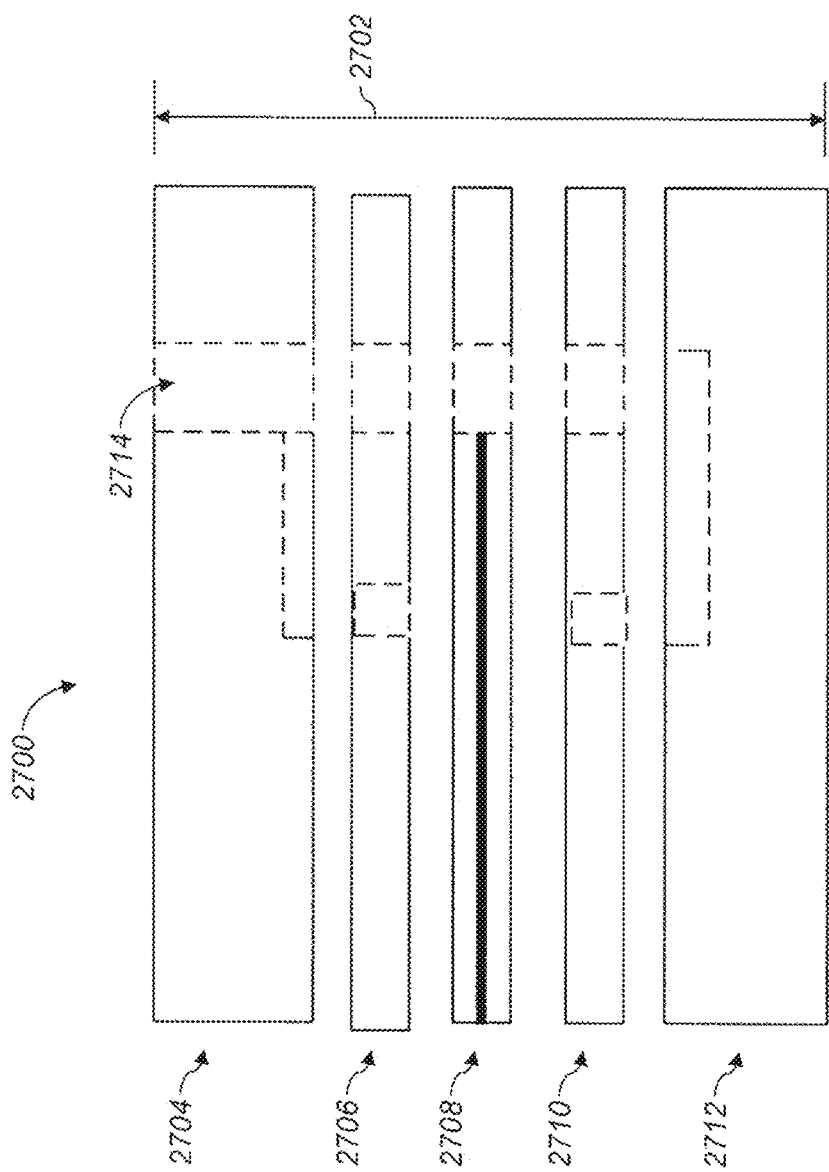
FIG. 27 is an exploded cross-section of portions of an example flow system.

FIG. 27 is an exploded cross-section of portions of a flow system 2700 having thickness 2702. The system 2700 includes upper sheath substrate 2704, upper guide substrate 2706, sample substrate 2708, lower guide substrate 2710, and lower sheath substrate 2712. As used herein, the terms "upper" and "lower" are for clarity of explanation, and do not limit the orientation in which system 2700 or other flow systems herein can be used. The illustrated portions of system 2700 can be, e.g., ~2 mm thick (thickness 2702) when assembled. The substrates can be bonded together, e.g., by thermal fusion. Guide substrates 2706 and 2710 can be, e.g., 100 µm-425 µm thick. Sample substrate 2708 can be, e.g., ~100 µm thick or 120 µm thick. In some examples, one or more of the substrates 2704-2712 can include quartz-polymer hybrid sheets or blocks with channels or other fluidic passages etched or otherwise manufactured therein.

As shown, sheath inlet 2714 (shown dashed for clarity) passes through substrates 2704-2712 to carry sheath fluid both above and below a sample channel (heavy line) in sample substrate 2708. This can be, e.g., as discussed above with reference to FIGS. 8B and 8C. The channels in substrates 2704 and 2712 can be the two layers shown in FIG. 26. Adding guide substrates 2706 or 2710 can provide improved robustness and strength during manufacturing or operation, or can provide increased control of fluid flow by permitting flows to be extended vertically. Examples of vertically-extended flows are discussed below with reference to FIG. 28.

In some examples, upper guide substrate 2706 and lower guide substrate 2710 can be omitted. In these examples, upper sheath substrate 2704, sample substrate 2708, and lower sheath substrate 2712 can form a stack. A flow chamber in sample substrate 2708 can have a width of, e.g., 120 µm. An experiment was performed in which five substrates according to some of these examples were prepared, and determined to have repeatable performance.

Figure 28:
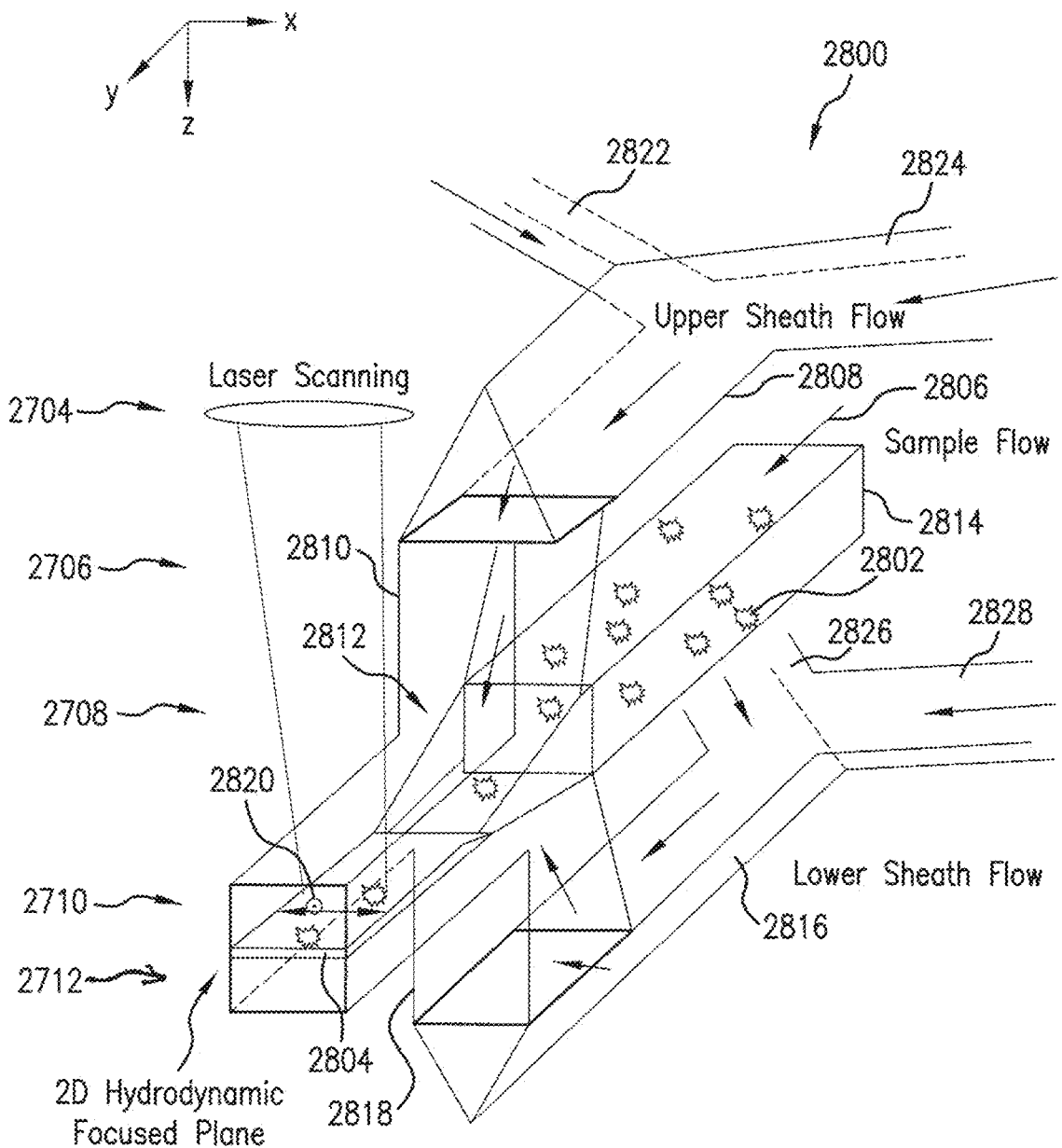
FIG. 28 is a perspective of portions of an example flow system.

FIG. 28 is a perspective of portions of a flow system 2800 for transporting microparticulate samples 2802 (for brevity, only one is labeled) in a substantially hydrodynamically planar flow 2804 substantially in a selected flow direction 2806, according to various aspects. The illustrated portions can be located in flow cell 1 (FIG. 2). For clarity, the front of the flow system 2800 (the −Z direction) is shown facing up in this figure. The illustrated portions of flow system 2800 can be constructed, e.g., using a five-layer stack such as that discussed above with reference to FIG. 27. Substrates 2704-2712 are shown in FIG. 28 as an example; other numbers or configurations of substrates can be used.

An upper sheath flow through upper sheath channel 2808 passes through an upper guide channel 2810 into a focusing area 2812 of a flow chamber 2814. In some examples, the flow chamber 2814 can have a cross-section in the X-Z plane of 100 µm×100 µm. In the focusing area 2812, the sample fluid is substantially hydrodynamically focused into substantially hydrodynamically planar flow 2804. A lower sheath flow through lower sheath channel 2816 passes through a lower guide channel 2818 into flow chamber 2814. In some examples, the sheath flow through the upper and lower guide channels 2810, 2818 is substantially perpendicular to the sample flow through the flow chamber 2814 upstream of (−Y), or entering, the focusing area 2812. In some examples, the sheath flow through the upper and lower guide channels 2810, 2818 has a substantially uniform inertia, momentum, or pressure across the cross-sections of the upper and lower guide channels 2810, 2818. The upper and lower guide channels 2810, 2818 can be connected to flow chamber 2814, e.g., as discussed above with reference to apertures 321, 322, FIG. 3. In some examples, guide channels herein, e.g., upper and lower guide channels 2810, 2818, can have respective centerlines. The centerlines can be, e.g., substantially perpendicular to respective centerlines of the flow chamber, the respective centerlines of the flow chamber being determined, e.g., as tangents to the flow chamber at the respective apertures. In the example of a circular flow chamber, the centerlines of the guide channels can be parallel to radii of the circle.

The sheath flows through the upper and lower guide channels 2810, 2818 can be examples of vertically-extended flows as noted above with reference to FIG. 27. Using vertically-extended flows can improve alignment accuracy. In the illustrated example, the sheath flows through branches 2822 and 2824, and the flows through branches 2826 and 2828, merge before reaching the apertures 321, 322. This can reduce turbulence or other effects due to the merging of fluid flows.

Downstream of the focusing area 2812, e.g., in sensing area 340, FIG. 3, a laser spot or other irradiation spot 2820 can be scanned across flow 2804, e.g., as discussed above with reference to irradiation optical system 2. For example, irradiation optical system 2 can scan an irradiation spot smaller than the selected thickness across the sensing area in a scan direction, e.g., ±X, different from the flow direction (+Y). Details of scanning can be, e.g., as discussed above with reference to step 2230, FIG. 22.

Other examples of substantially hydrodynamically planar flow 2804 and irradiation-spot scanning can be discussed above with reference to substantially hydrodynamically planar flow 305 and sensing area 340, FIG. 3. In some examples, the sheath inlet or the sample inlet can be tapered (e.g., FIG. 25), e.g., at a 10:1 slope.

In some examples, upper sheath channel 2808 can be supplied with sheath fluid via branches 2822 and 2824. In some examples, lower sheath channel 2816 can be supplied with sheath fluid via branches 2826 and 2828. Supplying sheath fluid through two or more branches can permit increasing the fluid flow rate while maintaining more strength in the sheath substrate 2704, 2712 than would be the case if the fluid were supplied through a single branch. In some examples, branches 2822 and 2824 can provide flows in substantially opposite directions at the point where branches 2822 and 2824 merge into upper sheath channel 2808, or in directions that are not substantially opposite (e.g., at an angle, as shown), and likewise for branches 2826, 2828 at the point where they merge into lower sheath channel 2816.

Figure 29A:
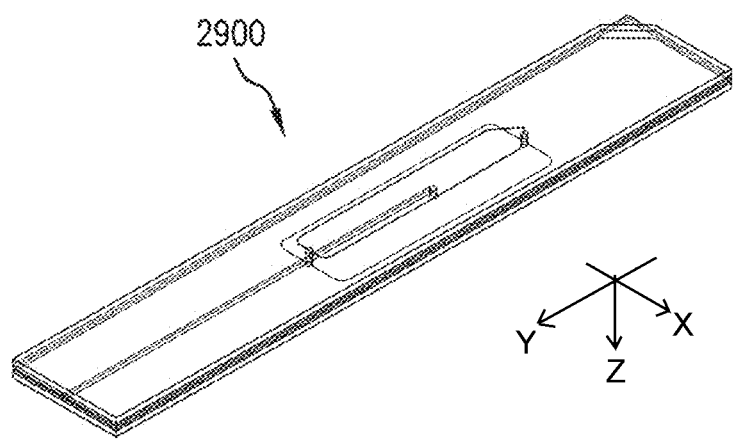
FIG. 29A is a perspective of portions of an example flow system.

FIG. 29A is a perspective of portions of a flow system 2900. Flow system 2900 can be used, e.g., in or as flow cell 1, FIG. 2. Flow system 2900 can be, e.g., about 2 mm thick, or can have five layers, e.g., as discussed above with reference to FIG. 27. Layer thicknesses, composition, and manufacturing can be as discussed above with reference to FIG. 27. In one or more of FIG. 29A, 29B, 30A-30D, 31A, 31B, 32A, 32B, 33A-33E, or 34-44, channels described herein can be or include cavities in layers, e.g., as described above with reference to FIGS. 8A-8C.

Figure 29B:
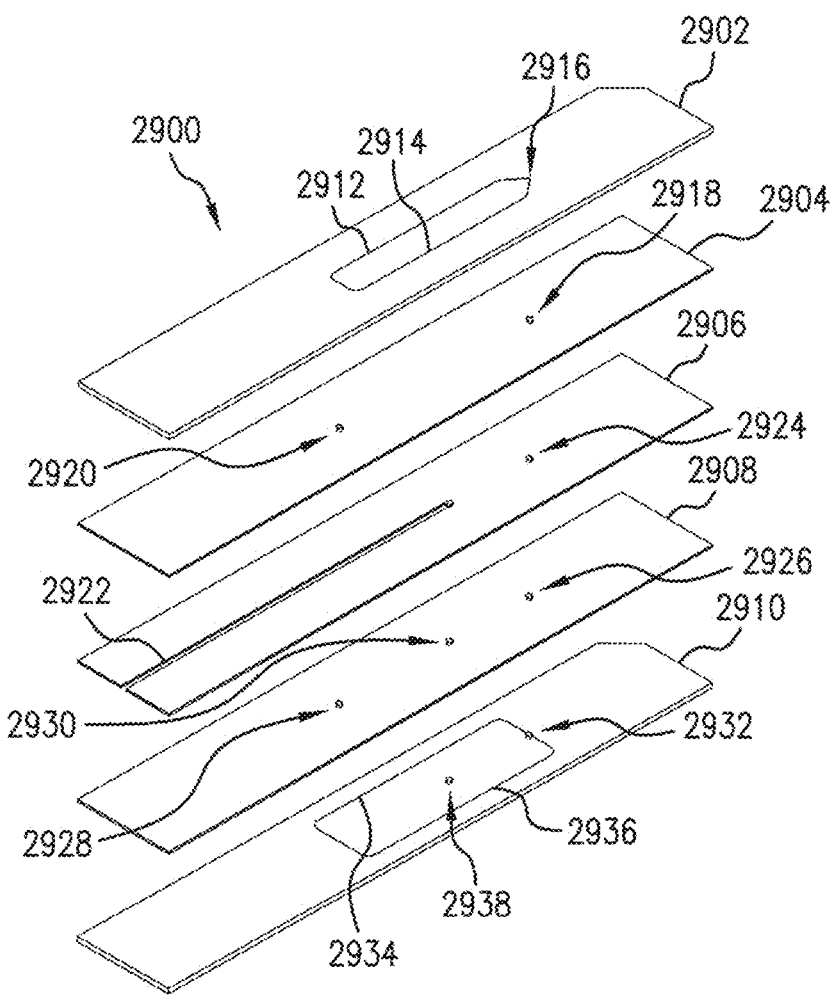
FIG. 29B is an exploded perspective of portions of the example flow system shown in FIG. 29A.

FIG. 29B is an exploded perspective of portions of flow system 2900. Flow system 2900 includes upper sheath substrate 2902, upper guide substrate 2904, sample substrate 2906, lower guide substrate 2908, and lower sheath substrate 2910. Upper sheath substrate 2902 includes upper sheath branches 2912 and 2914 supplied with sheath fluid via sheath inlet 2916. Upper guide substrate 2904 includes channel 2918 carrying sheath fluid towards lower sheath substrate 2910 and channel 2920 carrying sheath fluid from upper sheath branches 2912 and 2914 into flow chamber 2922 of sample substrate 2906. Sample substrate 2906 includes channel 2924 carrying sheath fluid from channel 2918 towards lower sheath substrate 2910. Lower guide substrate 2908 includes channel 2926 carrying sheath fluid from channel 2924 towards lower sheath substrate 2910, channel 2928 carrying sheath fluid into flow chamber 2922 of sample substrate 2906, and channel 2930 carrying sample fluid into flow chamber 2922 upstream of channels 2920 and 2928. Lower sheath substrate 2910 includes channel 2932 carrying sheath fluid from channel 2926 to lower sheath branches 2934 and 2936, from which branches sheath fluid is carried to channel 2928, and sample inlet 2938. Flow chamber 2922 can have a cross-section in the X-Z plane of, e.g., 100 µm×100 µm.

In the illustrated example, first and second sheath-fluid branches (upper sheath branches 2912, 2914) are configured to carry the sheath fluid to the first sheath-fluid channel (channel 2920, a first guide channel), and the first and second sheath-fluid branches (2912, 2914) can have orientations separated by less than about 15° (or less than 15°) at the first sheath-fluid channel (2920). Also in the illustrated example, third and fourth sheath-fluid branches (lower sheath branches 2934, 2936) are configured to carry the sheath fluid to the second sheath-fluid channel (channel 2928, a second guide channel). The third and fourth sheath-fluid branches (2934, 2936) can have orientations separated by less than about 15° (or less than 15°) at the second sheath-fluid channel (2928).

FIGS. 30A-D are plan views of portions of flow system 2900, FIG. 29. Like-numbered parts indicate like items. Dimensions are shown with reference 3002. Dimensions can be as shown in FIG. 27. Sample and sheath flows are generally from top to bottom in FIGS. 30A-D.

FIGS. 30A and 30B show sheath inlet 2916. Sheath inlet 2916 can be connected to one or more (here, four) necks or sheath branches 2912, 2914, 2934, or 2936. Necks can be tapered, e.g., as discussed above with reference to neck 2506, FIG. 25.

FIGS. 30A and 30D show waste outlet 3004, via which sample fluid and sheath fluid leave flow chamber 2922. Waste outlet 3004 can widen with, e.g., a 10:1 taper over its length 3002A, e.g., as discussed above with reference to outlet 2510, FIG. 25. Tapering the waste outlet from the width of flow chamber 2922 to a wider width can reduce the risk of clogging can reduce reverse pressure of the waste system.

FIG. 30A shows a plan view including sheath-fluid branches. In the illustrated example, the first and second apertures are generally located where indicated by reference 3006. In some examples, at least two of the sheath-fluid branches can be spaced apart laterally in a first region spaced apart from the first and second apertures. In the illustrated example, upper sheath branch 2912 is spaced apart in the +X direction from lower sheath branch 2934 in region 3008 spaced apart from location 3006. Also in the illustrated example, upper sheath branch 2914 is spaced apart in the +X direction from lower sheath branch 2936 in region 3010 spaced apart from location 3006. Spacing apart branches, e.g., in the X-Y plane, can increase mechanical strength of the flow system 2900 and reduce the probability of a fracture along one or more of the branches.

FIG. 30C shows an example of sample inlet 2398 connected via a sample-inlet neck 3012 to flow chamber 2922. The sample-inlet neck 3012 tapers over its length 3002B, which can reduce clogging and provide smoother flow in sample chamber 2922.

Figure 31B:
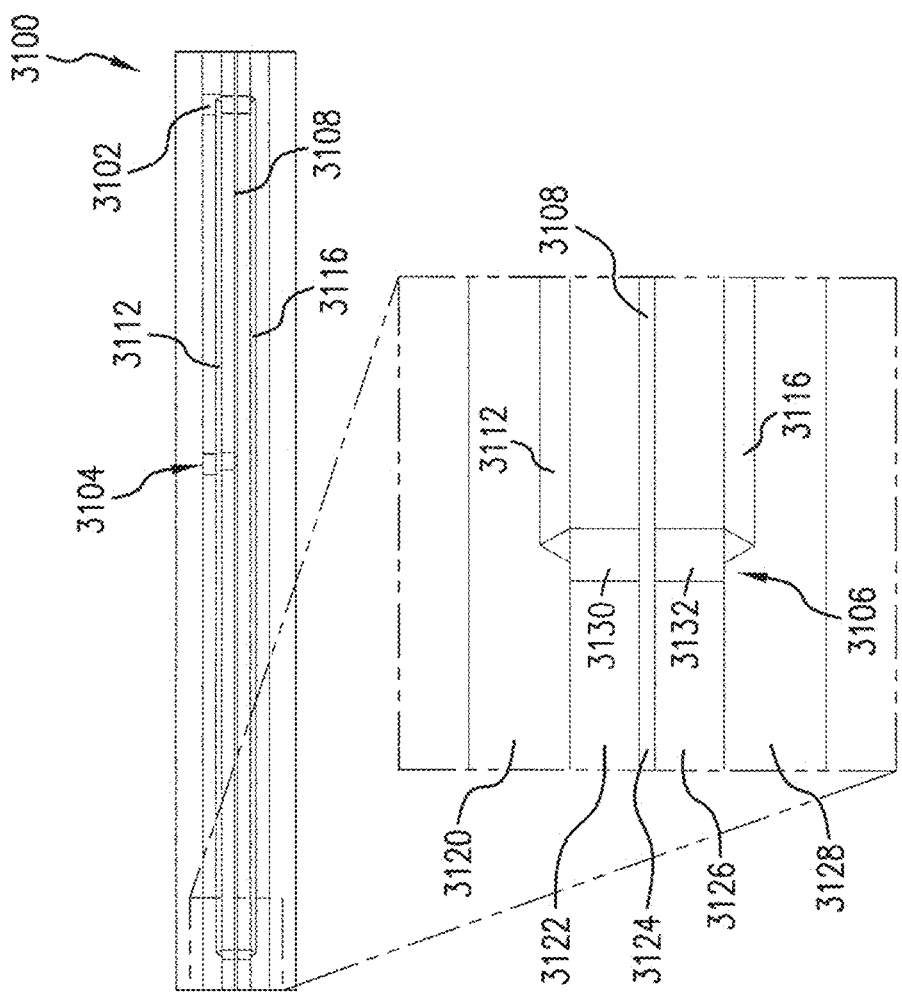
FIG. 31B is a cross-section of portions of the example flow system shown in FIG. 31A.
Figure 31A:
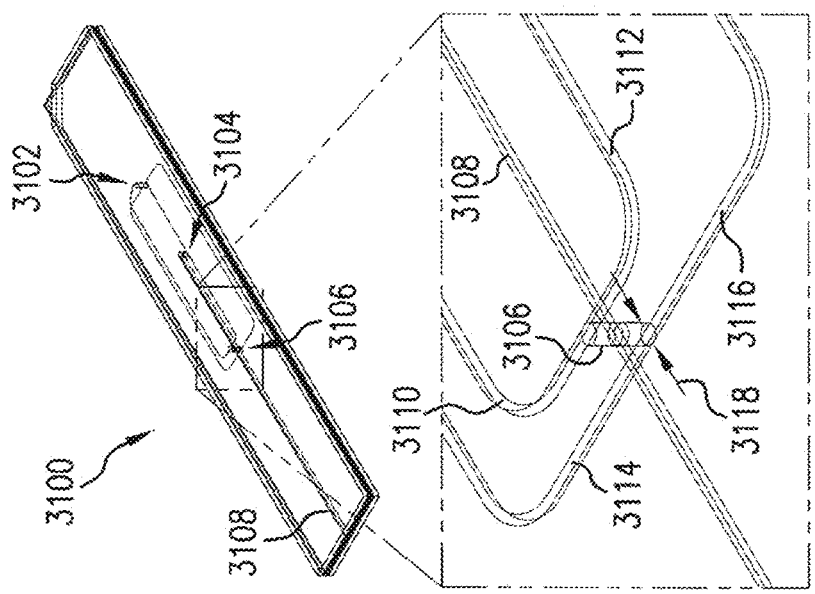
FIG. 31A is a perspective of portions of an example flow system.

FIG. 31A show portions of a flow system 3100. Dimensions can be as shown in FIG. 27. Flow system 3100 can represent flow system 2900, FIG. 29.

FIG. 31A is a perspective of flow system 3100. Sheath inlet 3102 receives sheath fluid and sample inlet 3104 receives sample fluid. Guide channel 3106 carries sheath fluid in a vertical flow from above and below flow chamber 3108 into flow chamber 3108.

The inset in FIG. 31A shows details of guide channel 3106 and related components. Upper sheath branches 3110 and 3112 carry sheath fluid above flow chamber 3108 to guide channel 3106, and meet in substantially opposite directions at guide channel 3106. Lower sheath branches 3114 and 3116 carry sheath fluid below flow chamber 3108 to guide channel 3106, and meet in substantially opposite directions at guide channel 3106. In some examples, guide channel 3106 has diameter 3118, e.g., about 0.3 mm. In FIG. 31A, sheath inlet 3102 and sample inlet 3104 are on opposite sides of flow system 3100.

FIG. 31B is a cross-section of portions of flow system 3100. As shown in the inset, flow system 3100 includes upper sheath substrate 3120, upper guide substrate 3122, sample substrate 3124, lower guide substrate 3126, and lower sheath substrate 3128. In FIG. 31A, sheath inlet 3102 and sample inlet 3104 are on the same side of flow system 3100. In some examples, upper sheath substrate 3120 is about 0.55 mm thick in a flow system 3100 with a thickness of about 2 mm, upper guide substrate 3122 about 0.4 mm, sample substrate 3124 about 0.1 mm, lower guide substrate 3126 about 0.4 mm, and lower sheath substrate 3128 about 0.55 mm. In the illustrated example, guide channel 3106 includes upper guide channel 3130 and lower guide channel 3132.

A configuration similar to those shown in FIGS. 29A-31B was simulated with various flow rates of sheath and sample fluid. A simulated flow of 1 µL/s sample fluid and 10 µL/s sheath fluid was effectively hydrodynamically focused by the simulated configuration.

Figure 32A:
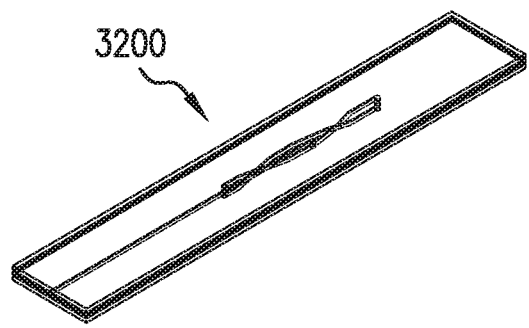
FIG. 32A is a perspective of an example flow system.
Figure 32B:
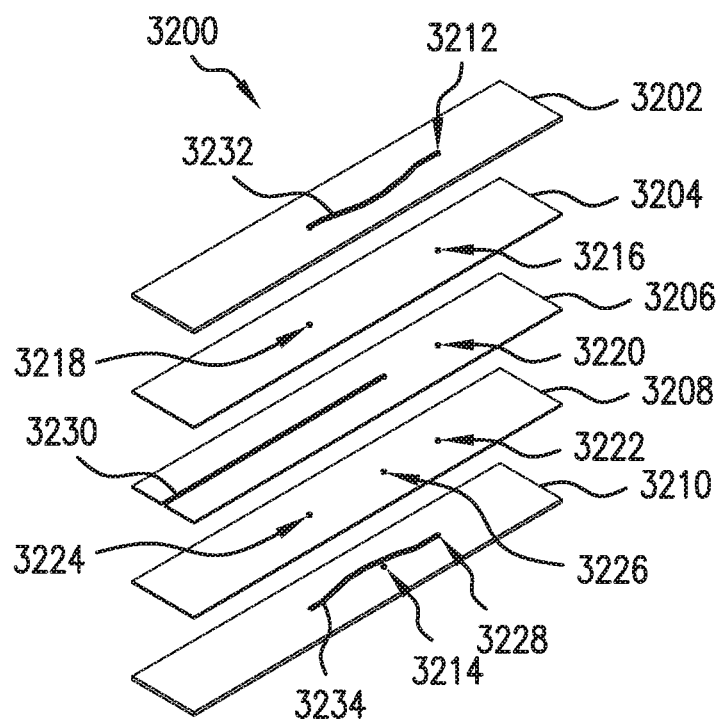
FIG. 32B is an exploded perspective of portions of the example flow system shown in FIG. 32A.

FIG. 32A is a perspective, and FIG. 32B an exploded perspective, of portions of a flow system 3200. Flow system 3200 includes upper sheath substrate 3202, upper guide substrate 3204, sample substrate 3206, lower guide substrate 3208, and lower sheath substrate 3210. Sheath inlet 3212, sample inlet 3214, channels 3216, 3218, 3220, 3222, 3224, 3226, and 3228, and flow chamber 3230 can be, e.g., as described above with reference to sheath inlet 2916, sample inlet 2938, and channels 2918, 2920, 2924, 2926, 2928, 2930, and 2932, and flow chamber 2922, respectively, shown in FIG. 29. In some examples, flow chamber 3230 can have a 100 µm×100 µm cross-section in the X-Z plane, as noted above. System 3200 can be, e.g., about 2 mm thick, or can have five layers, e.g., as discussed above with reference to FIG. 27. Layer thicknesses, composition, and manufacturing can be as discussed above with reference to FIG. 27.

As discussed above with reference to FIG. 3, flow chamber 3230 extends in flow direction +Y and includes first and second apertures 321, 322 on opposed surfaces of the flow chamber 3230. Channel 3218 is a first guide channel extending from the first aperture, and channel 3224 is a second guide channel extending from the second aperture. First sheath-fluid channel 3232 supplies sheath fluid to the first guide channel 3218, and second sheath-fluid channel 3234 supplies sheath fluid to the second guide channel 3224. In this example, first sheath-fluid channel 3232 has only one branch, and second sheath-fluid channel 3234 has only one branch.

FIG. 33A is a plan of portions of flow system 3200, FIG. 32. As shown, with respect to an irradiation direction of the flow system, e.g., +Z, into the page, the first sheath-fluid channel 3232 and the second sheath-fluid channel 3234 are spaced apart laterally in a first region 3302 spaced apart from the first and second apertures. The first and second apertures are not shown, but are positioned in flow chamber 3230 as indicated by reference 3304. An example lateral spacing is indicated by spacing 3306. Also shown are sample-inlet neck 3308, waste-outlet neck 3310, and sheath-inlet neck 3312.

FIG. 33B is a detail plan of portions of flow system 3200, FIG. 32. Sheath-fluid inlet 3212 is fluidically connected to sheath-inlet neck 3312. Sheath-inlet neck 3312 tapers from a cross-sectional area of the sheath-fluid inlet 3212 to a smaller sheath-channel cross-sectional area along a length 3314 of the sheath-inlet neck.

FIG. 33C is a detail plan of portions of flow system 3200, FIG. 32, showing sample-inlet neck 3308 of flow chamber 3230. Sample-inlet neck 3308 is arranged upstream of the first and second apertures (at 3304). Flow chamber 3230 tapers from a cross-sectional area of sample inlet 3214 to a smaller flow-chamber cross-sectional area along a length 3316 of sample-inlet neck 3308.

FIG. 33D is a detail plan of portions of flow system 3200, FIG. 32. The locations of channels 3218 and 3224 are shown. Channels 3218 and 3224 are not visually distinguishable since they overlay each other in FIG. 33D.

FIG. 33E is a detail plan of portions of flow system 3200, FIG. 32. Waste-outlet neck 3310 of flow chamber 3230 is arranged downstream of the first and second apertures (at 3304). Flow chamber 3230 tapers from a first flow-chamber cross-sectional area to a second, larger flow-chamber cross-sectional area along a length 3318 of the waste-outlet neck 3310.

Figure 34:
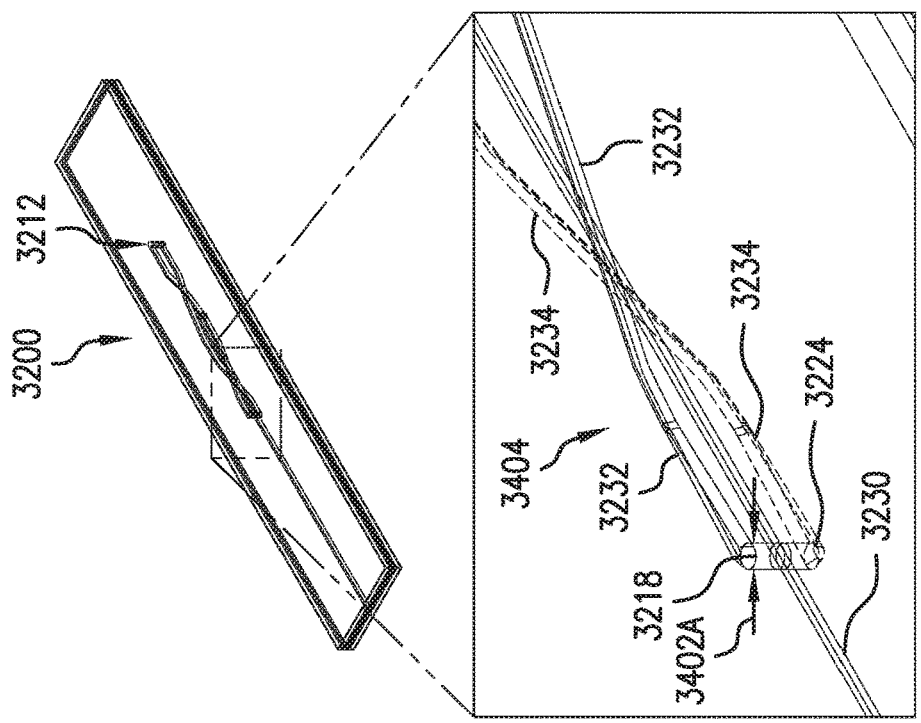
FIG. 34 is a perspective of portions of the example flow system shown in FIG. 32A.

FIG. 34 is a perspective of portions of flow system 3200, FIG. 32. As shown in the inset, first (e.g., upper) guide channel 3218 and second (e.g., lower) guide channel 3224 have diameter 3402A, e.g., about 0.3 mm. In the illustrated example, the first sheath-fluid channel 3232 and the second sheath-fluid channel 3234 are substantially parallel to each other where they meet the first guide channel 3218 and the second guide channel 3224, respectively. Also in the illustrated example, the first sheath-fluid channel 3232 and the second sheath-fluid channel 3234 are substantially parallel to the flow chamber 3230 where they meet the first guide channel 3218 and the second guide channel 3224, respectively. In the region designated 3404, for example, the first sheath-fluid channel 3232 and the second sheath-fluid channel 3234 are oriented substantially along the flow direction.

Figure 35:
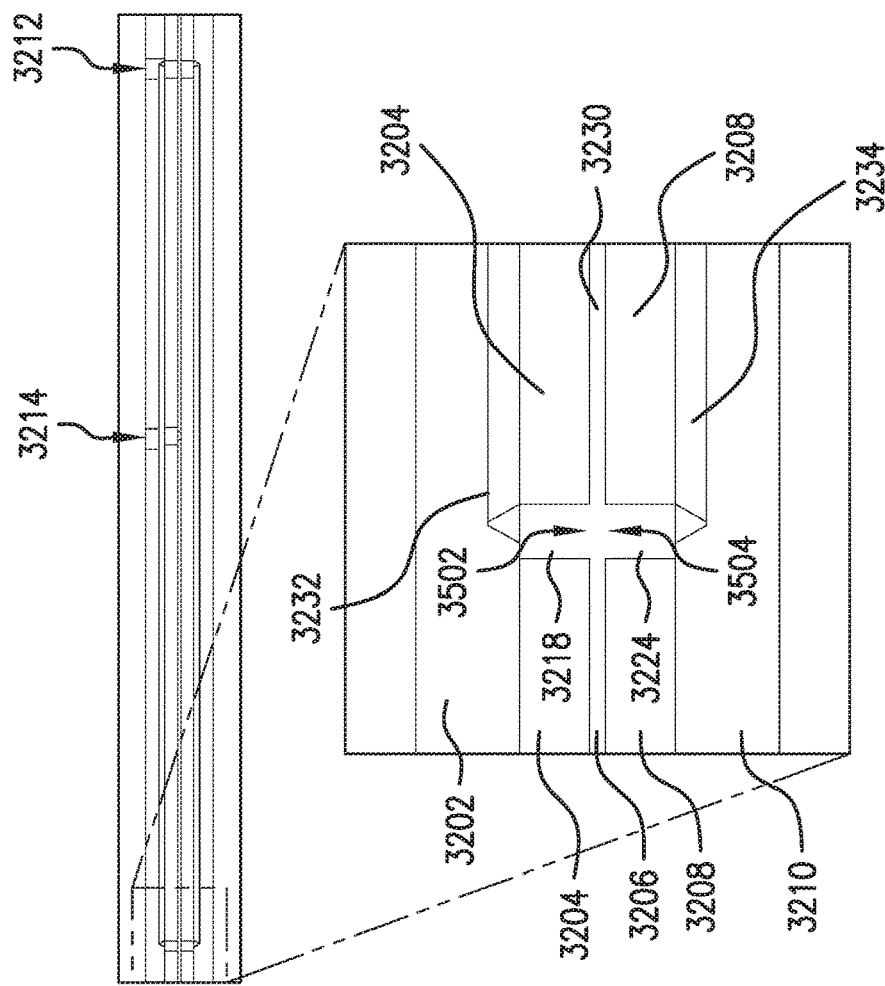
FIG. 35 is a cross-section of portions of the example flow system shown in FIG. 32A.

FIG. 35 is a cross-section of portions of flow system 3200, FIG. 32. As shown, first guide channel 3218 extends from first aperture 3502 substantially perpendicular to flow chamber 3230 at the first aperture. Second guide channel 3224 extends from the second aperture 3504 substantially perpendicular to the flow chamber 3230 at second aperture 3504. In some examples, either or both guide channel(s) 3218 or 3224 can extend substantially perpendicular to the flow chamber.

A configuration similar to those shown in FIGS. 28 and 32A-35 was simulated with various flow rates of sheath and sample fluid. A simulated flow of 1 µL/s sample fluid and 10 µL/s sheath fluid was effectively hydrodynamically focused by the simulated configuration, as was a simulated flow of 2 µL/s sample fluid and 20 µL/s sheath fluid. A simulated flow of 5 µL/s sample fluid and 50 µL/s sheath fluid was focused, but exhibited variable position along the Z axis over the X-Y plane. However, the simulated configuration can be used in aspects with relatively looser tolerances compared to the tolerances usable with the simulated 1 µL/s sample, 10 µL/s sheath flow. The simulated configurations provided laminar flow at up to 5× the flow rates of some alternative configurations.

Further simulations were performed on a configuration similar to those shown in FIGS. 28 and 32A-35. A flow of 2 µL/s sample fluid and 20 µL/s sheath fluid was simulated with three configurations having different values for diameter 3402A of guide channels 3218 and 3224: 0.3 mm, 0.4 mm, 0.5 mm, and >1 mm. In simulation, diameters>1 mm exhibited reduced laminar flow. Accordingly, in various aspects, at least the diameter of the first guide channel (3218) is at most about 1 mm, or at most 1 mm, or the diameter of the second guide channel (3224) is at most about 1 mm, or at most 1 mm. In simulation, diameters of 0.3 mm, 0.4 mm, and 0.5 mm each exhibited hydrodynamic focusing. Accordingly, in various aspects, at least the diameter of the first guide channel (3218) is at about 0.3 mm, about 0.4 mm, or about 0.5 mm, or the diameter of the second guide channel (3224) is about 0.3 mm, about 0.4 mm, or about 0.5 mm.

Figure 36:
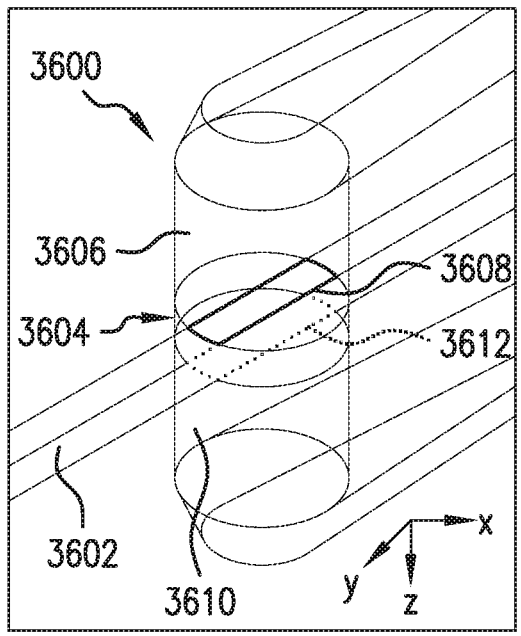
FIG. 36 is a perspective of portions of an example flow system.

FIG. 36 is a perspective of portions of a flow system 3600. In the illustrated example, flow chamber 3602 has a substantially constant cross-section in the X-Z plane while passing through the focusing area 3604. A cross-section in the X-Z plane of upper guide channel 3606 is larger than a cross-section of the X-Z plane of flow chamber 3602 at first aperture 3608. A cross-section in the X-Y plane of lower guide channel 3610 is larger than a cross-section of the X-Y plane of flow chamber 3602 at second aperture 3612.

Figure 37:
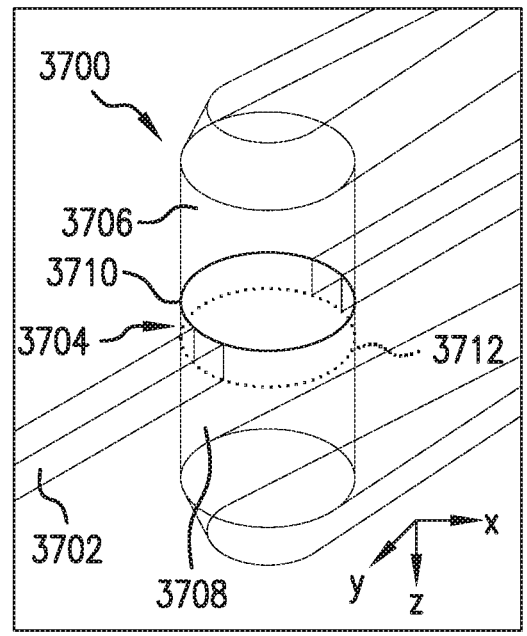
FIG. 37 is a perspective of portions of an example flow system.

FIG. 37 is a perspective of portions of a flow system 3700. In the illustrated example, flow chamber 3702 widens in the X-Z plane in focusing area 3704. In the illustrated example, the cross-section of flow chamber 3702 in the X-Y plane corresponds to the cross-section in the X-Y plane of upper guide channel 3706 and lower guide channel 3708. Therefore, first aperture 3710 and second aperture 3712 are substantially circular, corresponding to the circular cross-sections of guide channels 3706 and 3708. A cross-section in the X-Y plane of upper guide channel 3706 is substantially equal in area to a cross-section of the X-Y plane of flow chamber 3702 at first aperture 3710. A cross-section in the X-Y plane of lower guide channel 3708 is substantially equal in area to a cross-section of the X-Y plane of flow chamber 3702 at second aperture 3712. In the illustrated example, with respect to an irradiation direction (+Z) of the flow system, the flow chamber 3702 has at least one of: a lateral cross-section at the first aperture 3710 corresponding to a lateral cross-section of the first guide channel 3706 at the first aperture 3710; or a lateral cross-section at the second aperture 3712 corresponding to a lateral cross-section of the second guide channel 3708 at the second aperture 3712. In some examples, widening flow chamber 3702 can provide improved manufacturability by loosening the tolerance requirements on the fabrication of the sample substrate (e.g., sample substrate 3206) or on the assembly of the sample substrate to other substrate(s) such as guide substrates 3204 or 3208.

Figure 38:
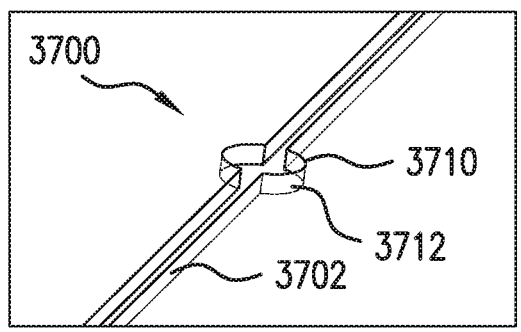
FIG. 38 is a perspective of a flow channel in the example flow system shown in FIG. 37.

FIG. 38 is a perspective of a flow chamber 3702 in an example of flow system 3700, FIG. 37. As discussed above with reference to FIG. 37, apertures 3710 and 3712 are substantially circular in the X-Y plane, or in some examples have substantially similar shapes parallel to the hydrodynamic plane as the respective guide channels 3606 and 3708. In the examples of FIGS. 37 and 38, the upper and lower guide channels are cylindrical, or have substantially cross-sections in the X-Y plane, or have at least partially open ends (e.g., apertures 3710, 3712), or have at least partially open ends opposed to the respective apertures 3710 or 2712 along a longitudinal axis of the guide channels (the Z axis in this illustration).

Figure 39:
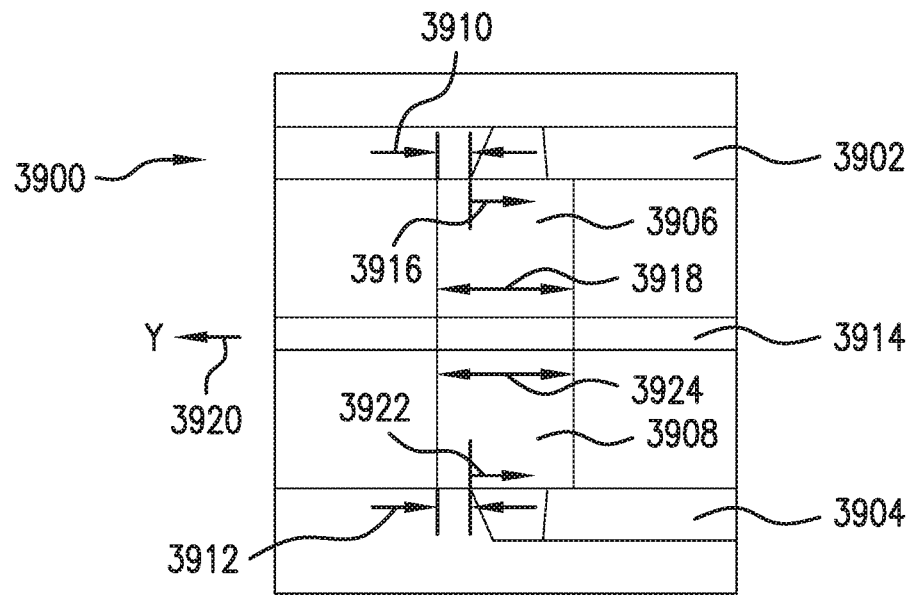
FIG. 39 is a cross-section of portions of an example flow system.

FIG. 39 shows a cross-section of portions of example flow system 3900. Upper sheath channel 3902 and lower sheath channel 3904 terminate longitudinally at lower Y coordinates than the +Y ends of upper guide channel 3906 and lower guide channel 3908, respectively. Upper sheath channel 3902 is offset from upper guide channel 3906 in the Y direction by spacing 3910, and lower sheath channel 3904 is offset from lower guide channel 3908 in the Y direction by spacing 3912. In some examples, spacings 3910 or 3912 can each be, e.g., 0 mm, +0.1 mm, −0.1 mm, or another dimension. In FIG. 39, spacings 3910 and 3912 are each +0.1 mm. Flow chamber 3914 is also shown.

Each channel 3902-3908 has an extent along the flow direction (Y). For brevity, extents are shown only for some channels. For example, upper sheath channel 3902 has extent 3916, and upper guide channel 3906 has extent 3918. The extent along the Y axis includes the highest-valued (or most positive) and lowest-valued (or most negative) coordinates in the projection of the respective structure onto the Y axis. Extent 3916 terminates upstream (along the flow direction, the Y axis) of extent 3918.

Specifically, in some examples, the upper sheath-fluid channel 3902 is oriented at least partly along the flow direction 3920 at the upper guide channel 3906. Along the flow direction 3920 in some of these examples, the upper sheath-fluid channel 3902 has an extent 3916 terminating upstream of an extent 3918 of the upper guide channel 3906. The lower sheath-fluid channel 3904 can additionally or alternatively be configured similarly. For example, the lower sheath-fluid channel 3904 can be oriented at least partly along the flow direction at the lower guide channel, and, along the flow direction 3920, the lower sheath-fluid channel 3904 can have an extent 3922 terminating upstream of an extent 3924 of the lower guide channel 3908.

Figure 40:
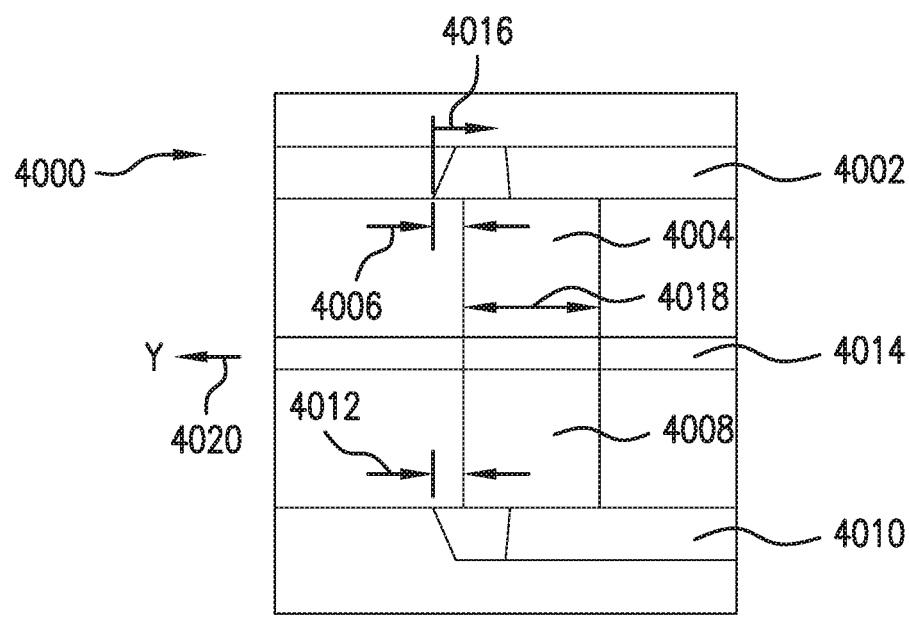
FIG. 40 is a cross-section of portions of an example flow system.

FIG. 40 shows a cross-section of portions of example flow system 4000, which is similar to flow system 3900 except with different spacings. Upper sheath channel 4002 is offset from upper guide channel 4004 in the Y direction by spacing 4006, and lower sheath channel 4010 is offset from lower guide channel 4008 in the Y direction by spacing 4012. In FIG. 40, spacings 4006 and 4012 are each −0.1 mm, i.e., upper sheath channel 4002 extends beyond upper guide channel 4004 in the flow direction +Y, and lower sheath channel 4010 extends beyond lower guide channel 4008 in the flow direction +Y. Flow chamber 4014 is also shown. Extent 4016 of upper sheath channel 4002 and extent 4018 of upper guide channel 4004 are shown, and can be as discussed above with reference to FIG. 39. Extent 4016 terminates upstream (along the flow direction, the Y axis) of extent 4018. In some examples, sheath-fluid channels 4002 or 4004 can have extents terminating upstream or downstream of respective guide channels 4004 or 4008 along flow direction 4020.

Figure 41:
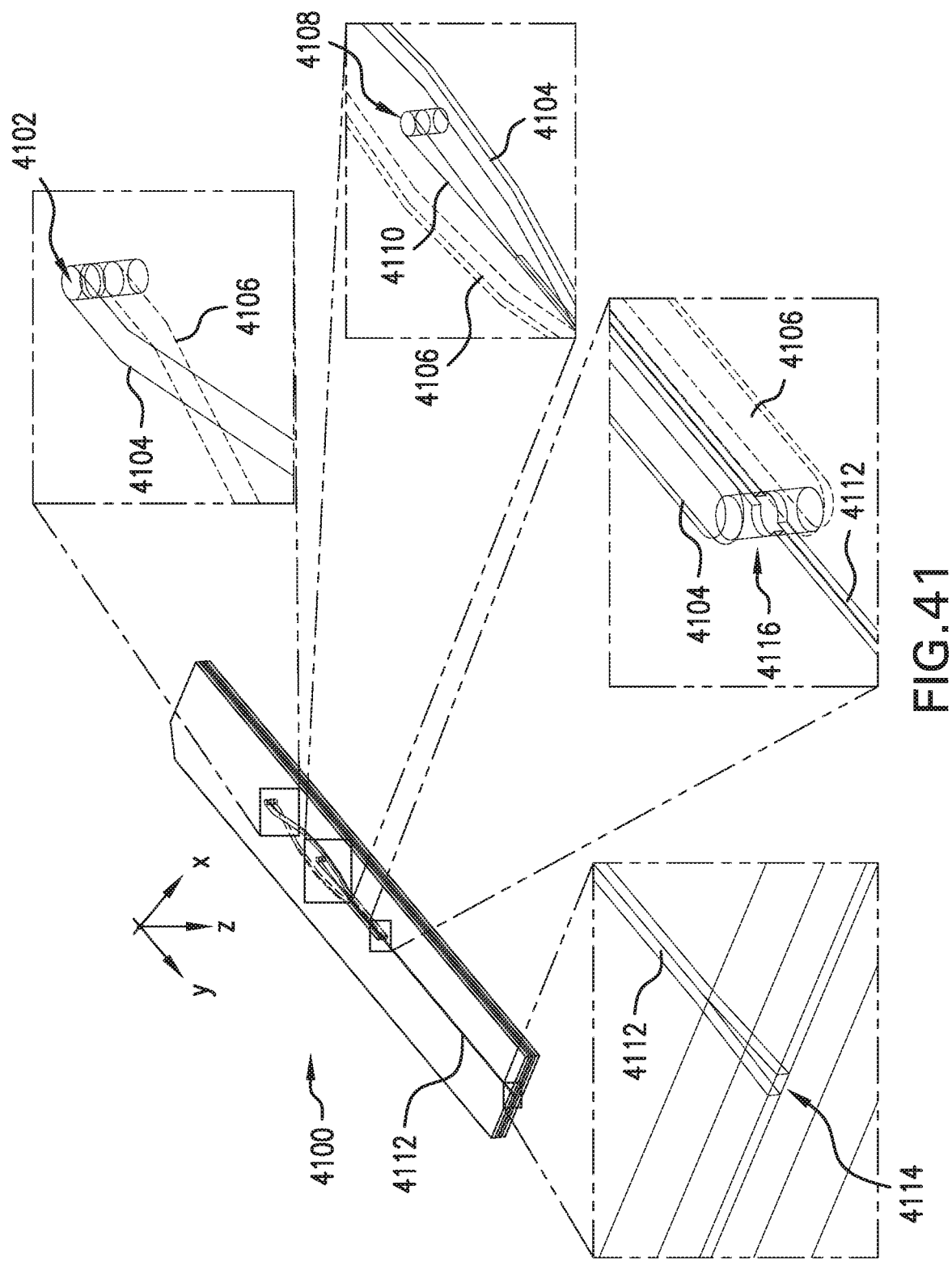
FIG. 41 is a perspective of portions of an example flow system.

FIG. 41 is a perspective of portions of a flow system 4100. Shown are sheath inlet 4102, upper sheath channel 4104, lower sheath channel 4106 (shown dashed for clarity), sample inlet 4108, sample-inlet neck 4110, flow chamber 4112, and waste outlet 4114. In some examples, upper sheath channel 4104 and lower sheath channel 4106 have widths of about 0.6 mm. Simulations were performed on earlier designs with a flow of 1 μL/s sample and 10 μL/s sheath. The simulations indicated that a sheath channel width of about 0.6 mm reduced hydrodynamic defocusing effects due to lateral shifts of the sheath flow with respect to the sample flow.

In some examples, upper sheath channel 4104 and lower sheath channel 4106 are laterally offset, with respect to the irradiation direction, as discussed above with reference to FIG. 25, 30A, or 33A. In some examples, sample-inlet neck 4110 is tapered as discussed above with reference to FIG. 25, 30C, or 33C. In some examples, flow chamber 4112 widens in focusing area 4116, e.g., as discussed above with reference to FIG. 37 or 38. In some examples, waste outlet 4114 is tapered, e.g., as discussed above with reference to FIG. 25, 30D, or 33E.

Figure 42:
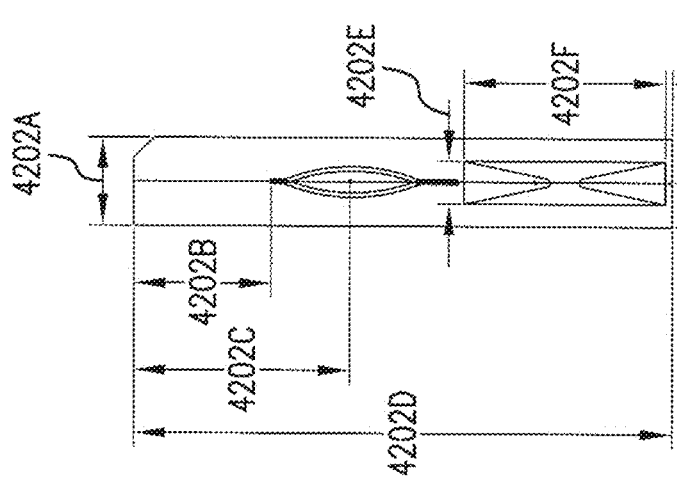
FIG. 42 is a plan of portions of an example flow system.

FIG. 42 is a plan of portions of a flow system. Dimensions 4202 can have about the following values: 4202A, 12.5 mm; 4202B, 19 mm; 4202C, 30 mm; 4202D, 75 mm; 4202E, 6 mm; 4202F, 28 mm; 4202G, 1 mm; 4202H, 6.25±0.05 mm.

Figure 43:
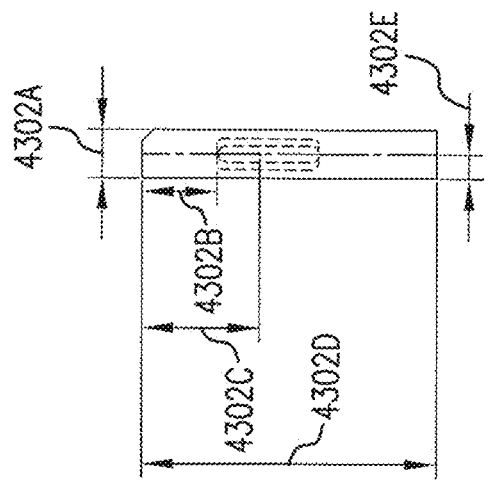
FIG. 43 is a plan of portions of an example flow system.

FIG. 43 is a plan of portions of a flow system. Dimensions 4302 can have about the following values 4302A, 12.5±0.1 mm; 4302B, 19 mm; 4302C, 30 mm; 4302D, 75±0.5 mm; 4302E, 6.25±0.05 mm.

Figure 44:
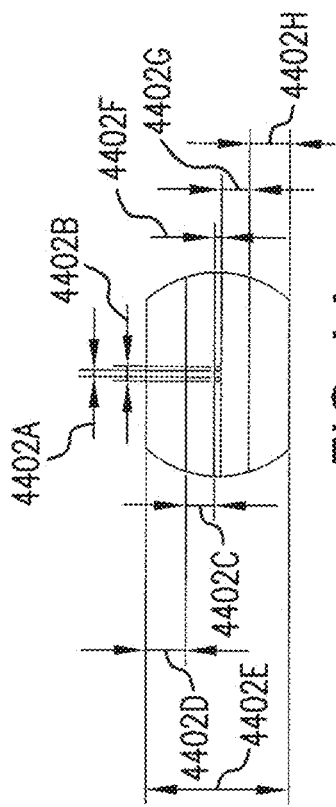
FIG. 44 is a cross-section of portions of an example flow system.

FIG. 44 is a cross-section of portions of a flow system. Dimensions 4402 can have about the following values: 4402A, 0.1±0.015 mm; 4402B, 0.2 mm (4402B can be a reference dimension); 4402C, 0.4 mm; 4402D, 0.55 mm; 4402E, 2 mm (4402E can be a reference dimension); 4402F, 0.1 mm+0.03 mm, −0.00 mm; 4402G, 0.4 mm; 4402H, 0.55 mm.

Simulations were performed of a configuration similar to that shown in FIGS. 37 and 38. A simulated hydrodynamically planar flow of 10 μm particles in a 20 μL/s flow had a thickness along the irradiation direction (e.g., +Z) of about 20 μm. A simulated hydrodynamically planar flow of 5 μm particles in a 10 μL/s flow had a thickness along the irradiation direction of about 15 μm.

Further simulations were performed of configurations similar to those shown in FIGS. 37 and 38. Simulations were performed of diameters 3402A of 0.15 mm, 0.25 mm, 0.3 mm, and 0.4 mm. Diameters 0.25 mm, 0.3 mm, and 0.4 mm showed effective hydrodynamic focusing of a simulated flow of 1 μL/s sample (either 5 μm or 10 μm particles) and 10 μL/s sheath. The simulated flow of 5 μm particles with a diameter 3402A of 0.4 mm provided a simulated hydrodynamically planar flow of about 10 μm thick. Flows as thin as 10 μm can permit more accurately measuring individual particles, and can permit high-performance but narrow depth-of-field optics to be used in measuring or imaging particles. Further simulations with simulated sample flows of 0.1 μL/s and 0.05 μL/s were also performed and showed effective hydrodynamic focusing. The simulated hydrodynamically planar flows were thinner for lower sample flow rates than for higher sample flow rates.

Example Clauses

A: An image flow cytometer for observing microparticulate samples, the image flow cytometer comprising: a flow system configured to direct a carrier fluid including the microparticulate samples through a sensing area in a substantially hydrodynamically planar flow, the substantially hydrodynamically planar flow having a selected thickness, a selected flow direction, and a selected flow rate, the flow system including: a flow chamber extending in the selected flow direction, the flow chamber including first and second apertures on opposed surfaces of the flow chamber and a sensing area downstream of the first and second apertures along the flow direction, the flow chamber configured to receive the carrier fluid upstream of the first and second apertures; and a sheath-fluid channel configured to receive a sheath fluid and including: first and second branches configured to carry the sheath fluid into the flow chamber through the first aperture and oriented in substantially opposite directions at the first aperture; and third and fourth branches configured to carry the sheath fluid into the flow chamber through the second aperture and oriented in substantially opposite directions at the second aperture; an irradiation optical system adapted to scan an irradiation spot smaller than the selected thickness across the sensing area in a scan direction different from the selected flow direction; a detection optical system that detects a time-varying light intensity of resultant light from the flow chamber; and a processor configured to detect two or more of the microparticulate samples according to the detected time-varying light intensity of the resultant light.

B: The image flow cytometer according to paragraph A, wherein the first and second apertures are substantially directly opposed.

C: The image flow cytometer according to any one of paragraphs A-B, wherein the first and second apertures are offset from each other along the flow chamber.

D: The image flow cytometer according to paragraph C, wherein the first and second apertures are offset by at most 100 μm from each other along the flow direction.

E: The image flow cytometer according to any one of paragraphs A-D, wherein the flow system includes a plurality of layers, the first and second branches are arranged in a first one of the layers, and the third and fourth branches are arranged in a second, different one of the layers.

F: The image flow cytometer according to paragraph E, wherein the first branch at least partly overlays the third branch in a first region spaced apart from the first and second apertures and the second branch at least partly overlays the fourth branch in a second region spaced apart away from the first and second apertures.

G: The image flow cytometer according to any one of paragraphs A-F, wherein the flow system includes first, second, and third substantially planar sheets affixed together in that order, wherein the first sheet includes one or more cavities defining the first and second branches, the second sheet includes one or more cavities defining the flow chamber, and the third sheet includes one or more cavities defining the third and fourth branches.

H: The image flow cytometer according to paragraph G, wherein each of the first and third sheets is approximately 1 mm thick.

I: The image flow cytometer according to any one of paragraphs G-H, wherein the second sheet is approximately 50 μm thick.

J: The image flow cytometer according to any one of paragraphs G-I, wherein each of the sheets includes a material substantially impermeable to both the carrier fluid and the sheath fluid around the respective one or more cavities.

K: The image flow cytometer according to any one of paragraphs G-J, wherein: the first sheet includes a first cavity fluidically connected to the first and second branches to receive the sheath fluid; the second sheet and at least one of the first and third sheets include respective second cavities fluidically connected to the flow chamber to receive the carrier fluid; and the third sheet includes a third cavity fluidically connected to the third and fourth branches to receive the sheath fluid.

L: The image flow cytometer according to paragraph K, wherein the second sheet includes a fourth cavity at least partially overlaying, and fluidically connected to, each of the first cavity and the third cavity.

M: The image flow cytometer according to any one of paragraphs K-L, wherein the flow system further includes: a sheath-fluid source fluidically connected to one or both of the first cavity and the third cavity; and a sample-fluid source fluidically connected to at least one of the respective second cavities.

N: The image flow cytometer according to any one of paragraphs A-M, wherein the flow chamber has a substantially rectangular cross-section in the sensing area and each of the first, second, third, and fourth branches has a substantially triangular cross-section.

O: The image flow cytometer according to any one of paragraphs A-N, wherein the flow system is configured to space the microparticulate samples apart transverse to the flow direction.

P: The image flow cytometer according to any one of paragraphs A-O, wherein the substantially hydrodynamically planar flow and the sensing area have respective widths at least five times the selected thickness.

Q: A flow system for transporting microparticulate samples in a substantially hydrodynamically planar flow substantially in a selected flow direction, the flow system comprising: a flow chamber extending in the flow direction, the flow chamber including first and second apertures on opposed surfaces of the flow chamber, the flow chamber configured to receive a carrier fluid including the microparticulate samples upstream of the first and second apertures; and a sheath-fluid channel configured to receive a sheath fluid and including: first and second branches configured to carry the sheath fluid into the flow chamber through the first aperture and oriented in substantially opposite directions at the first aperture; and third and fourth branches configured to carry the sheath fluid into the flow chamber through the second aperture and oriented in substantially opposite directions at the second aperture.

R: The flow system according to paragraph Q, wherein the flow chamber is substantially transparent to a selected wavelength of electromagnetic radiation in a sensing area downstream of the first and second apertures along the flow direction.

S: The flow system according to any one of paragraphs Q-R, wherein the first and second apertures are substantially directly opposed.

T: The flow system according to any one of paragraphs Q-S, further including first, second, and third substantially planar sheets affixed together in that order, wherein: the first sheet includes one or more cavities defining the first and second branches, the second sheet includes one or more cavities defining the flow chamber, and the third sheet includes one or more cavities defining the third and fourth branches; the first sheet includes a first cavity fluidically connected to the first and second branches to receive the sheath fluid; the second sheet and at least one of the first and third sheets include respective second cavities fluidically connected to the flow chamber to receive the carrier fluid; and the third sheet includes a third cavity fluidically connected to the third and fourth branches to receive the sheath fluid.

U: A flow system for transporting microparticulate samples in a hydrodynamically planar flow in a flow direction, the flow system comprising: a flow chamber extending in the flow direction, the flow chamber including first and second apertures through opposed walls of the flow chamber, the flow chamber configured to receive a carrier fluid including the microparticulate samples at a location upstream of the first and second apertures; and a sheath-fluid channel configured to receive a sheath fluid and including: first and second branches, each of the first and second branches configured to carry the sheath fluid into the flow chamber through the first aperture and having a respective longitudinal axes, wherein the respective longitudinal axes have a relative angle between them of less than about 15° at the first aperture; and third and fourth branches, each of the third and fourth branches configured to carry the sheath fluid into the flow chamber through the second aperture and having respective longitudinal axes, wherein the respective longitudinal axes have a relative angle between them of less than about 15° at the second aperture.

V: The flow system according to paragraph U, wherein the flow chamber is substantially transparent to a selected wavelength of electromagnetic radiation in a sensing area and the sensing area is arranged in the flow channel at a location downstream of the first and second apertures along the flow direction.

W: The flow system according to paragraph U or V, wherein the first and second apertures have respective centerlines and the respective centerlines are substantially at a same position along the flow direction.

X: The flow system according to any of claims U-W, wherein the first and second apertures have respective centerlines and the respective centerlines are offset by at most 100 µm from each other along the flow direction.

Y: The flow system according to any of claims U-X, wherein the flow system includes a plurality of layers, the first and second branches are disposed in a first one of the layers, and the third and fourth branches are disposed in a second, different one of the layers.

Z: The flow system according to paragraph Y, wherein: the flow system is configured to at least partly transmit electromagnetic radiation traveling substantially along an irradiation direction; in a first region spaced apart from the first and second apertures, the first branch at least partly overlays the third branch along the irradiation direction; and in a second region spaced apart away from the first and second apertures, the second branch at least partly overlays the fourth branch along the irradiation direction.

AA: The flow system according to any of claims U-Z, further including first, second, and third substantially planar sheets, wherein: the first sheet is affixed to the second sheet; the second sheet is affixed to the third sheet; the first sheet includes one or more cavities defining the first and second branches, the second sheet includes one or more cavities defining the flow chamber, and the third sheet includes one or more cavities defining the third and fourth branches; the first sheet includes a first cavity fluidically connected to the first and second branches to receive the sheath fluid; the second sheet and at least one of the first and third sheets include respective second cavities fluidically connected to the flow chamber to receive the carrier fluid; and the third sheet includes a third cavity fluidically connected to the third and fourth branches to receive the sheath fluid.

AB: The flow system according to paragraph AA, wherein the second sheet includes a fourth cavity at least partially overlaying, and fluidically connected to, each of the first cavity and the third cavity.

AC: The flow system according to paragraph AA or AB, wherein the flow system further includes: a sheath-fluid source fluidically connected to one or both of the first cavity and the third cavity; and a sample-fluid source fluidically connected to at least one of the respective second cavities.

AD: The flow system according to any of claims U-AC, wherein the flow chamber has a rectangular cross-section in the sensing area and each of the first, second, third, and fourth branches has a triangular cross-section.

AE: A flow system for transporting microparticulate samples in a hydrodynamically planar flow in a selected flow direction, the flow system comprising: a flow chamber extending in the flow direction, the flow chamber including first and second apertures through opposed walls of the flow chamber, the flow chamber configured to receive a carrier fluid including the microparticulate samples at a location upstream of the first and second apertures; a first guide channel extending from the first aperture, the first guide channel having a centerline substantially perpendicular to a first centerline of the flow chamber, the first centerline of the flow chamber determined at the first aperture; a second guide channel extending from the second aperture, the second guide channel having a centerline substantially perpendicular to a second centerline of the flow chamber, the second centerline of the flow chamber determined at the second aperture; a first sheath-fluid channel configured to supply a sheath fluid to the first guide channel; and a second sheath-fluid channel configured to supply the sheath fluid to the second guide channel.

AF: The flow system according to paragraph AE, wherein the first sheath-fluid channel and the second sheath-fluid channel have respective centerlines that are substantially parallel where the first sheath-fluid channel and the second sheath-fluid channel meet the first guide channel and the second guide channel, respectively.

AG: The flow system according to paragraph AE or AF, wherein the flow system is configured to at least partly transmit electromagnetic radiation traveling substantially along an irradiation direction and the first sheath-fluid channel and the second sheath-fluid channel, in a first region spaced apart from the first and second apertures, are spaced apart in a plane substantially normal to the irradiation direction.

AH: The flow system according to any of claims AE-AG, wherein: the first sheath-fluid channel is oriented at least partly along the flow direction at the first guide channel; and the first sheath-fluid channel has an extent along the flow direction terminating upstream of an extent along the flow direction of the first guide channel.

AI: The flow system according to paragraph AH, wherein: the second sheath-fluid channel is oriented at least partly along the flow direction at the second guide channel; and the second sheath-fluid channel has an extent along the flow direction terminating upstream of an extent along the flow direction of the second guide channel.

AJ: The flow system according to any of claims AE-AI, further comprising: first and second sheath-fluid branches, each of the first and second sheath-fluid branches configured to carry the sheath fluid to the first sheath-fluid channel, and the first and second sheath-fluid branches having respective longitudinal axes, wherein the respective longitudinal axes have a relative angle between them of less than about 15° at the first sheath-fluid channel; and third and fourth sheath-fluid branches, each of the third and fourth sheath-fluid branches configured to carry the sheath fluid to the second sheath-fluid channel, and the third and fourth sheath-fluid branches having respective longitudinal axes, wherein the respective longitudinal axes have a relative angle between them of less than about 15° at the second sheath-fluid channel.

AK: The flow system according to paragraph AJ, wherein the first and second sheath-fluid channels are substantially parallel to the flow chamber at the first and second guide channels, respectively.

AL: The flow system according to any of claims U-AK, wherein: the flow system is configured to at least partly transmit electromagnetic radiation traveling substantially along an irradiation direction; and the flow chamber has at least one of: a cross-section substantially normal to the irradiation direction at the first aperture corresponding to a cross-section substantially normal to the irradiation direction of the first guide channel at the first aperture; or a cross-section substantially normal to the irradiation direction at the second aperture corresponding to a cross-section substantially normal to the irradiation direction of the second guide channel at the second aperture.

AM: The flow system according to any of claims U-AL, further comprising a sheath-fluid inlet fluidically connected to a sheath-inlet neck tapering from a cross-sectional area of the sheath-fluid inlet to a smaller sheath-channel cross-sectional area along a length of the sheath-inlet neck.

AN: The flow system according to any of claims U-AM, wherein the flow chamber includes a waste-outlet neck downstream of the first and second apertures and the flow chamber tapers from a first flow-chamber cross-sectional area to a second, larger flow-chamber cross-sectional area along a length of the waste-outlet neck.

AO: The flow system according to any of claims U-AN, further comprising: a sensing area of the flow chamber downstream of the first and second apertures along the flow direction; an irradiation optical system adapted to scan an irradiation spot smaller than the selected thickness across the sensing area in a scan direction different from the selected flow direction and at least partly across the hydrodynamically planar flow; and a detection optical system that detects a time-varying light intensity of resultant light from the flow chamber.

AP: The flow system according to paragraph AO, further comprising: a processor; and computer-readable media storing computer-readable instructions executable to cause the processor to perform operations comprising detecting two or more of the microparticulate samples according to the detected time-varying light intensity of the resultant light.

CONCLUSION

From description herein, it will be apparent that aspects can be varied in many ways. Such variations are not to be regarded as a departure from the spirit and scope of the invention, and all such modifications as would be obvious to one skilled in the art are intended for inclusion within the scope of the claims.

The invention is inclusive of combinations of the aspects described herein. References to "a particular aspect" (or "embodiment" or "version") and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

What is claimed is:

1. A flow system for transporting microparticulate samples in a hydrodynamically planar flow in a flow direction, the flow system comprising:
    a flow chamber extending in the flow direction, the flow chamber including first and second apertures through opposed walls of the flow chamber, the flow chamber configured to receive a carrier fluid including the microparticulate samples at a location upstream of the first and second apertures, the flow chamber including a sensing area downstream of the first and second apertures along the flow direction;
    a sheath-fluid channel configured to receive a sheath fluid and including:
        first and second branches, each of the first and second branches configured to carry the sheath fluid into the flow chamber through the first aperture; and
        third and fourth branches, each of the third and fourth branches configured to carry the sheath fluid into the flow chamber through the second aperture; and an irradiation optical system configured to:
  radiate laser light to the sensing area in an irradiation direction that differs from the flow direction, the laser light intersecting the sensing area to provide an irradiation spot, and
  move the irradiation spot across the sensing area in a scan direction and at least partly across the hydrodynamically planar flow, the scan direction differing from the flow direction and the irradiation direction.

2. The flow system according to claim 1, wherein the sensing area of the flow chamber is substantially transparent to a selected wavelength of electromagnetic radiation.

3. The flow system according to claim 1, wherein the first and second apertures have respective centerlines and the respective centerlines are substantially at a same position along the flow direction.

4. The flow system according to claim 1, wherein the first and second apertures have respective centerlines and the respective centerlines are offset from each other along the flow direction by half a width of one of the first and second apertures.

5. The flow system according to claim 1, wherein the flow system includes a plurality of layers, the first and second branches are disposed in a first one of the layers, and the third and fourth branches are disposed in a second, different one of the layers, and
  wherein:
    the flow system is configured to at least partly transmit electromagnetic radiation traveling substantially along the irradiation direction;
    in a first region spaced apart from the first and second apertures, the first branch at least partly overlays the third branch along the irradiation direction; and
    in a second region spaced apart away from the first and second apertures, the second branch at least partly overlays the fourth branch along the irradiation direction.

6. The flow system according to claim 1, further including first, second, and third substantially planar sheets, wherein:
  the first sheet is affixed to the second sheet;
  the second sheet is affixed to the third sheet;
  the first sheet includes one or more cavities defining the first and second branches, the second sheet includes one or more cavities defining the flow chamber, and the third sheet includes one or more cavities defining the third and fourth branches;
  the first sheet includes a first cavity fluidically connected to the first and second branches to receive the sheath fluid;
  the second sheet and at least one of the first and third sheets include respective second cavities fluidically connected to the flow chamber to receive the carrier fluid; and
  the third sheet includes a third cavity fluidically connected to the third and fourth branches to receive the sheath fluid.

7. The flow system according to claim 6, wherein the second sheet includes a fourth cavity at least partially overlaying, and fluidically connected to, each of the first cavity and the third cavity.

8. The flow system according to claim 6, wherein the flow system further includes:
  a sheath-fluid source fluidically connected to one or both of the first cavity and the third cavity; and
  a sample-fluid source fluidically connected to at least one of the respective second cavities.

9. The flow system according to claim 1, wherein the flow chamber has a rectangular cross-section in the sensing area and each of the first, second, third, and fourth branches has a triangular cross-section.

10. The flow system according to claim 1, further comprising:
  a detection optical system that detects a time-varying light intensity of resultant light from the flow chamber;
  a processor; and
  one or more computer-readable media storing computer-readable instructions executable to cause the processor to perform operations comprising detecting two or more of the microparticulate samples according to the detected time-varying light intensity of the resultant light.

11. The flow system according to claim 1, wherein:
  a first angle between a longitudinal axis of the first branch and a longitudinal axis of the second branch is about 15° or less, and a second angle between the longitudinal axis of the first branch and the longitudinal axis of the second branch is 165° or greater, and
  wherein a third angle between a longitudinal axis of the third branch and a longitudinal axis of the fourth branch is 15° or less, and a fourth angle between the longitudinal axis of the third branch and the longitudinal axis of the fourth branch is 165° or greater.

12. A flow system for transporting microparticulate samples in a hydrodynamically planar flow in a selected flow direction, the flow system comprising:
  a flow chamber extending in the flow direction, the flow chamber comprising a sensing area, wherein:
    the flow chamber comprises four walls, a focusing area, a flow inlet, a flow outlet, a first aperture through a first wall of the four walls, and a second aperture through a second wall of the flow chamber;
    the second wall is opposed to the first wall;
    the flow chamber is configured to receive a carrier fluid including the microparticulate samples via the flow inlet upstream of the first and second apertures; and
    the sensing area is downstream of the first and second apertures along the flow direction;
  a first guide channel extending from the first aperture, the first guide channel having a centerline substantially perpendicular to a first centerline of the flow chamber, the first centerline of the flow chamber determined at the first aperture;
  a second guide channel extending from the second aperture, the second guide channel having a centerline substantially perpendicular to a second centerline of the flow chamber, the second centerline of the flow chamber determined at the second aperture;
  a first sheath-fluid channel configured to supply a sheath fluid to the first guide channel;
  a second sheath-fluid channel configured to supply the sheath fluid to the second guide channel; and
  an irradiation optical system configured to:
    radiate laser light to the sensing area in an irradiation direction that differs from the flow direction, the laser light intersecting the sensing area to provide an irradiation spot, and
    move the irradiation spot across the sensing area in a scan direction and at least partly across the hydrodynamically planar flow, the scan direction differing from the flow direction and the irradiation direction.

13. The flow system according to claim 12, wherein the first sheath-fluid channel and the second sheath-fluid channel have respective centerlines that are substantially parallel where the first sheath-fluid channel and the second sheath-fluid channel meet the first guide channel and the second guide channel, respectively.

14. The flow system according to claim 12, wherein:
the flow system is configured to at least partly transmit electromagnetic radiation traveling substantially along an irradiation direction, and
the first sheath-fluid channel and the second sheath-fluid channel, in a first region spaced apart from the first and second apertures, are spaced apart in a plane substantially normal to the irradiation direction.

15. The flow system according to claim 12, wherein:
the first sheath-fluid channel is oriented at least partly along the flow direction at the first guide channel;
the first sheath-fluid channel has an extent along the flow direction terminating upstream of an extent along the flow direction of the first guide channel;
the second sheath-fluid channel is oriented at least partly along the flow direction at the second guide channel; and
the second sheath-fluid channel has an extent along the flow direction terminating upstream of an extent along the flow direction of the second guide channel.

16. The flow system according to claim 12, further comprising:
first and second sheath-fluid branches, each of the first and second sheath-fluid branches configured to carry the sheath fluid to the first guide channel; and
third and fourth sheath-fluid branches, each of the third and fourth sheath-fluid branches configured to carry the sheath fluid to the second guide channel,
wherein the first and second sheath-fluid channels are substantially parallel to the flow chamber at the first and second guide channels, respectively.

17. The flow system according to claim 12, wherein:
the flow system is configured to at least partly transmit electromagnetic radiation traveling substantially along the irradiation direction; and
the flow chamber has at least one of:
a cross-section substantially normal to the irradiation direction at the first aperture corresponding to a cross-section substantially normal to the irradiation direction of the first guide channel at the first aperture; or
a cross-section substantially normal to the irradiation direction at the second aperture corresponding to a cross-section substantially normal to the irradiation direction of the second guide channel at the second aperture.

18. The flow system according to claim 12, further comprising:
a detection optical system that detects a time-varying light intensity of resultant light from the flow chamber;
a processor; and
one or more computer-readable media storing computer-readable instructions executable to cause the processor to perform operations comprising detecting the two or more of the microparticulate samples according to the detected time-varying light intensity of the resultant light.

19. A method, comprising:
reducing a vertical extent of a carrier fluid flowing through a flow chamber in a longitudinal direction by receiving sheath fluid through first and second apertures in the flow chamber, wherein:
the sheath fluid flows through the first aperture at least partly in a first vertical direction; and
the sheath fluid flows through the second aperture at least partly in a second, different vertical direction; and
sensing microparticulate samples in the carrier fluid in a sensing area of the flow chamber downstream from the first and second apertures, a lateral extent of the carrier fluid in the sensing area being at least a width of two of the microparticulate samples,
wherein sensing the microparticulate samples in the carrier fluid in the sensing area of the flow chamber includes:
radiating laser light to a sensing area in the first vertical direction, the laser light intersecting the sensing area to provide an irradiation spot; and
moving the irradiation spot across two or more samples of the microparticulate samples, the two or more samples moving in a flow direction and being spaced apart in a width direction in the sensing area, the flow direction differing from the first vertical direction and the width direction differing from the flow direction and the first vertical direction.

20. The method of claim 19, wherein sensing the microparticulate samples in the carrier fluid in the sensing area of the flow chamber further includes:
detecting a time-varying light intensity of resultant light from the flow chamber.

* * * * *